United States Patent
Dasgupta et al.

(10) Patent No.: US 12,182,227 B2
(45) Date of Patent: Dec. 31, 2024

(54) USER INTERFACE FOR VISUAL DIAGNOSIS OF IMAGE MISCLASSIFICATION BY MACHINE LEARNING

(71) Applicant: Amazon Technologies, Inc., Seattle, WA (US)

(72) Inventors: Sunny Dasgupta, Redmond, WA (US); Sri Kaushik Pavani, Redmond, WA (US); Sabya Sachi, Seattle, WA (US); Himanshu Prafulla Shringarpure, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/155,024

(22) Filed: Jan. 16, 2023

(65) Prior Publication Data
US 2023/0195845 A1 Jun. 22, 2023

Related U.S. Application Data

(63) Continuation of application No. 16/172,614, filed on Oct. 26, 2018, now Pat. No. 11,556,746.

(51) Int. Cl.
*G06F 18/21* (2023.01)
*G06F 16/58* (2019.01)
(Continued)

(52) U.S. Cl.
CPC .......... *G06F 18/2178* (2023.01); *G06F 16/58* (2019.01); *G06F 18/23213* (2023.01);
(Continued)

(58) Field of Classification Search
CPC ................ G06F 18/2178; G06F 16/58; G06F 18/23213; G06F 18/24; G06N 3/08; G06N 5/04; G06N 20/00
(Continued)

(56) References Cited

U.S. PATENT DOCUMENTS

| 8,954,358 B1 | 2/2015 | Zhang |
| 10,127,027 B2 | 11/2018 | Subramaniyan |

(Continued)

OTHER PUBLICATIONS

Martin Abadi et al, "TensorFlow: A System for Large-Scale Machine Learning", 2016, pp. 1-21.
(Continued)

*Primary Examiner* — Kathleen Y Dulaney
(74) *Attorney, Agent, or Firm* — Robert C. Kowert; Kowert, Hood, Munyon, Rankin & Goetzel, P.C.

(57) ABSTRACT

Computer systems and associated methods are disclosed to implement a model development environment (MDE) that allows a team of users to perform iterative model experiments to develop machine learning (ML) media models. In embodiments, the MDE implements a media data management interface that allows users to annotate and manage training data for models. In embodiments, the MDE implements a model experimentation interface that allows users to configure and run model experiments, which include a training run and a test run of a model. In embodiments, the MDE implements a model diagnosis interface that displays the model's performance metrics and allows users to visually inspect media samples that were used during the model experiment to determine corrective actions to improve model performance for later iterations of experiments. In embodiments, the MDE allows different types of users to collaborate on a series of model experiments to build an optimal media model.

20 Claims, 36 Drawing Sheets

(51) Int. Cl.
*G06F 18/23213* (2023.01)
*G06F 18/24* (2023.01)
*G06N 3/08* (2023.01)
*G06N 5/04* (2023.01)
*G06N 20/00* (2019.01)

(52) U.S. Cl.
CPC ............... *G06F 18/24* (2023.01); *G06N 3/08* (2013.01); *G06N 5/04* (2013.01); *G06N 20/00* (2019.01)

(58) Field of Classification Search
USPC ............. 706/12; 382/195, 159, 311; 714/57; 702/12
See application file for complete search history.

(56) References Cited

U.S. PATENT DOCUMENTS

| | | | |
|---|---|---|---|
| 10,380,498 B1 | 8/2019 | Chaoji | |
| 10,382,799 B1 | 8/2019 | Walters | |
| 10,417,577 B2* | 9/2019 | Bowers | G06F 9/453 |
| 10,719,301 B1 | 7/2020 | Dasgupta | |
| 11,537,506 B1 | 12/2022 | Dasgupta | |
| 11,556,746 B1 | 1/2023 | Dasgupta et al. | |
| 11,810,365 B1* | 11/2023 | Crego | G06V 20/70 |
| 2004/0019794 A1 | 1/2004 | Moradi | G16H 20/13 713/185 |
| 2007/0143284 A1* | 6/2007 | Lee | G06F 40/44 707/999.005 |
| 2008/0022844 A1 | 1/2008 | Poliner | |
| 2011/0083122 A1 | 4/2011 | Chen | |
| 2011/0235900 A1 | 9/2011 | Porikli | |
| 2012/0259801 A1 | 10/2012 | Ji | |
| 2014/0279754 A1* | 9/2014 | Barsoum | G06N 7/01 706/12 |
| 2015/0117783 A1* | 4/2015 | Lin | G06T 7/162 382/195 |
| 2016/0162803 A1* | 6/2016 | Amershi | G06F 11/162 714/57 |
| 2017/0124894 A1* | 5/2017 | Essafi | G09B 7/00 |
| 2017/0193392 A1* | 7/2017 | Liu | G06N 20/00 |
| 2018/0096497 A1* | 4/2018 | Bennett | H04N 23/64 |
| 2018/0121183 A1 | 5/2018 | Subramaniyan | |
| 2019/0132344 A1 | 5/2019 | Lem | |
| 2019/0147371 A1 | 5/2019 | Deo | |
| 2019/0150867 A1* | 5/2019 | Itou | A61B 6/5217 |
| 2019/0227912 A1 | 7/2019 | Banuelos | |
| 2019/0278994 A1* | 9/2019 | Bumpas | G06N 3/045 |
| 2019/0325353 A1 | 10/2019 | Aftab | |
| 2019/0340110 A1 | 11/2019 | Kupitman | |
| 2019/0340518 A1 | 11/2019 | Merrill | |
| 2020/0025577 A1* | 1/2020 | Montemerlo | G06F 16/583 |
| 2020/0097597 A1* | 3/2020 | Lourentzou | G06N 5/022 |
| 2020/0104646 A1* | 4/2020 | Eno | G06V 20/00 |
| 2020/0111214 A1* | 4/2020 | Chen | G06N 3/08 |
| 2020/0117553 A1* | 4/2020 | Schlicht | B60W 50/04 |
| 2020/0286614 A1 | 9/2020 | Do | |
| 2021/0004320 A1 | 1/2021 | Kupitman | |

OTHER PUBLICATIONS

Vijay Badrinarayanan, "SegNet: A Deep Convolutional Encoder-Decoder Architecture for Image Segmentation", Oct. 10, 2016, pp. 1-14.
Cenk Baykal et al, "Training Support Vector Machines using Coresets", Nov. 10, 2017, pp. 1-12.
Hakan Bilen et al, "Weakly Supervised Deep Detection Networks", pp. 1-9.
Leo Breiman et al, "Random Forests", 2001, (Statistics Department, University of California, Berkeley, CA 94720), pp. 1-28.
Mateausz Buda et al, "A Systematic Study of the Class Imbalance Problem in Convolutional Neural networks", pp. 1-21.
Tianqi Chen et al, "MXNet: A Flexible and Efficient Machine Learning Library for Heterogeneous Distributed Systems", Dec. 3, 2015, pp. 1-6.
Corinna Cortes et al, "Support-Vector Networks", 1995 Kluwer Academics Publishers, Boston, pp. 1-25.
Zhitao Gong et al, "Adversarial and Clean Data Are Not Twins", Apr. 17, 2017, pp. 1-7.
Greg Griffin et al, "Caltech-256 Object Category Dataset", pp. 1-20.
Tianyu Gu et al, "BadNets: Identifying Vulnerabilities in the Machine Learning Model Supply Chain", Aug. 22, 2017, pp. 1-13.
Wei Liu et al, "SSD: Single Shot MultiBox Detector", Dec. 29, 2016, pp. 1-17.
Jiajun Lu et al, "SafetyNet: Detecting and Rejecting Adversarial Examples Robustly", pp. 1-9.
Andrew McCallum et al, "Efficient Clustering of High-Dimensional Data Sets with Application to Reference Matching", 2000, pp. 1-10.
Nina Narodystka et al, "Simple Black-Box Adversarial Attacks on Deep Neural Networks", pp. 1-9.
Chris Olah et al, "Feature Visualization", Nov. 7, 2017, pp. 1-24.
Nobuyuki Otsu, "A Threshold Selection Method from Gray-Level Histograms", Jan. 1, 1979, pp. 1-5.
Nicolas Papernot et al, "SoK: Security and Privacy in Machine Learning", pp. 1-16.
Abhishek Patel et al, "New Approach for K-mean and K-medoids Algorithm", (International Journal of Computer Applications Technology and Research vol. 2-Issue 1, 1-5), dated 2013, pp. 1-5.
Fabian Pedregosa et al, "Scikit-Learn: Mahcine Learning in Python", 2011, pp. 1-6.
John C. Platt, "Probabilistic Outputs for Support Vector Machines and Comparisons to Regularized Likelihood Methods", Mar. 26, 1999, pp. 1-11.
Matthew Honnibal et al, "Prodigy: A new tool for radically efficient machine teaching", (https://explosion.ai/blog/prodigy-annotation-tool-active-learning), pp. 1-13.
Marco Tulio Ribeiro et al, "Why Should I Trust You? Eplaining the predictionsof any classifier", Aug. 9, 2016, pp. 1-10.
Olga Russakovsky et al, "ImageNet Large Scale Visual Recognition Challenge", Jan. 30, 2015, pp. 1-43.
Daniel Smilkov et al, "SmoothGrad: removing noise by adding noise", Jun. 12, 2017, pp. 1-10.
Chen Sun et al, "Revisiting Unreasonable Effectiveness of Data in Deep Learning Era", pp. 1-10.
Christian Szegedy et al, "Intriguing properties of neural networks", Feb. 19, 2014, pp. 1-10.
Christian Szegedy et al, "Inception-v4, Inception-RestNet and the Impact of Residual Connections on Learning" 2017, pp. 1-7.
Christian Szegedy et al, "Rethinking the Inception Architecture for Computer Vision", pp. 1-9.
Sely Tokui et al, "Chainer: a Next-Generation Open Source Framework for Deep Learning", pp. 1-6.
Laurens van der Maaten, "Visualizing Data using t-SNE", 2008, pp. 1-27.
Pete Warden et al, "Speech Commands: A Dataset for Limited-Vocabulary Speech", Apr. 9, 2018, pp. 1-11.
U.S. Appl. No. 16/172,611, filed Oct. 26, 2018, Sunny Dasgupta et al.
U.S. Appl. No. 16/172,637, filed Oct. 26, 2018, Sunny Dasgupta et al.

* cited by examiner

CREATE MODEL EXPERIMENT 700

EXPERIMENT INFORMATION: 710

EXPERIMENT NAME: ANIMAL NECKS v3   DESCRIPTION: WITH ADDITIONAL GIRAFFE SAMPLES

GOAL GROUP: CLASSIFY HORSE-COW-GIRAFFE

SUBGOAL GROUP: NECK RECOG (PREC > 90%)

MODEL INFORMATION: 720   TRAINING CONFIGURATION: 730

MODEL ARCHITECTURE: INCEPTION V3   MAXIMUM STEPS: 100000

☒ USE PREVIOUS CHECKPOINT: OPTIMAL-CP-2   SAVE CHECKPOINT EVERY 100 STEPS

DATA SETS: 722   ☒ STOP IF ACCURACY/LOSS METRIC PLATEAUS FOR 5 EPOCHS

TRAINING SET: BIG ANIMALS – TRAIN   HYPERPARAMETERS: 732

VALIDATION SET: BIG ANIMALS – VALIDATE   ☒ AUTO-TUNE HYPERPARAMETERS

TESTING SET: BIG ANIMALS – TEST   SIMULATION: 734

☒ SIMULATION LINK: PROD-NECK-MODEL

[ CREATE 725 ]   [ SAVE 736 ]   [ RUN 738 ]

*FIG. 7A*

EXPERIMENT VIEW 740

| SEARCH 750 | FILTER 752 | SORT 754 | GROUP 756 | COLUMNS 758 | experiment view table 760

| EXPERIMENT | GOAL | USER | LAUNCH | PROGRESS | PRECISION | RECALL |
|---|---|---|---|---|---|---|
| ANIMAL NECKS v1 | CLASSIFY HORSE-COW-GIRAFFE | bob | 4 days ago | COMPLETED | 0.60 | 0.50 |
| ANIMAL NECKS v2 | CLASSIFY HORSE-COW-GIRAFFE | bob | 1 days ago | COMPLETED | 0.80 | 0.65 |
| ANIMAL NECKS v3 | CLASSIFY HORSE-COW-GIRAFFE | carol | 2 hours ago | TRAINING 20% | | |
| ANIMAL TAILS v6 | CLASSIFY HORSE-COW-GIRAFFE | devi | 6 days ago | COMPLETED | 0.85 | 0.77 |
| ANIMAL TAILS v7 | CLASSIFY HORSE-COW-GIRAFFE | devi | 10 hours ago | TESTING 70% | | |
| NOSE v1 | OBJECT RECOGNITION | anand | 4 days ago | TRAINING 40% | | |

| PAUSE 770 | RESUME 772 | STOP 774 | RESTART 776 | << | < | 1 | 2 | 3 | 4 | 5 | > | >> | DETAILS 778 |

FIG. 7B

MODEL DIAGNOSIS REPORT 2700

BASED ON USER FEEDBACK:

39% OF HORSE IMAGES MISCLASSIFIED AS GIRAFFE CONTAINED REGIONS WITH HUMANS. POTENTIAL ACCURACY IMPROVEMENT OF 5% IN F1 SCORE CAN BE ACHIEVED BY ADDING SUCH IMAGES TO HORSE TRAINING SET

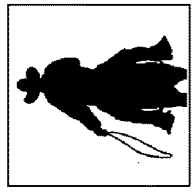 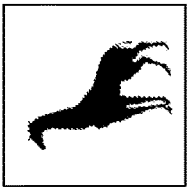

ADD 2710

SEARCH 2720

10% OF GIRAFFE IMAGES IN TRAINING SET ARE MISLABELED AS HORSE. FIXING THE ANNOTATION ERRORS WILL IMPROVE F1 SCORE BY 4%:

 

FIX LABELS 2730

SAVE FOR LATER 2740

*FIG. 27*

USER INTERFACE FOR VISUAL DIAGNOSIS OF IMAGE MISCLASSIFICATION BY MACHINE LEARNING

This application is a continuation of U.S. patent application Ser. No. 16/172,614, filed Oct. 26, 2018, which is hereby incorporated by reference herein in its entirety.

BACKGROUND

Machine learning systems for making decisions about digital media are becoming more common. For example, machine-learned image models are increasingly being used in applications such as facial recognition, text and speech processing, computer-aided medical diagnosis, autonomous vehicle control, among other areas. Traditionally, the development of machine learning models is a time-consuming and error-prone process. The process typically involves a host of labor-intensive tasks, such as image annotation, that are performed manually by humans. The training process itself may require close supervision by data scientists over the course of the training, which may in some cases last days. Moreover, once training is completed, it is often difficult for a novice user to diagnose problems with the resulting model and determine corrective actions to improve model performance. The machine learning community currently lacks holistic systems for systematically developing machine-learned media models. Current tools require coding and are mostly single-user systems; they do not collaboration among various actors in a model building process such as data scientists, engineers, analysts, and product managers. There is a general need in the field for easy-to-use model development systems for rapidly developing machine-learned media models of high quality with minimal human dependency.

BRIEF DESCRIPTION OF THE DRAWINGS

FIG. 7A illustrates an example graphical user interface that may be used to create a model experiment in the MDE, according to some embodiments.

FIG. 7B illustrates an example graphical user interface that may be used to view and control model experiments in the MDE, according to some embodiments.

FIG. 27 illustrates an example graphical user interface in the model diagnosis system that provides a model diagnosis report for a ML media model, according to some embodiments.

Figure 1:
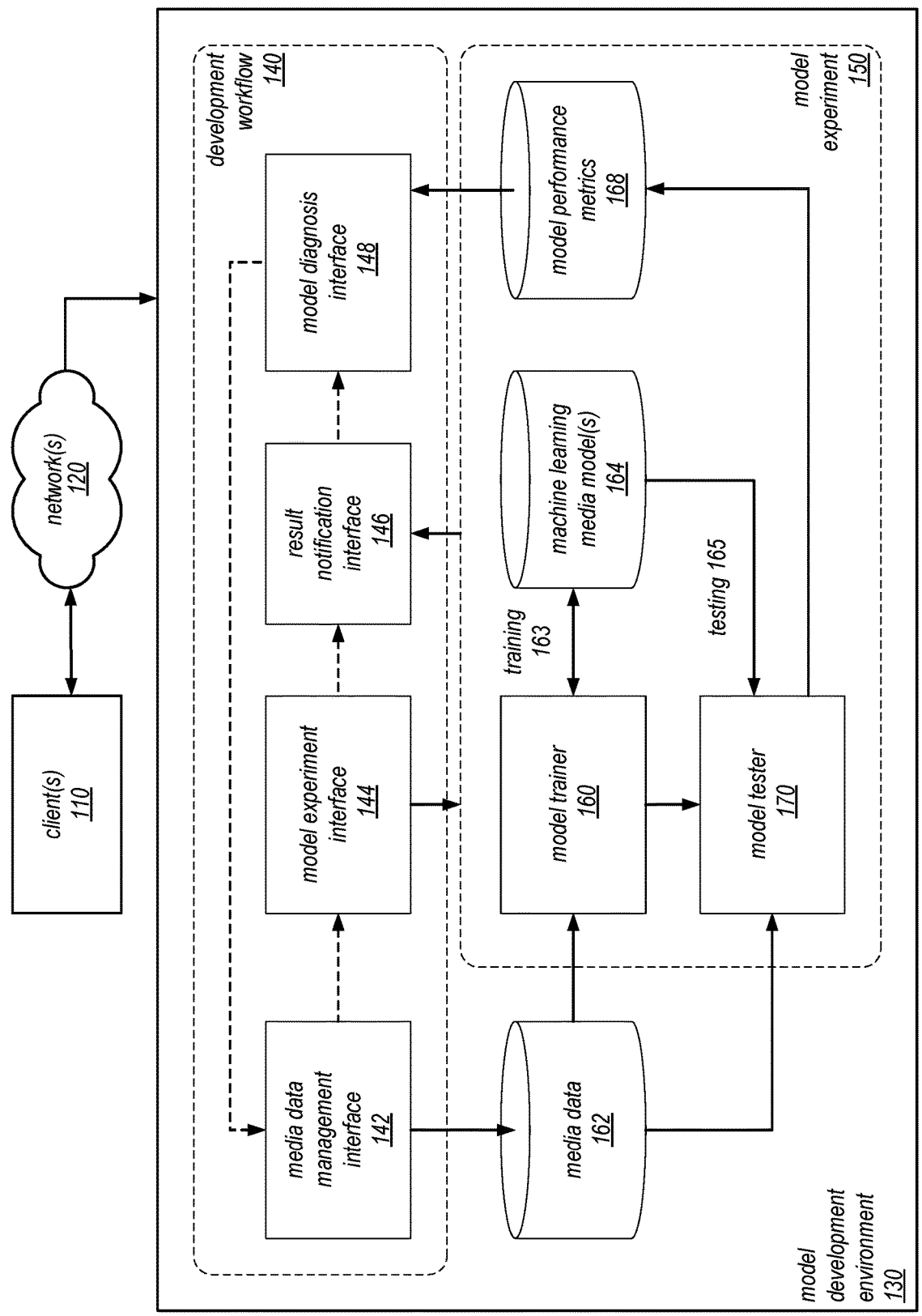
FIG. 1 is a block diagram illustrating an example machine learning (ML) model development environment (MDE) that allows users to develop models through iterative model experiments, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to implement a machine learning (ML) media model development environment (MDE) that improves upon the functioning of convention model development systems. Embodiments of the MDE disclosed herein implements an interactive and iterative workflow to allow users to develop models through repeated model experiments. In embodiments, the MDE provides a number of graphical user interfaces that greatly simplify model development tasks and automates steps in the model development process. For example, in some embodiments, the MDE provides a media annotation interface that allows users to quickly annotate and make changes to training data for models. In some embodiments, the MDE provides a model experimentation interface that allows users to configure and run model experiments, which performs a training run of a model and then tests the model to determine its performance. In some embodiments, the MDE provides a model diagnosis interface to present the model's performance metrics and allows users to visually diagnose the model's exhibited errors. Through its collection of user interfaces, the MDE defines a model development workflow that frees data scientists from the tedious manual tasks associated with traditional methods of model development, thereby improving model quality and reducing development times. Additionally, the MDE enables both software development engineers and business users with little previous machine learning experience to build ML models via a set of intuitive user interfaces with little or no coding required. The MDE thus democratizes the traditionally difficult task of ML model building.

Embodiments of the MDE implement computer functionality may be implemented to provide the following benefits:

Fast data annotation: ML media systems that employ neural networks are often data hungry. Depending on the context, ML media models may require large amounts of media samples for training, evaluation, and testing. With embodiments of the MDE disclosed herein, users can quickly annotate large amounts of media samples and version control them for repeatable access during model development.

Quick iterations: Since machine learning involves empirical analysis, it is important to iterate quickly. Embodiments of the MDE disclosed herein enables its users to automate many steps in the model development process and to easily manage and track towards development goals and sub-goals (e.g. milestones). The MDE provides a number of tools to close loop and quickly iterate over experiments to converge towards the most optimal model.

Choice of algorithms: Embodiments of the MDE are interoperable with different cloud-based machine learning services that offer a variety of media models and training tools. Such cloud-based services may be invoked as part of the core system of the MDE to leverage a wide variety of machine learning algorithmic solutions. In some embodiments, the functionality of the MDE may be easily extended via extensions in the cloud-based services.

Intuitive progress interface: In some embodiments, the MDE allows users to see and track the progress of their experiments, simulations, and data creation jobs in near real-time. In some embodiments, the MDE allows these jobs to run largely unsupervised. In some embodiments, the MDE may generate notifications to users at certain critical points of a job execution.

Customizable metrics: In some embodiments, the MDE may implement functionality to compute an array of different accuracy metrics to be used to track model performance. Such performance statistics may include metrics such as precision, recall, and F1 scores, AUC (Area Under the Curve), ROC (Receiver Operating Characteristic), MAP (Mean Average Precision) scores. Functionality to compute these metrics may be pre-implemented in the MDE. In some embodiments, the system is extensible to allow a user to introduce additional customized metrics logic.

One click training and deployment: In some embodiments, the MDE takes the ease of training and deployment of ML media models to the next level via simplified user experience design. For example, although model training jobs may be executed using provisioned machines and a rich layer of sophisticated software tools, the user may remain largely unaware of such low-level details. The MDE spares the user from having to deal with the complexities of the underlying computing system. In some embodiments, the MDE may be implemented as a fully managed cloud-based solution. The solution may be implemented to require minimal prior experience from its users and guide the user through the model development process with little or no coding required.

Easy debugging and close looping: With embodiments of the MDE, novice users may treat the sophisticated ML media models as black boxes. In some embodiments, the MDE provides intuitive user interfaces to allow even novice users to gain insight into the characteristics of models. For example, some embodiments of the MDE may provide saliency maps for images or other media samples, which allow a user to derive insights regarding the reasons behind a model's decisions.

Pluggable interfaces: In some embodiments, the MDE provides multiple levels of interfaces for programmatic extension. Such interfaces allow the system to receive benefit from client contributions and make it available to others. New algorithms, modules, and models are easy to inject into the platform and remain managed by the platform.

Multitenant with client isolation: In some embodiments, the MDE may be implemented as a multitenant service that is hosted in the cloud. Many users can use the system at the same time and run jobs on the platform in parallel. In some embodiments, the MDE allows multiple people (e.g., annotators, data scientists, managers, etc.) to work together on the same problem to create the best possible model. In some embodiments, multitenancy is supported through client isolation, so that any failure on one client's infrastructure should not affect the work of another.

Additionally, embodiments of the MDE disclosed herein include features that improve upon the functioning of conventional model development or diagnosis systems. Such improvements include for example the following:

Preventing costly developer errors: In conventional model development systems, developers maintained disparate code, maintaining and measuring their respective models subjectively through good intention-based mechanism. However, errors with coding and hyperparameter setting are common. Such errors can cause large delays during the development process. With the MDE's automated workflows, in some embodiments, the average model development time can be drastically reduced.

Faster annotation: With conventional model development systems, data scientists spend close to 80% of their time on preparing and managing data for analysis. The preparation and management of such data is in some cases a largely manual and highly error-prone process, causing errors to be introduced into the data. These errors can have significant adverse effects on the learning process. In some embodiments, the MDE provides a bulk tagging service with active learning to quickly annotate datasets. In some embodiments, the MDE may automatically group similar media samples using an iteratively trained classifier so that users can batch-tag all similar media samples at once. Annotation using the classifier also improves the computational performance of annotation system. Such improvements may include reducing internal calls between system components, reducing network traffic and/or latencies, and improving computational efficiencies. In some embodiments, the MDE implements data visualization techniques such as PCA (principal component analysis) and t-SNE (T-distributed Stochastic Neighbor Embedding) to help locate outlier media samples, allowing the user to easily identify and address these media samples.

Improved collaboration and project management: An optimal and robust ML media model development system requires expertise in multiple fronts. In many cases, experts in computer vision, big data, statistics, analytics, math, auditing, business, and project management must collaborate to build a solution. In some embodiments, the MDE provides one or more review modules that allows the collaborators to jointly track and analyze a model's performance. If performance meets expectations, one team member may authorize the model and easily move the model to production. In some embodiments, the MDE allows users to perform periodic audits on production traffic in order to help the production model to adapt to data whose characteristics change over time. In some embodiments, the MDE employs a federated model, allowing users to share their model by marking them public and encouraging other users to join the platform.

Providing novel insights into the model: With the growing use of ML media models, there is increasing interest on understanding the reasons behind a model's predictions. Such understanding is important to gain trust in the model or plan a further course of action based on a prediction. Embodiments of the MDE herein implements an insights module that allow a user to easily and intuitively diagnose problems with a model, and infer corrective actions from the user's diagnosis to improve the accuracy of the overall system via either modification of the dataset or changes to the model architecture itself. In some embodiments, the MDE incorporates a LIME (Local Interpretable Model-Agnostic Explanations) or SmoothGrad technique to explain the predictions of classifier models. These features allow the user to visually see where and how the model is making mistakes in its decision making. Overall, the MDE employs a series of diagnosis views that makes diagnosing problems with a ML media model highly intuitive. For example, the MDE may utilize algorithms to highlight pixels in image samples that have the most influence on the model's prediction decisions.

Managed shadowing and deployment to production environment: In some embodiments, the MDE enables users to perform simulations based on historical production data to ensure model regression. In some embodiments, the MDE provides user interfaces that allow users to compare the ongoing model performance with its peers and facilitate production deployment through a pipeline. In some embodiments, the MDE may provide adapters to listen to production audit traffic, create necessary alarms, and notifications.

The MDE may then aggregate and surface production aberrations as an anomaly to the user. In some embodiments, a push notification mechanism allows users to immediately receive the data needed to proactively fix a model or data issue.

Faster response to attacks: The vulnerability of a neural network to adversarial attacks is an important concern in deploying models in production environments. In some cases, a model's output can be manipulated to produce wrong predictions in critical situations. In some embodiments, the MDE herein can be used to quickly debug such attacks. For every prediction, the MDE may provide a saliency map that provides clues on which regions in the media sample were influential for that particular prediction. In response, the model owner may take corrective action such as adversarial training or gradient masking. As another example, the model owner may elect to change the model architecture itself. In some cases, the model architecture can be trained to identify an adversarial sample, allowing the model's prediction to be withheld and the attacker to be blacklisted.

As may be readily appreciated by those skilled in the art, the MDE described herein introduces a number of novel features that improve upon the functioning of conventional model development systems, which are not limited to the discussion provided above. Additional features and benefits of the MDE are described below, in connection with the drawings and their descriptions.

FIG. 1 is a block diagram illustrating an example machine learning media model development environment (MDE) that allows users to develop models through iterative model experiments, according to some embodiments. As shown, in some embodiments, the model development environment 130 may be accessed over a network 120 by many clients 110. In some embodiments, the MDE 130 may be provided by a service provider network that hosts the MDE 130 as one or more provided services.

In some embodiments, the service provider network hosting the MDE 130 may provide computing resources via one or more computing services to the client(s) 110. The service provider network and MDE 130 may be operated by an entity to provide one or more services, such as various types of cloud-based computing or storage services, accessible via the Internet and/or other networks to client(s) 110. In some embodiments, the service provider network or MDE 130 may implement a web server, for example hosting an e-commerce website. The service provider network may include numerous data centers hosting various resource pools, such as collections of physical and/or virtualized computer servers, storage devices, networking equipment and the like, needed to implement and distribute the infrastructure and services offered by the service provider network. In some embodiments, the service provider network may provide computing resources to clients. These computing resources may in some embodiments be offered to client(s) 110 in units called "instances," such as virtual compute instances.

The client(s) 110 may encompass any type of client configurable to submit requests to the service provider network. For example, a given client 110 may include a suitable version of a web browser or may include a plug-in module or other type of code module configured to execute as an extension to or within an execution environment provided by a web browser. Alternatively, a client 110 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 110 may be configured to generate network-based services requests according to a Representational State Transfer (REST)-style network-based services architecture, a document- or message-based network-based services architecture, or another suitable network-based services architecture. In some embodiments, the service provider network or MDE 130 may offer its services as web services, and the client(s) 110 may invoke the web services via published interfaces for the web services. In some embodiments, a client 110 (e.g., a computational client) may be configured to provide access to certain aspects of the MDE 130 in a manner that is transparent to applications implemented on the client(s) 110 utilizing computational resources provided by the service provider network.

In some embodiments, the client(s) 110 may convey network-based services requests to the service provider network or MDE 130 via network 120. In various embodiments, network 120 may encompass any suitable combination of networking hardware and protocols necessary to establish network-based communications between clients 110 and service provider network or MDE 130. For example, a network 120 may generally encompass the various telecommunications networks and service providers that collectively implement the Internet. A network 120 may also include private networks such as local area networks (LANs) or wide area networks (WANs) as well as public or private wireless networks. For example, both a client 110 and the MDE 130 may be respectively provisioned within enterprises having their own internal networks. In such embodiments, the network 120 may include the hardware (e.g., modems, routers, switches, load balancers, proxy servers, etc.) and software (e.g., protocol stacks, accounting software, firewall/security software, etc.) necessary to establish a networking link between the client 110 and the Internet as well as between the Internet and service provider network. In some embodiments, client(s) 110 may communicate with service provider network or MDE 130 using a private network rather than the public Internet.

In some embodiments, the service provider network hosting the MDE 130 may host a plurality of different services for the client(s) 110. For example, one of the services may include a machine learning service. In some embodiments, the MDE 130 may be implemented within or as a part of the machine learning service.

As shown, the MDE 130 may implement or be configured to generate a number of user interfaces to implement a development workflow 140. These user interfaces include a media data management interface 142, a model experiment interface 144, a result notification interface 146, and a model diagnosis interface 148. Depending on the embodiments, these interfaces may be graphical user interfaces or other types of user interfaces. In some embodiments, these interfaces are generated as web interfaces that are dynamically generated by the MDE 130 and sent to the clients 110 as webpages to be displayed on web browsers. In some embodiments, the user interfaces shown may be implemented as portions of webpages or areas within a larger GUI widget, which may be updated within the larger webpage or the GUI widget. In some embodiments, the interfaces shown may comprise a series of multiple webpages or GUI widgets. In various embodiments, these user interfaces may include some of the user interfaces illustrated in FIGS. 6, 7A, 7B, 8, 9, 10, 14, 15, 16, 17A, 17B, 18, 22A, 22B, 23, 24, 25, 26, and 27.

In some embodiments, the media data management interface 142 may be used by a user to interactively manage media data that are used to create data sets to train, validate, or test ML media models. In some embodiments, the interface 142 may be used to search for, obtain, download, or upload media samples. In some embodiments, the interface 142 may be used to edit individual media samples, for example, adjusting the size, color, resolution, orientation, dimensions, etc. of individual media samples. In some embodiments, the interface 142 may allow a user to change the properties of a large group of media samples in bulk. In some embodiments, the interface 142 may allow users to generate augmented data sets by random adjusting certain features in the media samples.

In some embodiments, interface 142 may allow users to interactively or programmatically label media samples with annotations, labels, or tags that classify media samples into different desired classes. In some embodiments, the interface 142 may employ an active learning classifier that learns the user's annotations for some small sample of media, and then uses the classifier to automatically label the rest of the media samples. In some embodiments, the interface 142 may also allow a user to visually inspect and analyze the media samples, both before and after the annotations.

In some embodiments, once a set of media samples are labelled, the interface 142 may allow users to divide the media samples into data sets for model development processes. For example, the interface 142 may allow users to specify how to create one or more training sets, validation sets, or test sets of media samples for a given model development projection. In some embodiments, the creation of data sets may be performed in a largely automated fashion, based on certain user-specified parameters, such as the size of the data sets, proportions of classes in each set, etc. As shown, all of the media data (including annotations and data set metadata) may be saved in a media data repository 162. In some embodiments, the media data repository may be provided by a data storage service, which allows for the data to be easily organized and queried. In some embodiments, the interface 142 can manage multiple versions of datasets and these versions can be used independent of each other in MDE 130.

As shown, the MDE 130 may implement a model experiment interface 144. As discussed, in some embodiments, the interface 144 may comprise a series of webpages and/or GUI widgets. In some embodiments of the MDE 130, model development is performed using a series of model experiments 150. Experiments may be performed iteratively to train and test a model in one iteration, saving the resulting model at each iteration as one development version. The process is repeated until a satisfactory version of the model is obtained.

In the media modeling context, the models in question typically comprise neural network models. The ML media models may be used to perform a variety of media analysis tasks, such as image classification, object detection, semantic segmentation, or video, text, or speech processing. In some cases, the models may be deep neural networks or convolutional neural networks, as known in the art. In some embodiments, the MDE 130 may provide a library of model architectures for ML media models, some of which may have already been trained extensively to make a large variety of decisions about media data.

A model experiment may involve a single ML media model, which is trained in one or more training runs using one or more training data sets, and then tested using one or more training data sets. As shown, the MDE 130 may implement a model trainer 160, which may be implemented using one or more computing nodes in the MDE service to perform a training 163 on the ML media model, where parameters of the model are updated to improve model performance on making decisions or predictions about the media samples in the training set. When the training is completed (which may be determined programmatically in some embodiments), the ML media model may be tested 165 using a model tester 170, as shown. The model tester 170 may be implemented using one or more other computing nodes in the MDE service. However, during the testing phase of a model, the model itself is not changed. Rather, the test generates test results, which are saved as model performance metrics to be analyzed. As shown, the ML media models may be stored in a ML media model repository 164, and the model performance metrics may be stored in a model perform metrics repository 168. In some embodiments, both of these data stores may be provided by cloud-based data storage services, which may be provided by the service provider network.

In some embodiments, the training or the testing of the ML media model may be performed by the MLS (machine learning service), which may be provided by the service provider network. In some embodiments, the MLS may be used to perform discrete jobs specified by a client. In some embodiments, the MDE 130 may programmatically submit jobs to the MLS using an orchestrator. In some embodiments, the orchestrator may allow the user to have control over the progress of each training or testing job, and view the progress of the model training or testing jobs.

In some embodiments, the model experiment interface 144 may allow the user to specify a variety of model experiment parameters, and then launch a model experiment. For example, an experiment definition user interface may allow a user to select a model for the experiment, which may be a model that was the result of a previous experiment, stored in the model repository 164. The experiment definition interface may also allow the user to select one or more data sets to use for the experiment. In some embodiments, the experiment definition interface may allow the user to specify one or more validation runs of the model, using a validation data set that is separate from the training or testing data sets.

In some embodiments, model validation runs may be used to perform tasks such as to auto-tune the model's hyperparameters. As another example, a validation run may be used to determine whether overfitting has occurred for a model. In some cases, when a model continues to improve against the training data set but stops improving against a validation data set, this condition may suggest that the model is starting to overfit the training data. In some embodiments, this test for overfitting may be performed periodically during a model's training phase, and be used to determine when training should be stopped.

In some embodiments, the model experiment interface 144 may allow a user to specify a model experiment on a production model instance that is currently running in a production environment. For example, the MDE 130 may implement an auditing process for production models, that may periodically test production model against real or artificial input data, to verify that the production model is behaving sufficiently well against the test data.

In some embodiments, once an experiment has been launched, the model experiment interface 144 may allow a user to track and control the running experiment. In some embodiments, the interface 144 may allow users to view different properties of a running job, such as the running time and percentage to completion of the experiments. In some embodiments, the interface 144 may allow a user to control a running experiment, such as to pause or restart an experiment, stop an experiment completely, or restart an experiment from the beginning.

In some embodiments, the model experiment interface 144 may also allow user to display model experiments in an organized way, for example, by grouping related experiments together, or by ordering some experiments in developmental order. These views allow the model developer to better visualize the progress of the overall model development process. In some embodiments, related experiments may be grouped by "goal" groups or "milestone" groups. In some embodiments, the resulting performance of related groups of experiments may be plotted in a graph over iterations, so that the user can see progress in the development process in terms of improvements in a variety of performance metrics.

As shown, in some embodiments, the MDE 130 may implement a result notification interface 146. In some embodiments, a notification may be sent to a user (e.g. a user that has registered to receive notifications from the MDE) when a model experiment has completed. In some embodiments, notifications may also be sent for other types of events, for example, when an experiment terminated unexpectedly in an error, or when certain training conditions are met (e.g., when a threshold accuracy level is reached). The result notification interface may comprise a notification such as a text, an email, or the like. In some embodiments, the notification may include a webpage providing a summary of information about the experiment, such as the performance of the model at the end of the experiment.

As shown, in some embodiments, the MDE 130 may provide a model diagnosis interface 148. As with the other interfaces of the MDE, the diagnosis interfaces may also include a series of multiple GUIs or webpages. In some embodiments, the model diagnosis interface may be used to generate a body of performance metrics from the model performance metrics in the repository 168. For example, the performance metrics that are generated may include precision, recall, F1-score, among other types of metrics. The interface 148 may allow users to view the performance metrics in different ways, for example, organized according to media class, compared to other models, etc.

In some embodiments, the diagnosis interface 148 also allows a user to visually analyze the performance of the model that was the subject of the experiment. In some embodiments, the diagnosis interface 148 may allow to examine test media samples that were mishandled by the model and determine, using a variety of visual analysis tools, to determine the reasons for the errors. For example, in some embodiments, the diagnosis interface 148 may provide saliency maps and bounding boxes for particular media samples to indicate which areas on the media sample contributed the most to a model's decision. In some embodiments, the diagnosis interface 148 may obtain analytical feedback from the user, and then synthesize the feedback to infer certain corrective actions to take for a next iteration of model experiment. For example, in some embodiments, the diagnosis interface may indicate one or more adjustments to the training data set, or one or more changes to the model architecture of parameter values.

Together, the four example interfaces 142, 144, 146, and 148 in the MDE create a development workflow 140 to iteratively improve ML media models. For example, a model developer may import and annotate a corpus of media samples for a model project using interface 142 on Monday, start a model experiment using interface 144 on Tuesday, receive notification of experiment completion via interface 146 on Wednesday, spend the next two days analyzing the results of the experiment using interface 148, and then decide the parameters for a next model experiment to be started the following week. The workflow 140 thus streamlines the process of ML model development, allowing ML media models to be developed quickly, with relatively little manual labor and supervision from the model developers.

Figure 2:
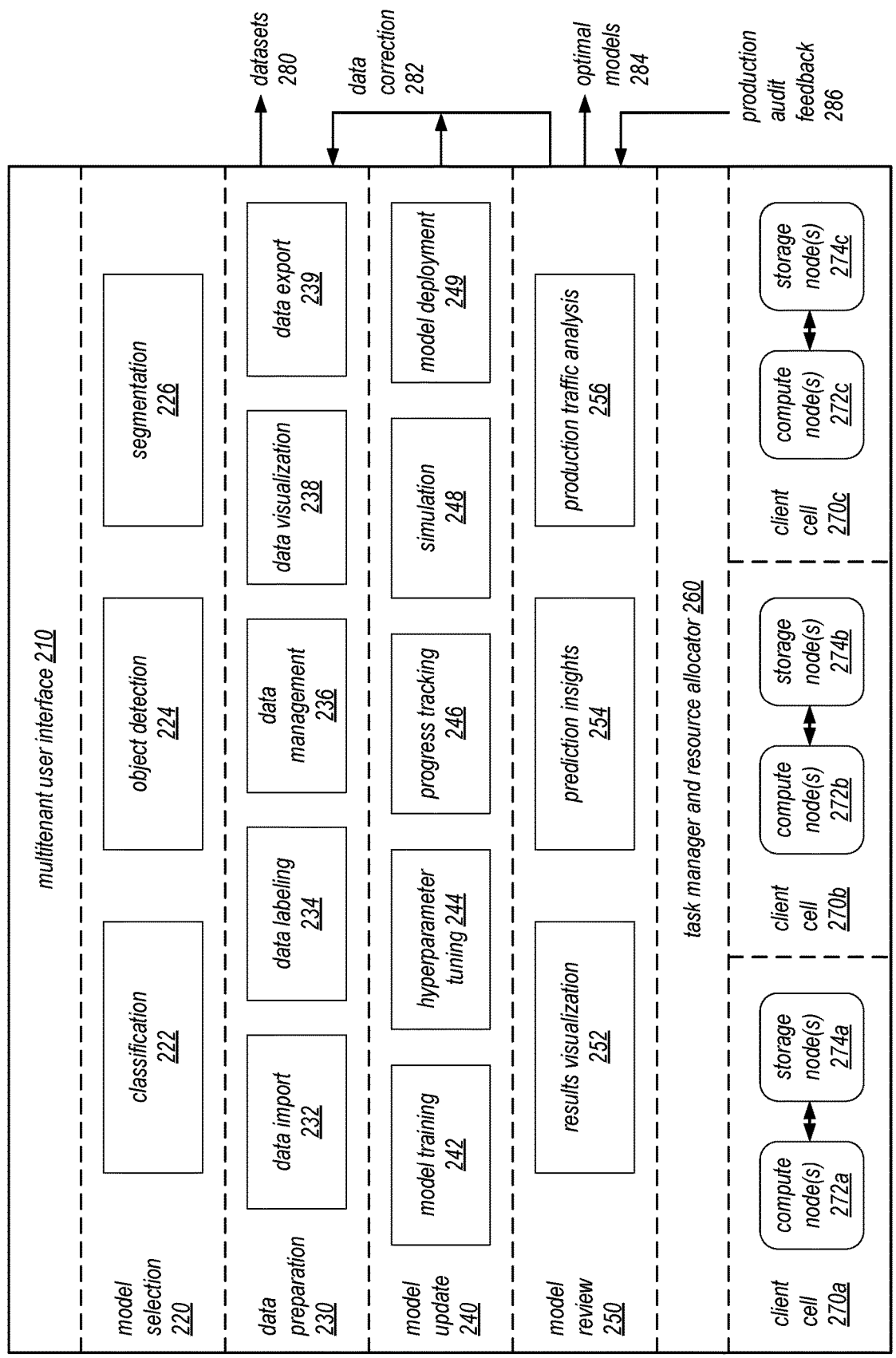
FIG. 2 is a block diagram illustrating an example multi-layered architecture for a ML media model development environment that allows users to develop models through iterative model experiments, according to some embodiments.

FIG. 2 is a block diagram illustrating an example multi-layered architecture for a ML media model development environment that allows users to develop models through iterative model experiments, according to some embodiments.

As shown, in embodiments of the MDE (e.g. MDE 130 of FIG. 1), components of the environment may be implemented in layers. In some embodiments, these layers may track the general workflow (e.g. developer workflow 140 of FIG. 1) of the model development process. In this example, the illustrated components are divided into a model selection layer 220, a data preparation layer 230, a model update layer 240, and a model review layer 250. In each layer, the components may center around a particular repository. For example, the model selection layer 220 may access a model repository of preexisting models. The data preparation layer 230 may be centered around a media data repository that stores media data sets for model development, such as repository 162 shown in FIG. 1. The model update layer 240 may center around a model repository housing models being updated and tested, for example the model repository 164 of FIG. 1. Finally, the model review layer 250 may be centered around a repository storing performance results of the models, which may be repository 168 of FIG. 1. As may be appreciated by those skilled in the art, the actual implementation of the MDE may vary depending on the embodiment, and other implementation architectures may be used in other embodiments without departing from the spirit of the inventions described herein.

As shown, the component layers of the MDE may be implemented between a multitenant user interface 210 and a task manager and resource allocator interface 260. In some embodiments, the multitenant user interface 210 may provide different interactive user interfaces for users of the MDE. Such interfaces may allow users to interact and configure the different components in the layers 220, 230, 240, and 250. Examples of such user interfaces may include for example interfaces 142, 144, 146, and 148 of FIG. 1. As discussed, in some embodiments, the user interfaces may be implemented as webpages that are generated by one or more web servers for one or more web browsers. In some embodiments, the user interface may comprise one or more GUI windows or widgets. In some cases, the user interface may be an email or text user interface. In some embodiments, the multitenant user interface 210 may also expose a programmatic interface such as an API or a web service call interface. In some embodiments, the MDE may be implemented as a multitenant service that allows different types of users to collaborate. For example, in some embodiments, the MDE may allow users to store a model development project, which stores one or more model iterations, associated data sets, and experiment performance results. In some embodiments, the MDE may provide access to the project to different users, allowing the users to use the user interfaces of the MDE to work on the project (e.g. annotate data, run experiments, perform model diagnosis, etc.).

The multitenant user interface 210 allows many users or clients to use the underlying components of the MDE in parallel and in isolation. In some embodiments, the MDE may provide the functions of the underlying components without a particular user being aware of other users on the system. In some embodiments, users or clients to the MDE may be assigned a user or client ID, so that their activities within the system may be tracked or logged by the system.

As shown, the layers of the MDE may be supported by computing resources. In some embodiments, the computing resources used by the components may be provisioned on-demand via the task manager and resource allocator interface 260. In some embodiments, the interface 260 may allow the components to launch or spawn jobs or tasks. In response to these tasks, a resource allocator may be configured to acquire and configure the resources needed for the tasks, and eventually release the acquired resources when the tasks are completed. In this manner, the components in the upper layers do not have to be concerned with the details of computing resource acquisition. In some embodiments, the task manager and resource allocator interface 260 may be implemented via a cloud-based service provider network that is designed to provides storage or computing resources to clients on demand. In some embodiments, the resource allocator may be part of a machine learning service (MLS) as discussed, which may be configured to execute specialized machine learning jobs.

As shown, in some embodiments, the computing resources provided by the resource allocator 260 may be provided in client resource cells, such as cells 270*a-c*. For example, in some embodiments, each tenant working in the MDE may be provided a dedicated sandbox of computing resources. In some embodiments, multiple users or user groups may be provided a distinct client cell 270. In some embodiments, a client cell 270 may persist on a per-session, per-task, or per-experiment basis. In some embodiments, the client 270 may be indefinitely provisioned to a client until it is explicitly released. By dividing the client resource into cells, the MDE provides enhanced robustness to the system, so that any failure within one client cell does not impact the work of another cell.

As shown, in each cell 270, the allocator may provide a pool of compute nodes 272 and a pool of storage nodes 274. In some embodiments, these nodes may be implemented as virtual machine instances that are hosted on physical hosts owned by a service provided network. In some embodiments, the data used by a particular client or tenant may be stored in a dedicated database instance for the client or tenant. In some embodiments, the number of the nodes in the cell may automatically scale to match the needs of the client cell. Accordingly, the MDE is highly scalable to be able to handle extremely large model development projects in the same way that it handles very small projects.

Referring now to layer 220, in this example, the model selection layer 220 implements the components 222, 224, and 226, which may be used to initialize a model development process. As may be understood, ML media models commonly fall into three categories: media classification, object detection, and semantic segmentation. In image classification, a ML model is used to determine a classification for a media sample (e.g. an image), where the classification is a label or annotation chosen from a set of labels or annotations. In object detection, a ML media model is used to determine whether a particular object (e.g. a car) is present in an image, and then identify the region in the image where the object is detected. In semantic segmentation, a media sample (e.g., every pixel in an image) may be classified into regions with different semantic labels (e.g., street, car, sky). In some cases, one type of media model may be constructed by composing another type of media model. For example, a ML media model for classifying human faces as male or female may be constructed based on a semantic segmentation model that accurately segments images of human faces. Despite the differences in these models, the underlying model structure for these three types of prediction tasks are largely similar (e.g., multilayered neural networks). Accordingly, many of the tool that are used to develop these models may be reused across these tasks. In model selection layer 220, the MDE provides a classification model component 222 which allows a user to import, initialize, or configure a ML media model to perform media classification. Likewise, the object detection model component 224 may be used to import, initialize, or configure an object detection model. Likewise, the segmentation model component 226 may be used to import, initialize, or configure a semantic segmentation model. In some embodiments, these models may be selected from a library of previously developed models, which may be publicly available or available to different members of a same team.

As shown, the data preparation layer 230 implements a number of components related to the manipulation and management of data (i.e., media datasets) for the machine learning models. For example, the data import component 232 may allow a user to quickly load a large number of media samples into the system. In some embodiments, the import may perform certain processing on each sample, for example, to normalize the size, color, resolution, etc., of incoming image samples. In some embodiments, these types of imports may be executed long-running jobs. In some embodiments, the samples used by the MDE may be exported using the data export component 239 so that they can be used by another system. In some embodiments, the media samples may be exported with metadata that are stored with the samples in a format that is accepted to the receiving system.

In some embodiments, the data labeling component 234 may allow users to quickly annotate a large number of new media samples. This is traditionally a tedious task for model developers. In some embodiments, the data labeling component 234 may use an active learning classifier that learns the annotation behavior of a user, so that after a certain point, the classifier can take over the user annotation task to extrapolate labels for all samples. In some embodiments, a data visualization component 238 may be used to view a set of media samples or dataset. This task may be performed to audit the labels assigned to media samples, for example. Finally, in some embodiments, the data management 236 component may be configured to perform a host of different tasks such as dividing a set of media samples into datasets, allowing users to enter descriptive metadata for the datasets, augmenting datasets, analyzing the datasets using different techniques, etc. As shown, the datasets generated by the components in the data preparation layer may be saved through interface 260 to a dataset repository for use by model experiments.

As shown, the model update layer 240 may implement a number of components related to the updating of the model itself. For example, the model training component 242 may be used to perform model training on a ML media model using a training data set. During training, the model's parameters may be updated to gradually tune the model to make correct decisions on the training data set. In some embodiments, the training may be performed as a long-running training job on a set of computing nodes provided by the resource allocator 260. In some embodiments, a model may be trained multiple times, and then be evaluated with model tester component, which may also be executed computing nodes provided by the resource allocator 260.

In some embodiments, the MDE may implement a hyperparameter performance tuning component 244, which may be configurable by the user. In some embodiments, as a separate step from model training or during model training, certain hyperparameters of the model may be adjusted via another data set (e.g., a validation data set) that is distinct from the model's training or test data set. For example, hyperparameters may indicate tunable values such as the number of hidden layers in a neural network, the number of nodes in each layer, etc.

In some embodiments, the model update layer 240 may include a progress tracker component 246, which may be used to track and report the progress of a model development project. In some embodiments, the iterations of ML media models may be grouped and their performance results may be viewed together in a graph, showing the progress of model development over time.

In some embodiments, the model update layer 240 may include a simulation component 248. The simulation component may allow a model under development to be simulated against a production model using production data (e.g., real images from a production environment). The media samples from the production environment may be truth labeled so that performances of both the production model and the model under development may be viewed and compared.

In some embodiments, the model update layer 240 may implement a model deployment pipeline 249. The deployment pipeline may involve one or more user approval processes. Once approved the deployment pipeline may package the resulting model for deployment into a production environment.

As shown, the model review layer 250 in this example includes three components. In some embodiments, the results visualization component 252 may obtain the raw results of experiments and then compute various performances metrics for the model in the experiment. Such metrics may include for example, precision, recall, accuracy metrics, etc.

In some embodiments, the prediction insights component 254 may generate interactive user interfaces that presents the performance metrics in a way to allow a user to gain additional insight about the decisions made by the model. In some embodiments, the prediction insights component may allow users to compare misclassified media samples with its closest matching samples from the correct class in the training set and the incorrect class in the training set. In some embodiments, the prediction insights component may allow users to view a saliency map of a mishandled sample, showing the regions in the media sample that contributed to the model's erroneous decision. In some embodiments, the prediction insights component may allow users to provide analytical feedback during their visual inspections of the performance results, and then infer certain corrective actions to take for a next iteration of model experiment. As shown, the corrective actions may involve data corrections 282, which uses the data preparation layer 230 to make changes to the data sets for the next model iteration. If the performance metrics indicate that the model is behaving satisfactorily, the model may be saved as an optimal model 284.

In some embodiments, the model review layer 250 may include a production traffic analysis component 256. The production traffic analysis component 256 may be configured to launch a model in a shadow mode and perform A/B testing by consuming partial audit traffic feedback 286 to forecast model behavior in production. Additionally, the component 256 may allow users to compare model performance statistics, perform regression test and upgrade to production with just a few clicks. In some embodiments, the MDE is able to observe production model behavior and perform periodic audits of the production model using model experiments conducted within the MDE. When aberrations or excessive errors are detected, the MDE may be configured to notify users such as the production model's owners.

Figure 3:
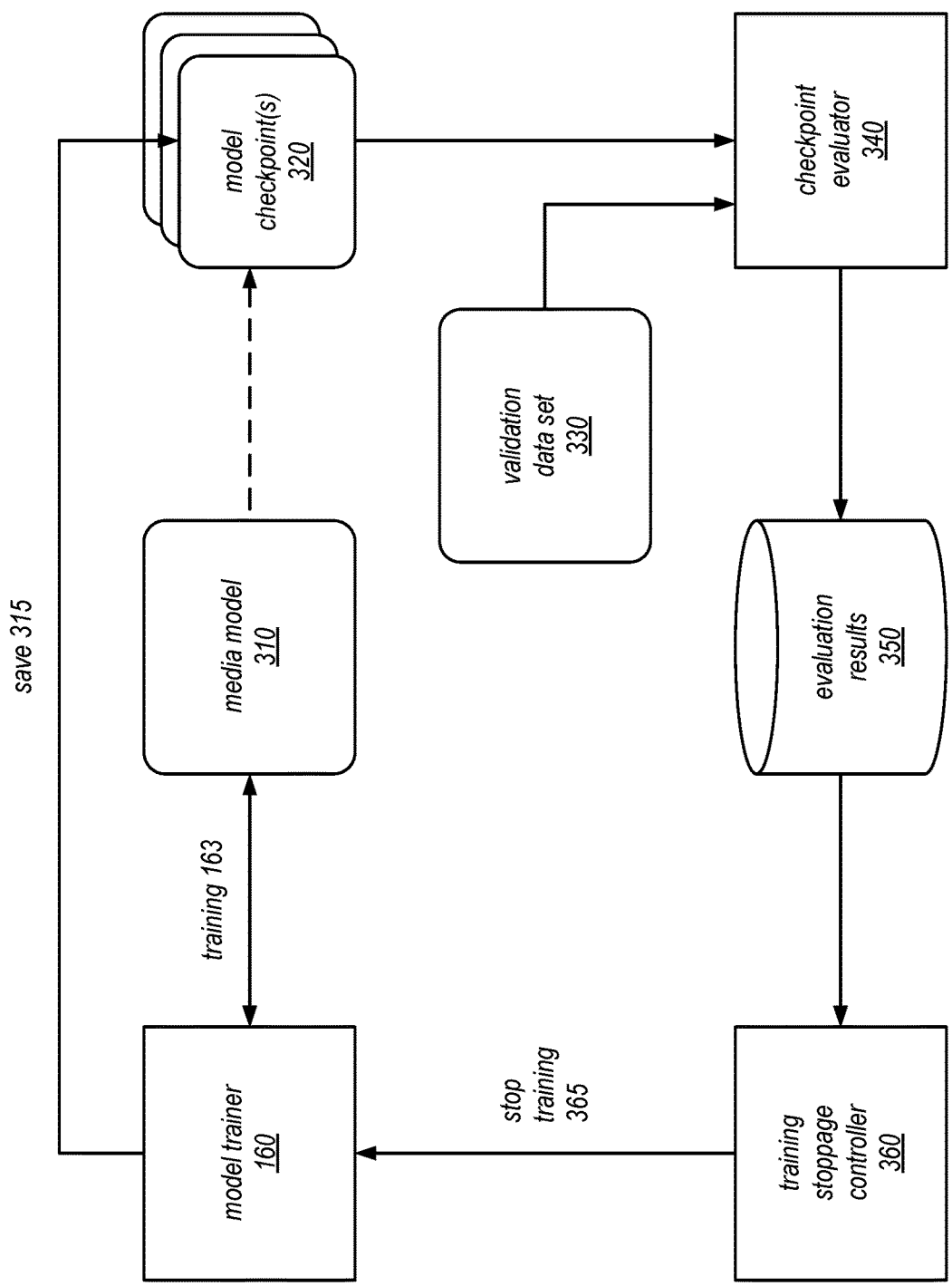
FIG. 3 illustrates an example model checkpoint evaluation process to determine a stopping point for model training in the MDE, according to some embodiments.

FIG. 3 illustrates an example model checkpoint evaluation process to determine a stopping point for model training in the MDE, according to some embodiments.

In some embodiments, the MDE may implement a checkpointing feature where, during the training of a ML media model, periodic checkpoints of the model are saved. The periodic checkpoints are then evaluated against an evaluation or validation data set, which is distinct and independent from the training data set. The evaluation or validation results of the model during training (e.g., the checkpoints) are tracked and then used to determine a stopping point for the training. For example, in some embodiments, when the model continues to improve against the training data set but stops improving or begins to degrade against the validation or evaluation data set, this may indicate that an overfitting of the model to the training data set has begun to occur. At that point, the MDE may determine to automatically stop the training process.

As shown in the figure, in some embodiments, the model trainer 160 may perform training 163 to update a media model 310, which may involve gradually updating the model. As shown, during the course of the training model checkpoints 320 are saved 315. In some embodiments, these checkpoints 320 may be saved at regular intervals (e.g. once every 15 minutes). In some embodiments, these checkpoints may be saved based on the model reaching certain performance threshold or at certain designated points during the training process. For example, a checkpoint may be taken every time that model hyperparameters are tuned during training.

For each checkpoint 320, the checkpoint is evaluated using a checkpoint evaluator 340, against a validation data set 330. In some embodiments, the validation data set 330 may be distinct and independent from the training data set. In some embodiments, the validation data set 330 may be created using a data management interface and may have approximately the same proportions of media classes or features as the training data set. In some embodiments, the checkpoint evaluator 340 may be implemented to run in a similar fashion as the model tester 170, as discussed in connection with FIG. 1.

As shown, evaluation results of the checkpoint evaluator 340 may be saved to an evaluation results repository 350. In some embodiments, the evaluation results repository 350 may be the same as or similar to the model performance metrics repository 168, as discussed in FIG. 1.

As shown, the process may then employ a training stoppage controller 360, which periodically examines the evaluation results of the checkpoints 320. In some embodiments, the controller 360 may examine the evaluation results once every checkpoint. In some embodiments, the controller 360 may examine the evaluation results at a slow rate (e.g., once every 10 checkpoints). In some embodiments, the training stoppage controller may apply a trend analysis, to determine if and when the model's performance against the validation data set 330 has peaked or plateaued. In some embodiments, based on its periodic examinations, the training stoppage controller 360 may cause the model trainer 160 to stop 365 its training.

In some embodiments, when the training is stopped, the optimal checkpoint of the model (e.g., one that exhibited the highest performance against the validation data or one that coincided with the beginning of a determined performance plateau) may actually not be the last checkpoint generated by the training Rather, the optimal checkpoint may be at a point before the training was stopped. In some embodiments, the training stoppage controller or another component may explicitly identify the one checkpoint as the optimal checkpoint and provide that as the end result of the training process. In some embodiments, some or all of the generated checkpoints and performance results data may be saved, so that they can be examined or reused later, or used to restart a portion of the training process.

Figure 4:
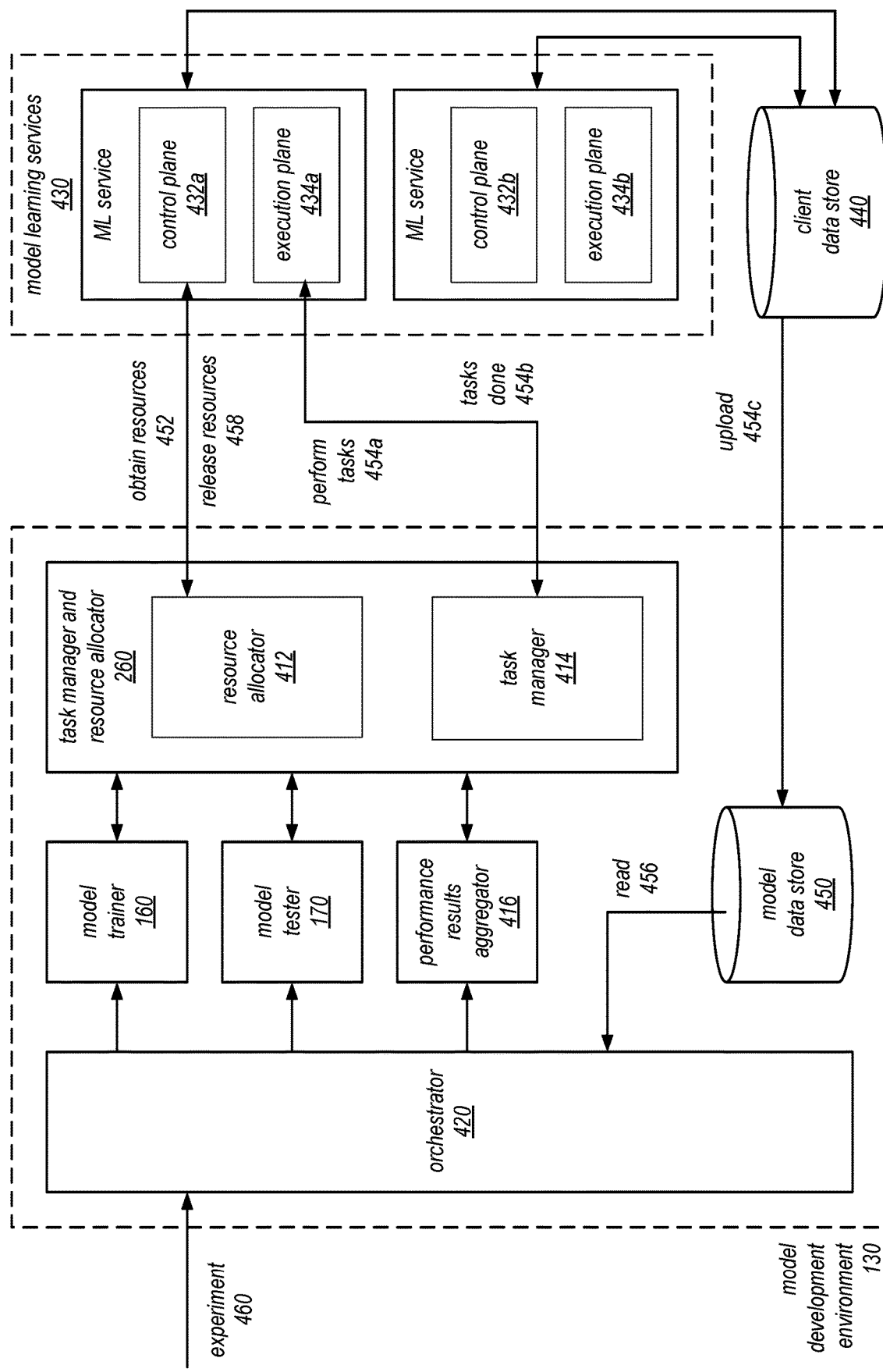
FIG. 4 illustrates an example orchestrator that may be implemented by the MDE to interact with a machine learning service to perform tasks within the MDE, according to some embodiments.

FIG. 4 illustrates an example orchestrator 420 that may be employed to interact with a machine learning service 430 to perform tasks within the MDE 130, according to some embodiments.

As shown, in some embodiments, an orchestrator 420 may be implemented as a chained process which may comprise steps to interact with the machine learning services 430 to perform tasks within the MDE 130 through task manager and resource allocator 260. As shown in example, in some embodiments, an individual model experiment may be modeled as series of steps using orchestrator 420 to perform training, testing and result aggregations steps. In some embodiments, the machine learning services 430 may have a service that is running in a same service provider network as the MDE 130. In some embodiments, the machine learning service may be configured to receive client tasks for specialized machine learning jobs, provision computing resources for these tasks, and perform the client tasks on the provisioned resources. In some embodiments, the use of the machine learning services 430 allows its client applications (e.g. the MDE 130 in this case) to be highly scalable and robust. In some embodiments, execution plane 434 of the machine learning services 430 may interact with the client data needed for experiment 460 from the client data store 440 managed by the client.

As shown, in some embodiments, the orchestrator 420 may integrate with task manager resource allocator 260 for a resource allocator 412. In some embodiments, resource allocator 412 interacts with a control plane 432 of the machine learning services 430 to obtain 452 resources (e.g. compute and storage nodes) for one or more jobs. In some embodiments, the control plane 432 may allow clients to specify the type, size, and configuration of computing resources needed by the client. The resource allocator 412 may determine the parameters for the provisioning or allocation of resources based on the properties of the requested task (e.g., the size of the model and the data set), a priority associated with the task, and other factors such as configured policies within the MDE 130. As shown, responsive to the request from the resource allocator 412, the machine learning services 430 may allocate a model execution plane 434 for the orchestrator 420. As shown, the resource allocator 412 may also be responsible for issuing a request to release the resources 458, which may be generated after the model experiment 460 is finished. In response, the machine learning services 430 may deprovision the resources in the model execution plane 434 for other uses.

As shown, in some embodiments, the orchestrator may integrate with task manager and resource allocator 260 for a task manager 414. In some embodiments, the task manager 414 may divide the data set into a number of chunks, and then for each chunk submit task 454a to the execution plane 434 of the machine learning services 430 to be executed. In some embodiments, dividing a data set into chunks allows the machine learning services 430 to better manage the tasks. In some embodiments, the division enables the orchestrator 420 to more easily control and track the experiment 460. In some embodiments, as shown, as each chunk of task is completed, the machine learning services 430 may provide a notification 454b back to the task manager 414, which may update its progress status metadata for the task and provide the notification to the orchestrator steps.

As shown, the model execution plane 434 may upload the results 454c for each chunk of task to the model data store 450. In some embodiments, the uploaded information may simply be the raw results (e.g. prediction or decision results) of the model. In some embodiments, as shown, a performance results aggregator 416 may integrate with task manager and resource allocator 260 to submit raw results aggregation task to the machine learning services 430 and generate performance metrics data on top of raw results. In some embodiments, both the raw results data and the performance metrics data may be stored in the same repository 450. In some embodiments, the performance metrics data may include metrics data such as precision, recall, accuracy, etc. In some embodiments, as shown, the orchestrator 420 may read the data 456 from model data store 450 as needed by the MDE 130.

Although in this example the orchestrator 420 is shown to orchestrate a model experiment as a combination of model trainer 160, model tester 170, and performance results aggregator 416, in some embodiments, the orchestrator 420 may also be used to interact with the machine learning services 430 to perform any combination of available processes needed by the MDE 130. For example, in some embodiments, the orchestrator 420 may be used to implement only a training process or only one or more validation processes for a model, as discussed previously.

Figure 5A:
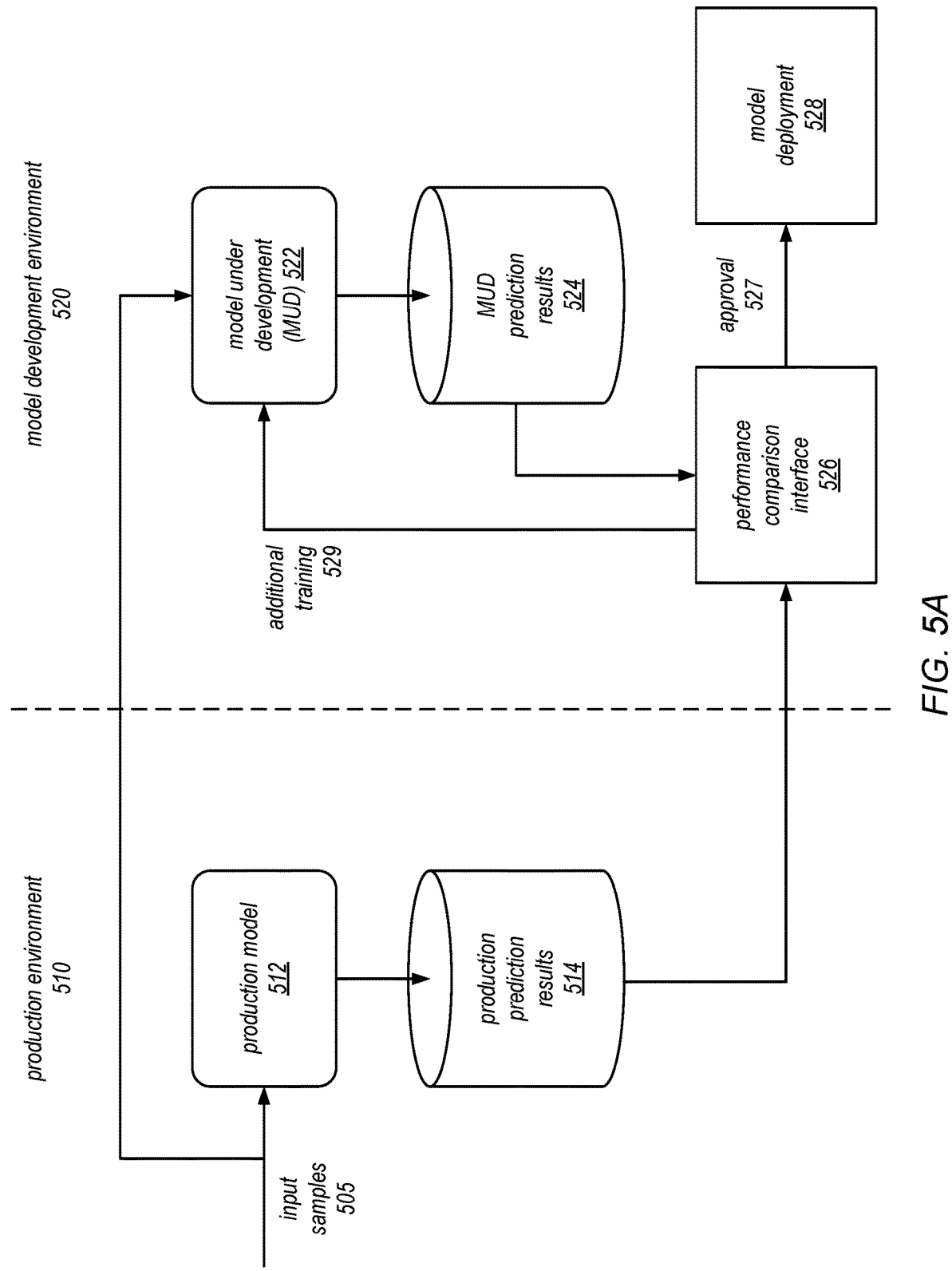
FIG. 5A illustrates an example simulation process that allows a model under development to be simulated using production data in the MDE, according to some embodiments.

FIG. 5A illustrates an example shadowing process that allows a model under development to be simulated using production data in the MDE, according to some embodiments.

As shown, in some embodiments, the MDE may allow the user to perform a simulation of a model under development (MUD) 522, which allows the MUD to be tested against production input data 505 (e.g. production images) that were provided to a production model 512, and then compare the performance results of the two.

As shown, in some embodiments, the production model 512 may be operating in a production environment, for example, a live web service or web site, and making machine-learned decisions based on production input media samples 505. For example, a production model may be a model that is actually deployed on self-driving vehicles that is being used to make decisions about road images. In some embodiments, the production model 512 may be configured to make the same prediction tasks as the MUD 522, which may be a next version of the production model being developed.

As shown, both the input samples 505 to the production model and the results 514 of the production model may be saved. In some embodiments, both the input and output data of the production model 512 may be saved in the same data store, and periodically provided to the MDE 520. In some embodiments, the input data 505 may be forwarded to the MDE 520 in a near real time fashion.

As shown, the MUD 522 may also receive the input data 505. In some embodiments, the MUD 522 may be executed in the MDE 520 alongside or in parallel with the production model 512 in the production environment 510. As shown, the MUD prediction results 524 may be stored in MUD prediction results data store 524. In some embodiments, the execution of the MUD 522 may not be performed using the ad hoc computing resources allocated for developmental testing, but by a set of computing resources that mimic the production environment's resources. In some embodiments, the MDE may be provided access to this testing environment, so that the MUD 522 may be tested using resources that are similar to resources employed in the field.

In some embodiments, the performance of both models may be gathered in parallel for some period of time (e.g. one week), and then the results may be compared using a performance comparison interface 526. In some embodiments, the comparison interface 526 may be implemented as a component in the model review layer 250, as discussed in connection with FIG. 2. In some embodiments, the comparison interface 526 may allow a user to visually view different performance metrics of the two models over time, and for different categories of input data. In some embodiments, the MDE may implement a process where the comparison testing is a check that must be performed before a development model is allow to deploy. For example, a company may implement a process where a MUD must approximately match the performance of the production model before it is permitted to replace the performance model. In some embodiments, the comparison interface 526 may allow a user to approve 527 the development model. If approved, the model may be provided to a model deployment component 528, which may package the model in a form that is ready for deployment. If the model is not approved, the performance comparison interface 526 may allow the user to provide feedback and cause the process to loop back for additional training 529 of the MUD.

Figure 5B:
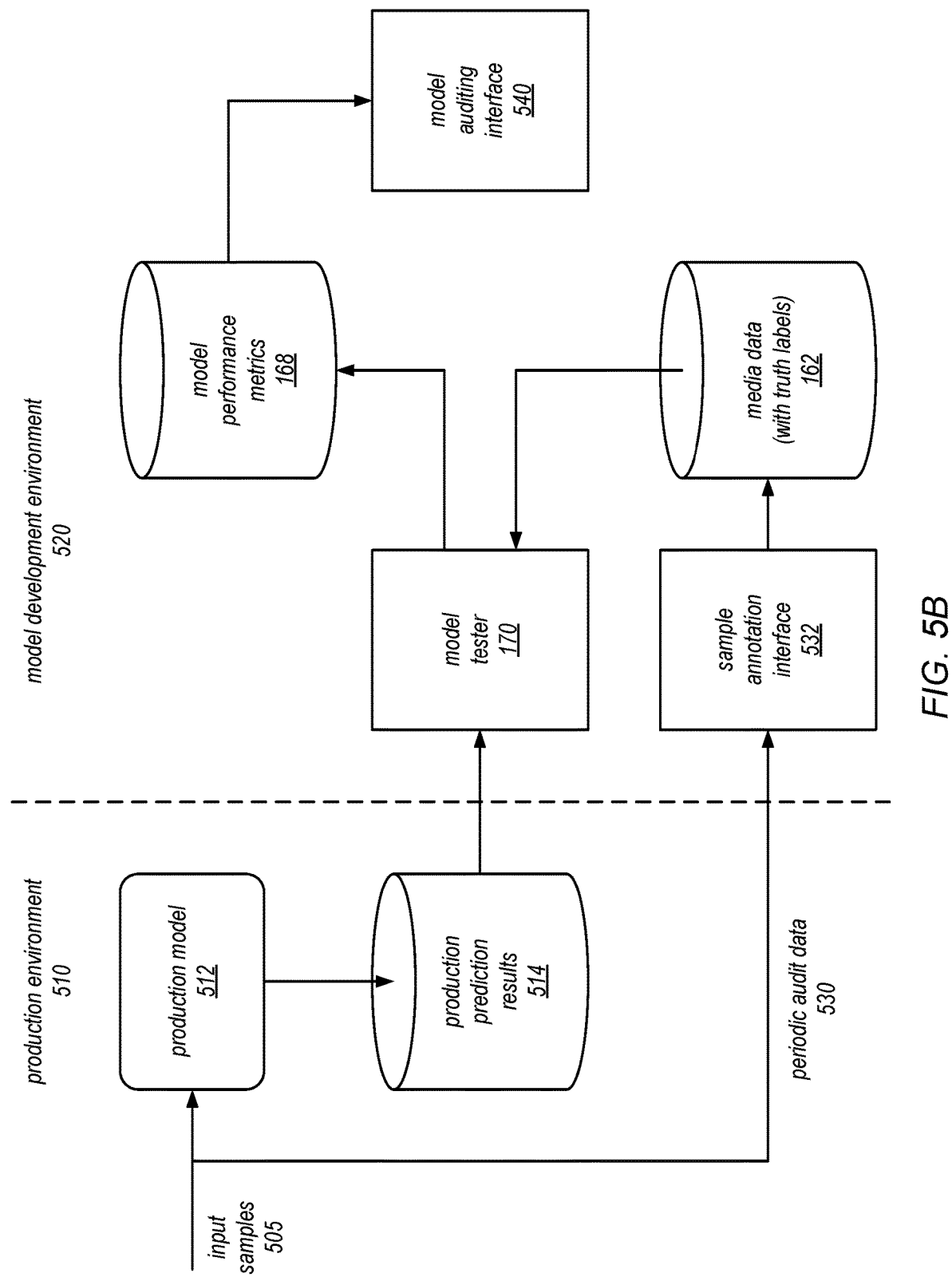
FIG. 5B illustrates an example auditing process that may be used to observe and audit a production model using the MDE, according to some embodiments.

FIG. 5B illustrates an example auditing process that may be used to observe and audit a production model using the MDE, according to some embodiments.

As shown, the production environment 510 is hosting a production model 512, which may be operating in similar fashion as discussed in connection with FIG. 5A to produce production prediction results 514. As shown, the MDE 520 may implement many of the components discussed in connection with FIG. 1.

As shown, periodic audit data 530 may be obtained from the production environment 510. In some embodiments, the audit data 530 may be sampled from the input samples 505 that is being consumed by the production model 512. In some embodiments, the schedule of auditing may be configurable from within the MDE.

As shown, the audit data 530 may be provided to a sample annotation interface 532. In some embodiments, the sample annotation interface 532 may be implemented as part of the media data management interface of 142 in FIG. 1 or using one or more components of the data preparation layer 230 in FIG. 2. The sample annotation interface 532 may be configured to allow a user to manually or programmatically annotate individual input samples (e.g. images). In some embodiments, the sample annotation interface 532 may be based on a trained classifier, which has been trained to annotate samples by observing user annotation behavior, and is automatically used to annotate incoming media samples. As shown, samples annotated with the annotation interface 532 are then stored in the mediate data store 162. The annotations are then used as the samples' truth labels for testing purposes. In some embodiments, the MDE 520 may be able to use information from audits performed in the production environment 510 to obtain the ground truth. For example, in some embodiments, correct prediction information may be provided by systems or users managing the production model and retrieved from the production prediction results store 514.

As shown, in some embodiments, the model tester 170 (or some other component in the MDE 520) may be used to generate model performance results for the production model, which may be stored in the model performance metrics store 168, as discussed in FIG. 1. To generate performance metrics such as accuracy, precision, recall, etc., the model tester 170 may compare the prediction results of the production model 512 to the truth labels associated with the media samples.

As shown, in some embodiments, a model auditing interface 540 is employed to display the audit results for the production model 512. In some embodiments, the auditing interface may be similar to the performance review interface (s) used by development models. In some embodiments, the auditing interface 540 may be implemented as part of the model diagnosis interface 148, which may allow users to analyze the production model deeply using a variety of diagnosis tools. In some embodiments, the model auditing interface 540 may be a notification interface that notifies a user, for example, by generating a text, an email, a type of event, etc. In some embodiments, the user to be notified may be the owner of the production model. In this manner, the owner may receive automatic and periodic audit reports about the production model 512. In some embodiments, the auditing interface 540 may also perform some programmatic analysis to detect any aberrations with the production model 512, such as for example an unexpectedly high error rate, etc. Thus, the periodic auditing may be used as an alarm system to alert users when the production model is behaving incorrectly (e.g. due to a change in the nature of the input data 505). Accordingly, the MDE 520 may be used to not just build models, but also to continually observe models in production. When problems are detected, the diagnosis tools of the MDE may be used to quickly understand underlying cause of the problems.

In some embodiments, because the production model was promoted from the MDE 520, a copy of the production model may be retained in the MDE 520 and tagged as an "in-production" model. Because the copy is retained, in some embodiments, model experiments may be performed on the copy to quickly diagnose any detected problems with the production model.

Figure 6:
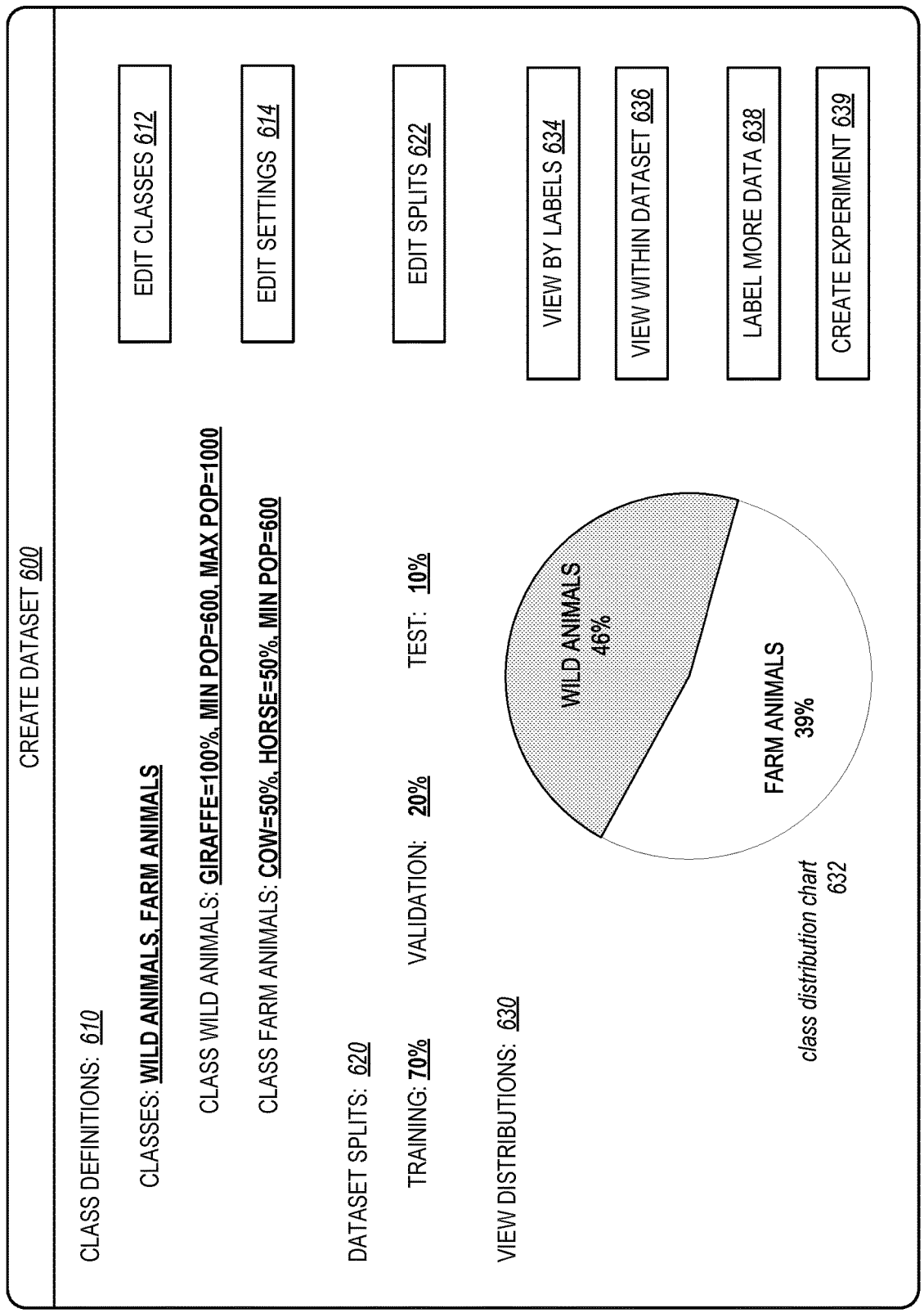
FIG. 6 illustrates an example graphical user interface that may be used to create datasets for a model experiment in the MDE, according to some embodiments.

FIG. 6 illustrates an example graphical user interface that may be used to create datasets for a model experiment in the MDE, according to some embodiments. In some embodiments of the MDE the user interface 600 may be used to create datasets for a model experiment (e.g. training, evaluation, and test datasets). In some embodiments, the user interface 600 may be implemented as part of 144 of FIG. 1 or using one or more components in the data preparation layer 230 of FIG. 2.

As shown, the user interface 600 may include a class definition section 610, which may allow a user to input information to define classes for a model experiment. A shown, in this example, two classes for wild animals and farm animals have been defined. In some embodiments, the edit classes button 612 may allow the user to define additional classes.

As shown, in the user interface 600, each class may be defined with a number of settings, which may dictate which samples (e.g. images) are added to each class. In some embodiments, media samples be associated with one or more annotations, which may be provided by the user or another system, and these annotations may be used to assign each sample to a class. In this example, image samples with the label GIRAFFE are added to the class of wild animals. In this example, the wild animals class has a distribution of 100% GIRAFFE images. As shown, the farm animals class is defined with a distribution of 50% COW images and 50% HORSE images. Additionally, other class attributes or settings may be associated with the creation of the class. For example, the wild animals class is specified to have a minimum population size of 600, and a maximum population size of 100; and the farm animals class is specified to have a minimum population of 600. In other embodiments, other class creation attributes may be specified. As shown, in this example, the edit settings button 614 may allow the user to specify or modify the creation settings for each class.

As shown, the user interface 600 may also include a dataset splits section 620. In some embodiments, the section 620 may allow users to specify the splits that are used to create different datasets to be used for the model experiment. For example, the edit splits button 622 may be used to adjust the values for the dataset split. In some embodiments, the custom datasets may be defined for an experiment. For example, in some embodiments, an experiment may be defined to have multiple training or test datasets, or a number of different types of validation datasets.

As shown, the user interface 600 may also include a view distributions section 630, which may allow the user to visualize the various types of distributions of the datasets that are to be created. In some embodiments, as in this example, the section 630 may display one or more charts, such as the class distribution chart 632. In this example, the chart 632 shows the distribution of the two classes in the corpus of image samples. As shown, a number of buttons appear on the right to change the type of chart that is displayed. The view label by labels button 634, for example, may be used to display a chart showing, the distribution of labels in a dataset (e.g. COW, HORSE, GIRAFFE) instead of the distribution of classes. The view within data set button 636 may be used to display a chart showing the distributions of classes or labels within a particular dataset (e.g. a training, validation, or test dataset). As may be understood, these charts allow the user to create datasets with balanced proportions of classes and underlying labels.

As shown, in some embodiments, the user interface 600 may include additional buttons to navigate the model experiment workflow. For example, the button 638 may take the user to a previous step in the workflow, where additional data samples may be loaded and labeled. In some embodiments, the button 639 may take the user to a next step in the workflow to for example create a model experiment based on the datasets created using user interface 600.

FIG. 7A illustrates an example graphical user interface that is used to create a model experiment in the MDE, according to some embodiments. In some embodiments of the MDE, user interface 700 may be used to define and configure a model experiment to run as one iteration of a model development process. In some embodiments, user interface 700 may be implemented as part of the model experiment interface 144 of FIG. 1.

As shown, the user interface 700 may include an experiment information section 710, which may indicate general information about a model experiment. As shown, a model experiment may be assigned a name, here ANIMAL NECK v3, which may be a user understandable name for the experiment. In some embodiments, the experiment may also be associated with a description, as shown.

As shown, in some embodiments, the experiment may be associated with various groups. In this example, the experiment is associated with a goal group, which may be a larger project goal to which a number of experiments are assigned. In this example, the experiment shown is assigned to a goal group of CLASSIFY HORSE-COW-GIRAFFE, which may have additional metadata associated with it. As shown, an experiment may also be associated with a sub-goal group. In some embodiments, the sub-goal group may correspond to a particular prediction task, and models within the same sub-goal group can be seen as related milestones, and their performance results can be directly compared with each other. In this example, the sub-goal group is a group named NECK RECOG (PREC>90%), which may be an object detection model used to detect the necks of animals from images of cows, horses, and giraffes.

As shown, the user interface 700 may also include a model information section 720. In this example, the model to be used for the experiment is an instance of INCEPTION V3, which may be a publicly-available media model that can be used as the basis for a variety of media training or prediction tasks. As shown, in some embodiments, the model used may also come from a previous checkpoint generated by a previous experiment performed by the MDE. As discussed in some embodiments, checkpoints of models may be saved during training, and these checkpoints may be later used for additional training and experimentation.

As shown, the user interface 700 also includes a datasets section 722. In this example, the section allows a user to choose datasets to use for different stages of the experiment. The datasets may be created for example using user interface 600 of FIG. 6. For example, the user may choose different datasets for one or more training portions of the experiment, one or more validation portions, and one or more testing portions. In some embodiments, the section may also include a control element 725 that allow users to launch another user interface (e.g. media data management interface 142 of FIG. 1), to allow the user to create or modify datasets stored by the MDE.

As shown, the user interface 700 also includes in this example a training configuration section 730. In this section, certain parameters of training may be specified, for example, a setting for the maximum number of training points, and a setting for how often model checkpoints should be generated. Additionally, as shown, this section includes a setting to allow a user to specify whether (and when) the training should be automatically stopped, based on evaluation of the model's accuracy or loss metric over successive training epochs. This evaluation may be performed, for example, as discussed in connection with FIG. 3.

As shown, in this example, the user interface 700 also includes a hyperparameter section 732, which allow users to specify how hyperparameters are configured. In this example, the user interface simply allows the user to indicate that the MDE should automatically tune the model's hyperparameters.

As shown, the user interface 700 also includes a simulation section 734. In this section, the user may specify that a simulation should be performed on the model, for example, by placing the model in an environment that is similar to a production environment, and providing production input data to the model to obtain performance results. In some embodiments, such environments may be maintained and hosted by a machine learning service accessible to the MDE. In some embodiments, a link to the environment or a counterpart production model may be provided to the MDE and be specified via the user interface 700.

As may be appreciated by those skilled in the art, depending on the embodiment, other configuration settings may be provided for configuration of model experiments. In some embodiments, more user interfaces may be used to allow for configuration. For example, additional configuration panels, tabs, or webpages may be provided by the MDE to obtain experiment configuration information from the user.

After the configuration information is entered, the user interface 700 may provide a button 736 to save the information. In some embodiments, metadata information about model experiments may be saved by a repository in the MDE, which may be isolated for different clients. Moreover, as shown, the user interface 700 may provide a run button 738, to allow the user to immediately initiate the model experiment in the system.

FIG. 7B illustrates an example graphical user interface that may be used to view and control model experiments in the MDE, according to some embodiments. In some embodiments, the experiment view interface 740 may be implemented as part of the model experiment interface 144 of FIG. 1.

As shown, in example user interface 740, an experiment view table 760 is provided, which shows a number of running or terminated experiments in the system. In some embodiments, each different user or client may only see those experiments in the MDE that the user has access to. The user interface 740 may provide buttons and navigation control to allow users to view the experiments according to the user's preferences.

As shown, the experiment view table 760 may display a number of experiments and their related metadata. In this example, each experiment is displayed with their name, their goal group, the user associated with the experiment (e.g. the user who defined or ran the experiment), the launch time of the experiment, a progress status, and for those experiments that have been completed, some performance metrics. In some embodiments, this view table may update in real time as the progress of the displayed experiments change.

In some embodiments, similar view tables may be provided for different types of other long-running jobs in the MDE. For example, in some embodiments, data annotation job or data loading jobs may be displayed in a similar user interface. In some embodiments, long running test jobs such as simulation jobs may also be displayed in a similar user interface.

As shown, on the top of the user interface 740, the user is provided a search button 750, which may allow the user to search for a subset of experiments meeting certain search criteria (e.g. based on particular experiment names or groups). As shown, the interface may also provide a filter button 752, which may allow the user to filter out or hide certain experiments from the view table. As shown, the interface may also provide a sort button 754, which may allow the user to sort the experiments in the view table, for example according to the launch time. As shown, the interface may also provide the user a group button 756, which may allow the user to group certain experiments together in the view table, for example according to the user field of the experiments. Finally, in this example, the interface also provides a columns button 758, which may allow the user to adjust which columns are visible in the view table.

As shown, on the bottom of the user interface 740, another series of buttons are provided. In this example, these buttons may be used to control a selected experiment in the view table 760, for example, the highlighted experiment ANIMAL NECKS v3. As shown, the interface may provide a pause button 770, which may allow a user to pause a running experiment. As shown, the interface may provide a resume button 772, which may allow a user to resume an experiment that had been previously paused. As shown, the interface may provide a stop button 774, which may cause an experiment to be permanently stopped. In some embodiments, permanently stopping an experiment may cause the computing resource allocated for the experiment to be released. As shown, the interface may provide a restart button 776. In some embodiments, the restart button may cause a running experiment to be rerun from the beginning. This may be done because, for example, some error was discovered in one of the datasets used by the experiment after the experiment has begun. Finally, the interface may provide a details button 778, which allows the user to view additional metadata about the selected experiment, which may include for example some of the experiment metadata specified in FIG. 7A.

In some embodiments, the user interface 740 may allow users to view any developer conclusions that are drawn on an experiment. For example, such conclusions may indicate observations or commentary provided by the last model developer or next action steps for a next experiment. In some embodiments, such observations or conclusions may be seen by hovering the cursor over individual models in the experiment view table 760, or by clicking details button 778. By allowing users to see the user conclusions and observations associated with an experiment, the MDE ensures that the next developer starts from where the last developer left off, thus promoting collaboration among developers. Also, the MDE promotes best code practices by enabling sub-goal regression to ensure that the models' overall goal is eventually achieved.

Figure 8:
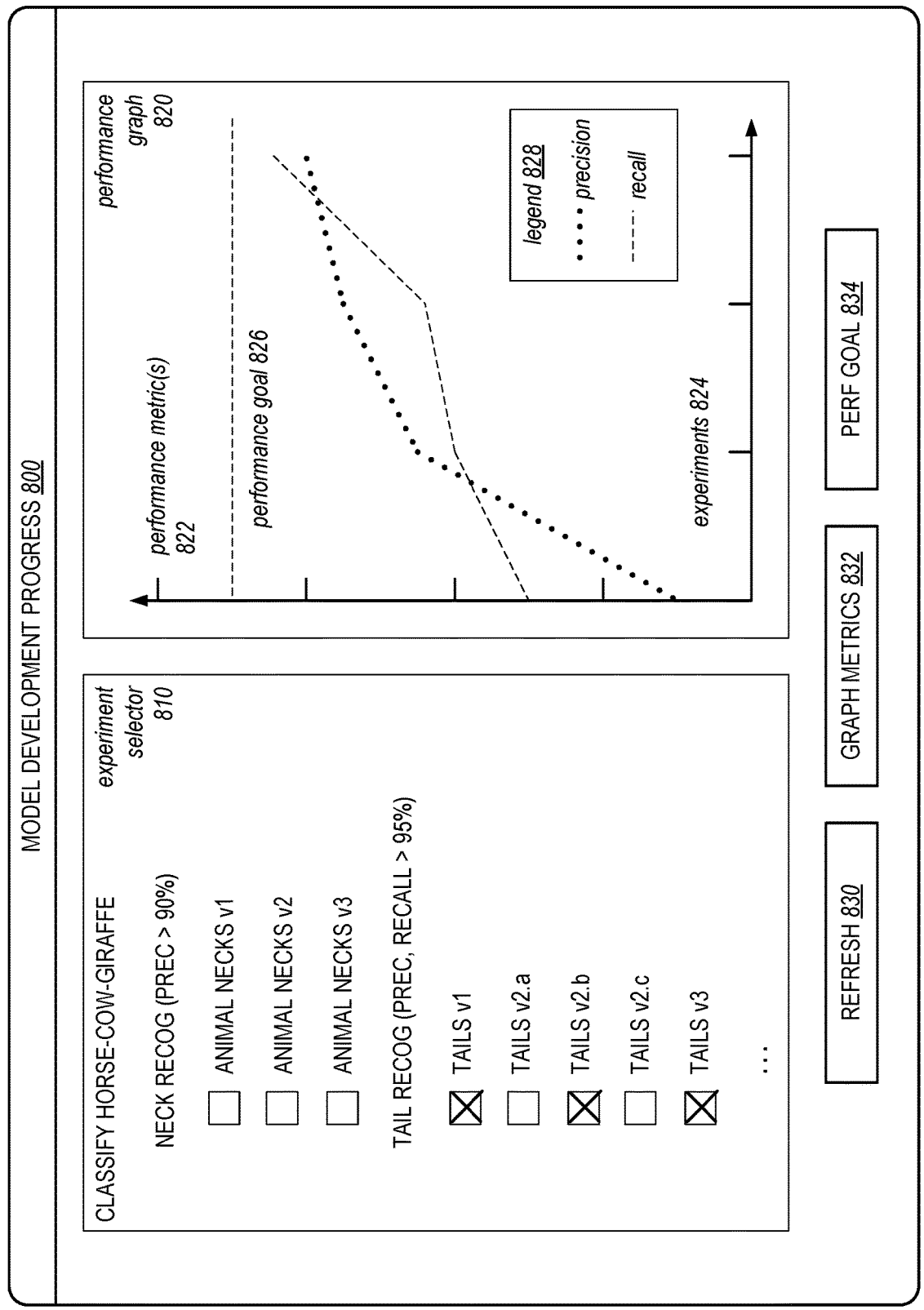
FIG. 8 illustrates an example graphical user interface that may be used to view and compare model experiment results in the MDE, according to some embodiments.

FIG. 8 illustrates an example graphical user interface that may be used to view and compare model experiment results in the MDE, according to some embodiments. In some embodiments, the model development progress interface 800 may be implemented as part of the progress tracking component 246 or the results visualization component 252 as discussed in connection with FIG. 2.

As shown in this example, the user interface 800 may provide an experiment selector control 810 and a performance graph 820. The experiment selector control 810 may allow a user to select one or more experiments to display on the performance graph 820. In this example, the control 810 is implemented as a tree-based control, where different experiments are grouped according to their goal group and sub-goal groups or milestones. In this example, the experiments are also sorted chronologically within each group. As shown, in this example, three experiments from the TAIL RECOG sub-group are selected, and their performance results are displayed in the performance graph 820.

As shown, the performance graph 820 may display a two-dimensional graph. The vertical axis may indicate one or more performance metrics of the experiment, and the horizontal axis may indicate different iterations of experiments, which are selected by the selector control 810. On the horizontal axis of the graph indicating different experiments 824, each mark in the axis indicates a different model experiment. The graph may also indicate a legend 828, which may indicate what metrics are displayed in the graph. In various embodiments, different types of performances metrics may be used, including for example, precision, accuracy, recall, F1-scores, and the like. In this example, two performance metrics are displayed in the graph: the model's precision and recall. In some embodiments, the graph may also display a performance goal 826, which may be a performance level specified for the sub-goal group as a whole. Different performance goal levels may be specified for different performance metrics. Accordingly, the user may quickly determine from the graph 820 how quickly the model development process is progressing towards its desired goal.

As shown, on the bottom of the user interface 800, a number of buttons are provided to control the viewing of the graph. The refresh button 830 may allow user to refresh the graph, for example, after the selection of the experiments have been changed with the selector 810. The graph metrics button 832 may allow the user to change which performance metrics are shown in the graph 820. In some embodiments, multiple types of standard performance metrics are computed for each model experiment and stored in the performance results repository. Finally, a performance goal button 834 may allow the user to view, edit, or toggle in the graph the performance goal 826 of a group of experiments. In some embodiments, the performance goal may be a composite goal that is dependent on a combination of multiple performance metrics.

Figure 9:
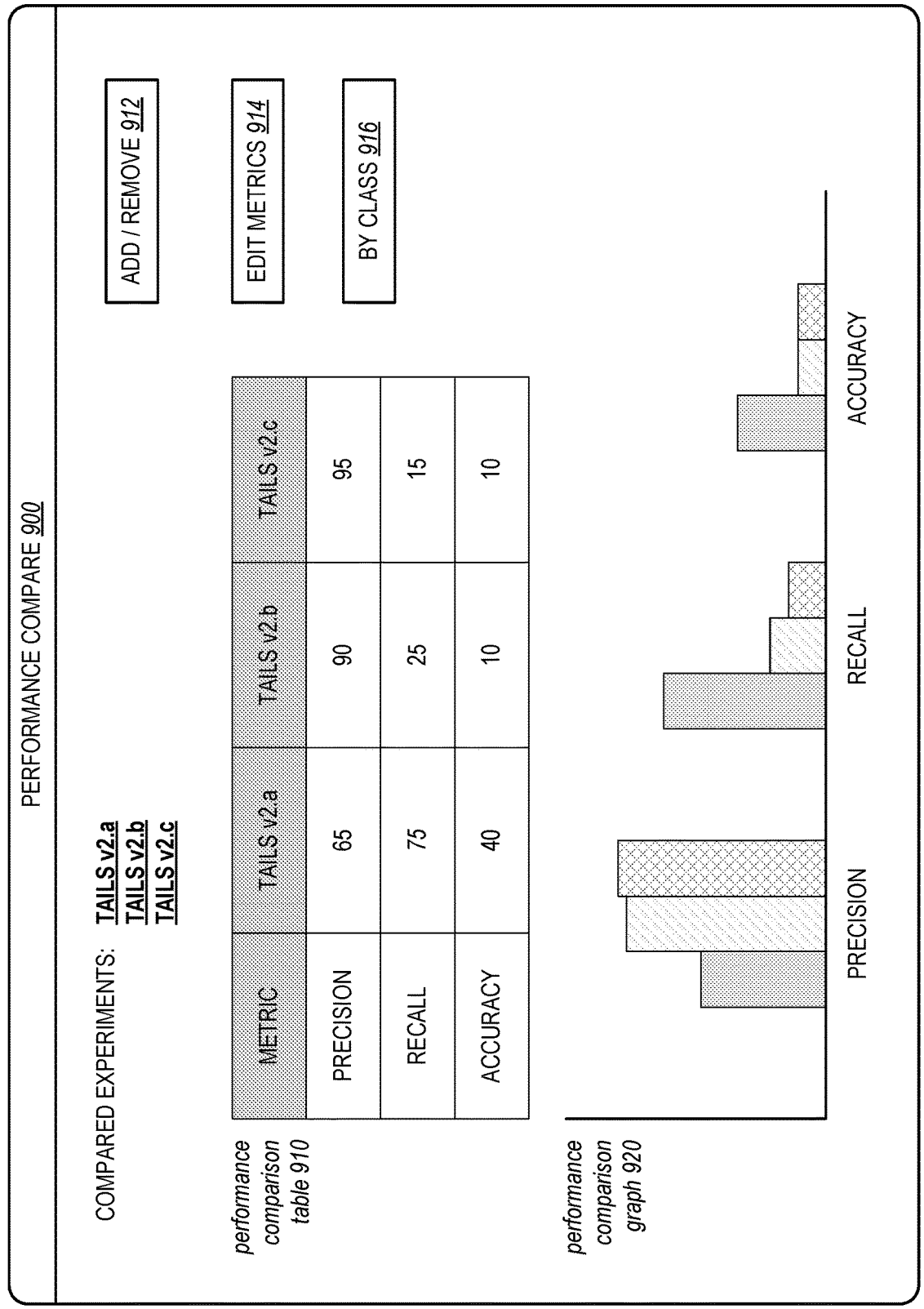
FIG. 9 illustrates another example graphical user interface that may be used to view and compare model experiment results in the MDE, according to some embodiments.

FIG. 9 illustrates another example graphical user interface that may be used to view and compare model experiment results in the MDE, according to some embodiments. In some embodiments, the performance comparison interface 900 may be implemented as part of the results visualization component 252 as discussed in connection with FIG. 2.

As shown, the user interface 900 may allow users to select a group of experiments to visually compare. For example, the user interface 900 includes a button 912, which allows a user to add or remove experiments from the group of compared experiments. In this example three experiments for tail detection in images are compared. In some embodiments, the results for the three experiments (or any number of comparison experiments) may be obtained from a "golden" test set. The golden test set may be constructed ahead of time, and be used as a standard test set for different versions of models, thus allowing the models to be compared under the same test data. In some embodiments, the golden test set may be created via the user interface 600 in FIG. 6 and specified for use for an experiment via the user interface 700 in FIG. 7A.

As shown, the user interface 900 may provide a performance comparison table 910, which may display, for each experiment in the comparison group, their results for one or more performance metrics. In this example, the precision, recall, and accuracy metrics are displayed. The user interface may include a button 914 to configure the metrics that are displayed in the table. The user interface may also include a button 916 to view the metrics in different ways, for example, by class. In this example, the performance metrics of the experiments may be computed on-the-fly, and computed based on the class of the input media samples (e.g. cow, horse, or giraffe images). Accordingly, the user interface 900 will display the precision, recall, and accuracy metrics for the three experiments, for each of the cow, horse, and giraffe classes. This type of visualization allows the user to see if there are particular problems with a particular metric (e.g. recall) in a particular class.

As shown, the user interface 900 may also provide a performance comparison graph 920. In this example, each performance metric value for each the three experiments are grouped together. This view allows the user to visually compare and see the difference between the performance results of the grouped experiments. In some embodiments, configuration adjustments made via the buttons 914 and 916 are reflected in both the table 910 and the graph 920.

Figure 10:
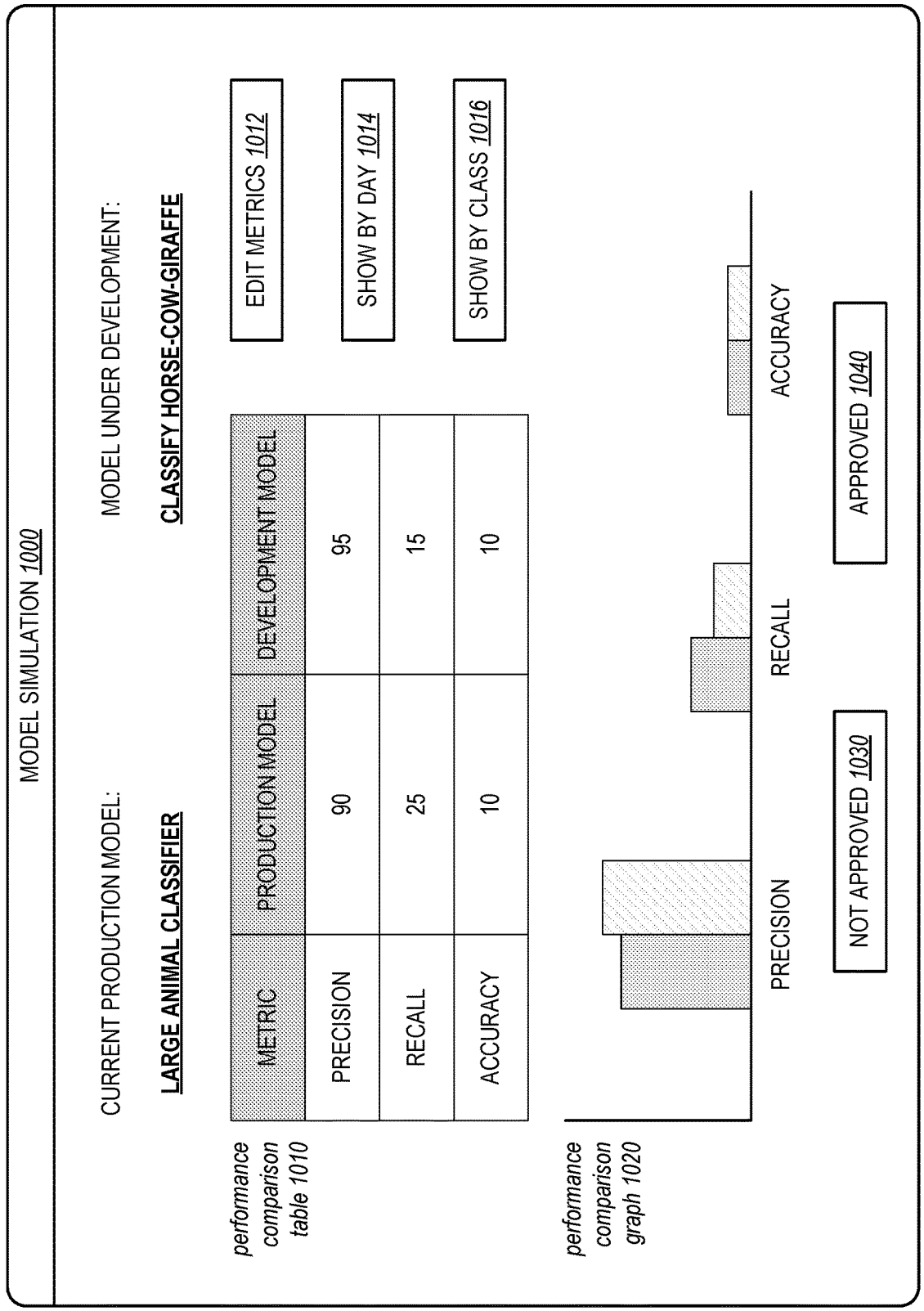
FIG. 10 illustrates an example graphical user interface that may be used to view and compare model simulation results with production model results in the MDE, according to some embodiments.

FIG. 10 illustrates an example graphical user interface that may be used to view and compare model simulation results with production model results in the MDE, according to some embodiments. In some embodiments, the model simulation interface 1000 may be implemented as part of the simulation component 249 or production traffic analysis component 256 as discussed in connection with FIG. 2.

As shown, the user interface 1000 may allow users to select a model under development (here CLASSIFY HORSE-COW-GIRAFFE) and a production model (here LARGE ANIMAL CLASSIFIER), and compare the performance results of the two models after a period of simulating the model under development using production input data. In some embodiments, to obtain the results shown on this interface, the MDE may link to a production environment and obtain both input data to and output data from the production model. The input data may be truth labeled, so that performance results of the two models can be extracted and compared.

As shown, the user interface 1000 may provide a performance comparison table 1010, which may display, for the production model and the model under development, their respective performance metrics values during the simulation period. In this example, the precision, recall, and accuracy metrics are displayed. The user interface may include a button 1012 to configure the metrics that are displayed in the table. The user interface may also include a button 1014 to view the models' performance by day. The user interface may also include a button 1016 to view the models' performance by class.

As shown, the user interface 1000 may also provide a performance comparison graph 1020. In this example, each performance metric value for the two models are grouped together. This view allows the user to visually see the difference between the performance results of the two models. In some embodiments, configuration adjustments made via the buttons 1012, 1014, and 1016 are reflected in both the table 1010 and the graph 1020.

As shown, the user interface 1000 includes buttons 1030 and 1040. In some embodiments, these buttons may be used to indicate user approval of the model under development, and whether the model may be promoted to the production environment. Thus, in some embodiments, interface 1000 may serve as an approval interface for promoting models to the production environment. If a model under development is not approved, the model may be placed back into a development stage with feedback from the approver. In some embodiments, model developer may perform additional rounds of model experiments to develop an improved version of the model, and submit that version for approval.

In some embodiments, the user interface 1000 may serve as an auditing interface for the production model. In that case, the production model may be evaluated against a trusted (possibly larger) model hosted in the MDE. The production model may be periodically audited in this fashion to identify situations when the production model is not performing properly.

Figure 11A:
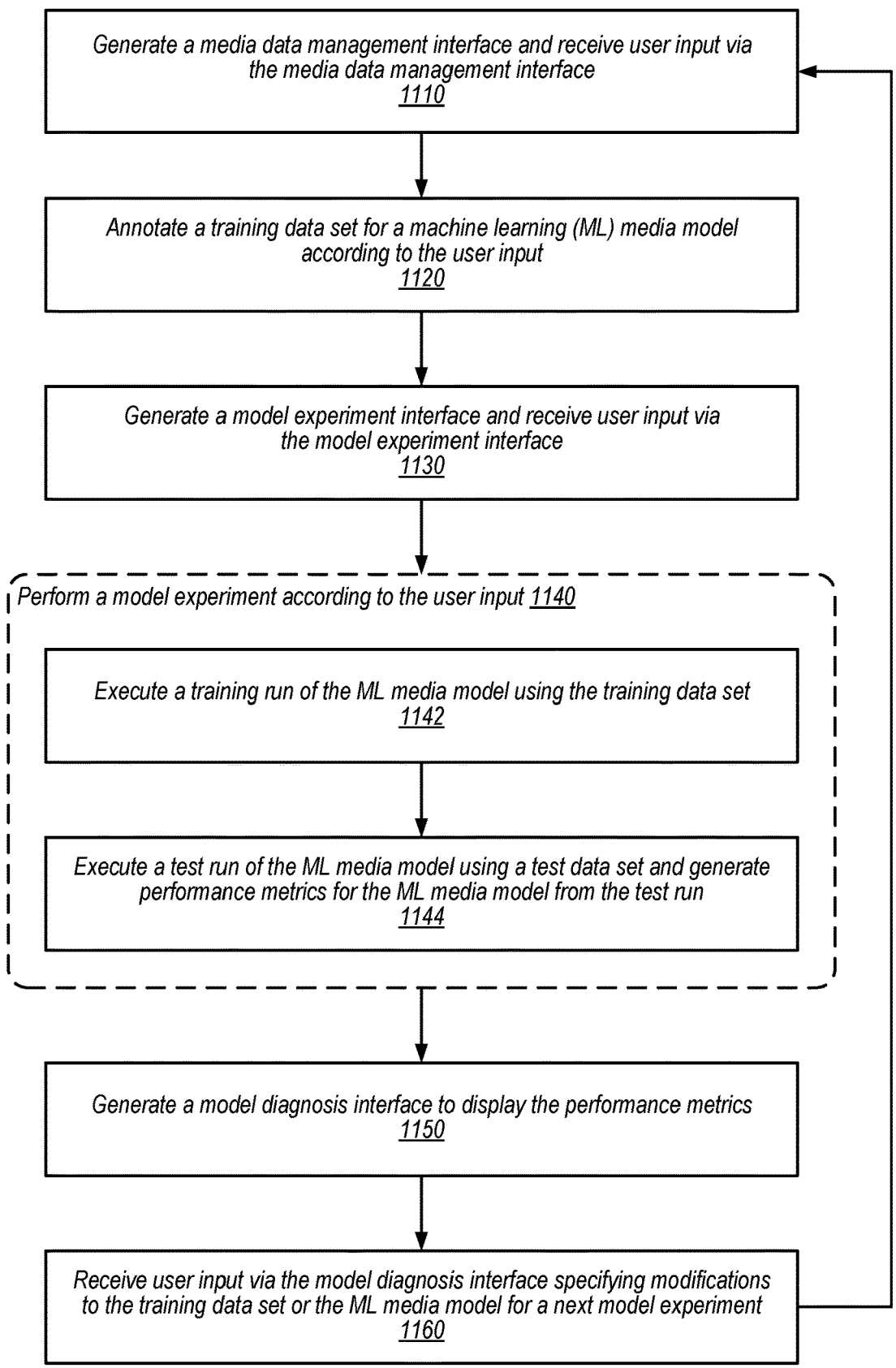
FIG. 11A is a flow diagram illustrating a model development process using an MDE that allows users to develop models via iterative model experiments, according to some embodiments.

FIG. 11A is a flow diagram illustrating a model development process using an MDE that allows users to develop models via iterative model experiments, according to some embodiments. The process of FIG. 11A may be performed, for example, by the MDE 130, as discussed in connection with FIG. 1.

At operation 1110, a media data management interface is generated, and user input is received via the media data management interface. In some embodiments, the media data management interface may be the media data management interface 142, as discussed in connection with FIG. 1. In some embodiments, the media data management interface may be a graphical user interface and include one or multiple windows. In some embodiments, the media data management interface may be a web interface that includes one or more webpages generated by a web server.

At operation 1120, a training data set of media data for a machine learning media model is annotated according to the user input. In some embodiments, the media data management interface may contain user control elements that allow a user to import, export, and label image sets managed by the MDE. In some embodiments, the annotations may be performed by one or more components described in the data preparation layer 230 of FIG. 2. In some embodiments, the media data management interface may allow a user to create, a training data set and a test data set from the media data to perform model experiments on ML media models. In some embodiments, other data sets may also be created, for example, one or more validation data sets. In some embodiments, the data sets may be created so that they have approximately the same proportions of different detected features in the corpus of the media data (e.g., similar proportions of types of feature vectors extracted from the images). In some embodiments, the media data management interface may allow the data sets created to be saved, versioned, and then subsequently modified. The modifications to the data sets may include for example, changing the member media samples of the data sets, relabeling the samples in the data sets, editing particular samples in the data sets, among other things.

At operation 1130, a model experiment interface is generated and user input is received via the model experiment interface. In some embodiments, the model experiment interface may be the model experiment interface 144, as discussed in connection with FIG. 1. In some embodiments, the model experiment interface may be a graphical user interface and include one or multiple windows. In some embodiments, the media data management interface may be a web interface that includes one or more webpages generated by a web server.

At operation 1140, a model experiment is performed according to the user input received at the model experiment interface. In some embodiments, the model experiment interface may allow a user to specify various configuration parameters of a model experiment that is to be run on the MDE or delegate some machine learning tasks to other platforms such as a machine learning service. For example, the model experiment interface may include the user interface 700 of FIG. 7A. In some embodiments, a model experiment may include a training run of a model and a test run of the model.

As shown, operation 1140 includes two sub-operations 1142 and 1144. At operation 1142, a training run of the model is executed using the training data set. Operation 1142 may be performed, for example, by the model trainer 160 of FIG. 1 and using one or more components of the model update layer 240 of FIG. 2. At operation 1144, a test run of the model is executed using the test data set, and performance metrics for the ML media model for the test run are generated. In some embodiments, operation 1144 may be performed by the model tester 170 of FIG. 1 and using the process shown in FIG. 4. In some embodiments, the model experiment may perform training runs repeatedly until a stopping condition is reached. The stopping condition may be determined based on evaluation of checkpoints of the model during different points of the training, as discussed in connection with the process shown in FIG. 3.

In some embodiments, the model experiment interface may also allow a user to view the status and progress of experiments performed in the MDE. For example, in some embodiments, a user interface such as user interface 740 of FIG. 7B may be included in the model experiment interface to allow a user to view and control the running of experiments. At the end of a model experiments, raw results of the model (e.g., the model's decisions on the test data set) may be saved in the repository, such as repository 168 as discussed in connection with FIG. 1.

At operation 1150, a model diagnosis interface is generated to display the performance metrics. In some embodiments, the model diagnosis interface may be the model diagnosis interface 148, as discussed in connection with FIG. 1. In some embodiments, the model experiment interface may be a graphical user interface and include one or multiple windows. In some embodiments, the media data management interface may be a web interface that includes one or more webpages generated by a web server.

In some embodiments, user input is received from the model diagnosis interface specifying modifications to the training data set or the ML media model for a next model experiment. In some embodiments, the model diagnosis interface may present the performance data, along with particular media samples, to allow a user to gain insight into the model's performance and diagnosis certain problems with model. In some embodiments, for example, the model diagnosis interface may display misclassified samples from the testing set to the user. In some embodiments, the diagnosis interfaces may display media samples (e.g. images) from the training set that are closest to a misclassified image. In some embodiments, the model diagnosis interface may display a saliency map that indicates regions in an image that contributed to the model's decision. In some embodiments, the model diagnosis interface may allow a user to compare the performance of multiple model experiments, for example using the user interface 900 shown in FIG. 9. In some embodiments, tasks supporting the model diagnosis interface may be implemented using one or more components in the model review layer 250 of FIG. 2.

In some embodiments, the model diagnosis interface may receive user diagnosis feedback and infer one or more corrective actions to be performed for later model experiments. For example, in some embodiments, the MDE may infer that certain changes need to be made to the training data set for the experiment (e.g., correcting truth labels, adding media samples, removing media samples, etc.). In some embodiments, the MDE may infer that the structure or parameters of the model itself need to be changed. In some embodiments, these changes may be displayed as recommendations or a summary report to the user via the model diagnosis interface. In some embodiments, the model diagnosis interface may provide user controls to allow users to directly implement the recommended changes in the MDE, for example, via the media data management interface.

As shown, the process then loops back to operation 1110, where the media data management interface may once again be generated, to allow the user to provide input to modify the data sets. In this manner, the process depicted implements a development workflow for model developers to perform iterative model experiments to steadily improve model performance. In some embodiments, as iterations of experiments are performed, the MDE may allow the user to visualize the progress of these experiments, for example via the user interface 800 of FIG. 8 or user interface 900 of FIG. 9. Using this development workflow implemented by the MDE as described, a model developer can develop ML media models very quickly using model experiments. The MDE allows the developer to build models intuitively and interactively, while at the same time simplifies the manual tasks and decisions that the developer must perform. Accordingly, the MDE and the iterative process is able to dramatically speed up model development process for ML media models.

Figure 11B:
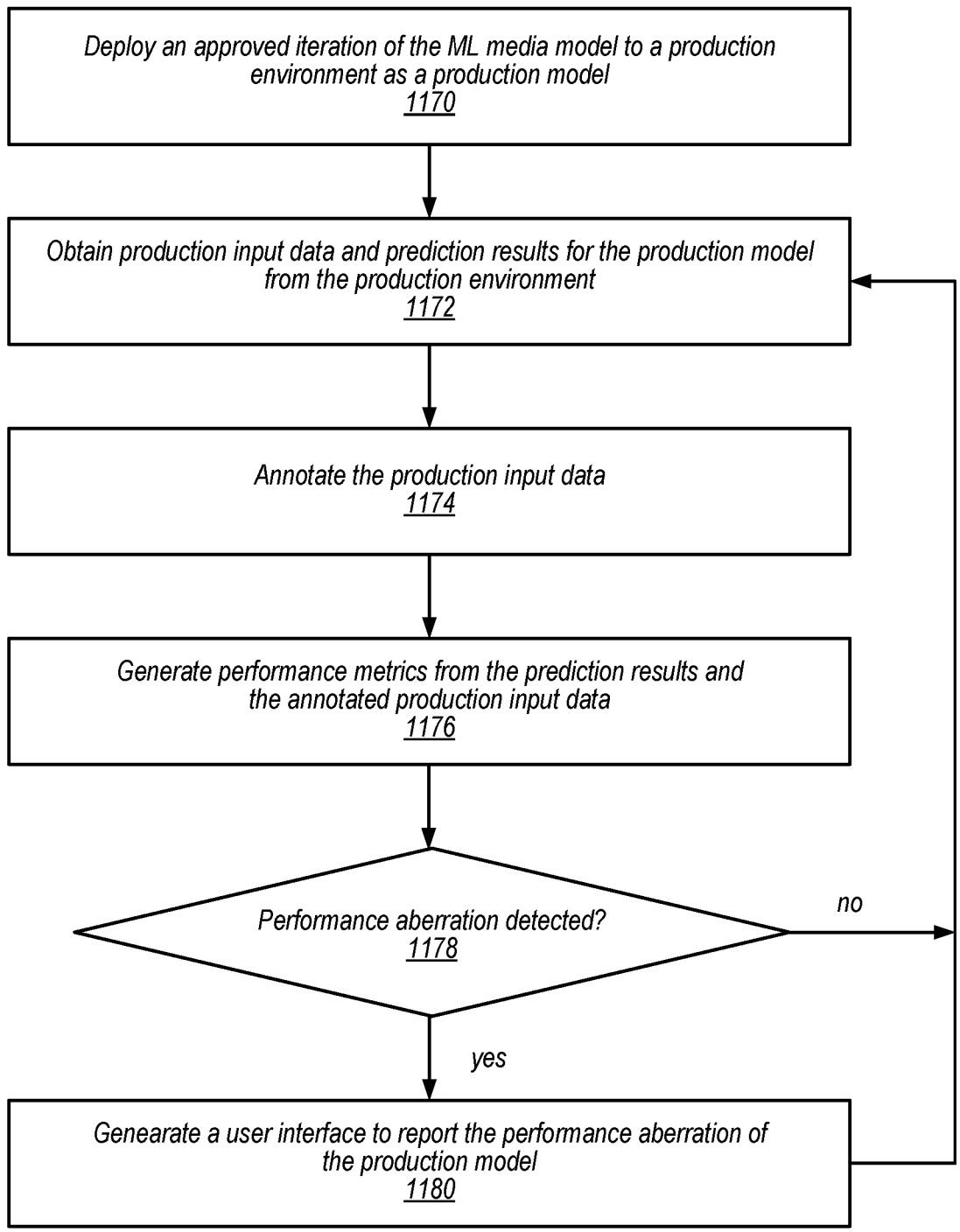
FIG. 11B is a flow diagram illustrating an auditing process for a production model using an MDE that allows users to perform iterative model experiments, according to some embodiments.

FIG. 11B is a flow diagram illustrating an auditing process for a production model using an MDE that allows users to perform iterative model experiments, according to some embodiments. The process of FIG. 11A may be performed, for example, by the MDE 130, as discussed in connection with FIG. 1.

At operation 1170, an approved iteration of a ML media model is deployed to a production environment as a production model. In some embodiments, the approval may be indicated via user input, for example, via the model diagnosis interface as discussed in connection with operation 1150 of FIG. 11A. In some embodiments, once an iteration of a ML model is approved, it may be packaged in an executable or installable form, and then sent or made available to the production environment to be deployed. Once deployed, the production model may begin to receive live production data as input (e.g. production media samples), and begin making decisions on the production input data.

At operation 1172, production input data and prediction results for the production model is obtained from the production environment. In some embodiments, the production data may be obtained in similar manner as described in connection with operation 530 in FIG. 5B. In some embodiments, the production data may be obtained periodically to perform a periodic audit process on the production model. In some embodiments, the production prediction results may be retrieved from a prediction results data store in the production environment (e.g. data store 514 of FIG. 5B).

At operation 1174, the obtained production input data is annotated. In some embodiments, the annotation may be performed via the MDE, for example, using the sample annotation interface 532 of FIG. 5B or user interface 600 of FIG. 6. In some embodiments, the MDE may allow the input data to be annotated automatically using a programmed or machine learned sample classifier, so that the audit process can proceed programmatically. In some embodiments, the annotation may be performed at least in part in the production environment.

At operation 1176, performance metrics for the production model are generated from the prediction results and the annotated production input data. In some embodiments, the generation of the performance metrics may be performed via the model tester component 170, and in similar fashion as discussed in connection with FIG. 5B. In some embodiments, the performance metrics may be stored in a data store such as the model performance metrics store 168, as discussed in FIG. 5B.

At operation 1178, a determination is made whether a performance aberration is detected. The performance aberration may be detected from the performance metrics that were generated in operation 1176. In some embodiments, the performance metrics may be similar to the metrics generated while testing models under development in the MDE. The metrics may include metrics such as precision, recall, F1 scores, etc. In some embodiments, the performance aberration may be determined based on a monitoring policy, which specifies when an aberration is deemed to occur. In some embodiments, if one or more performance metrics fall below a specified threshold, an aberration may be detected. In some embodiments, a performance aberration may be based in part on the recent historical performance of the production model. Thus, when there is a sudden change in the prediction performance of the production model, a performance aberration is detected.

If an aberration is detected, the process proceeds to operation 1180. If not, the process loops back to operation 1172, where additional input data is obtained from the production environment to continue the monitoring. In some embodiments, the auditing process may be performed regularly, according to a schedule that may be specified via the MDE.

At operation 1180, when a performance aberration is detected, a user interface is generated to report the performance aberration of the production model. In some embodiments, the user interface may be a graphical user interface of the MDE. In some embodiments, the user interface may be a notification interface of the MDE, which may be configured to generates an email, a text, an event, etc. to registered users. In some embodiments, the user interface may be implemented using the model auditing interface 540 of FIG. 5B. When a user is alerted to the performance aberration, the user may log into the MDE to more fully review the problems detected for the production model using the diagnostic tools provided by the MDE. Accordingly, the MDE provides a system that can perform ongoing monitoring of production models, and provide near real-time diagnosis of the production models.

Figure 12:
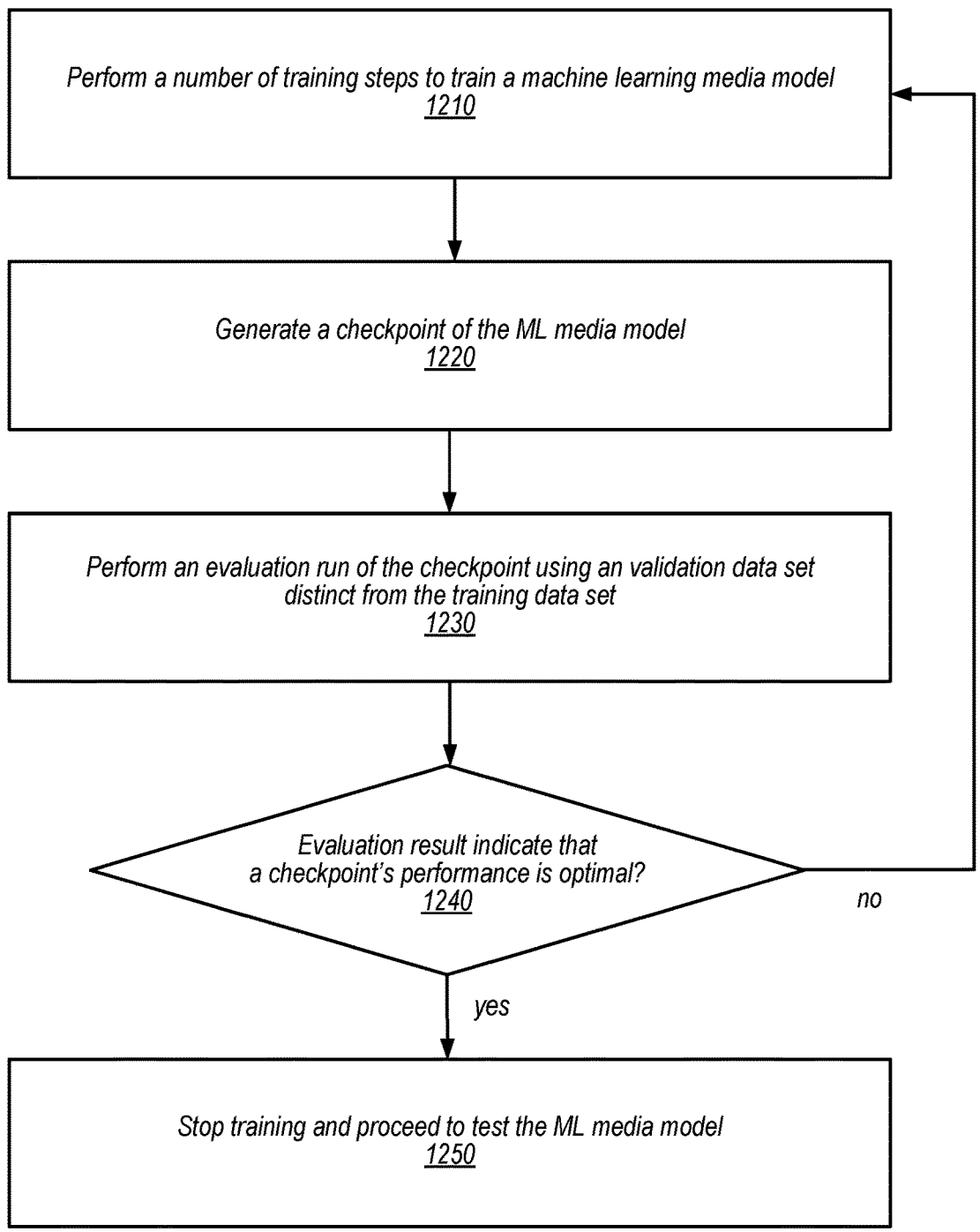
FIG. 12 is a flow diagram illustrating a process of determining a stopping point for a model training in the MDE by evaluating model checkpoints, according to some embodiments.

FIG. 12 is a flow diagram illustrating a process of determining a stopping point for a model training in the MDE by evaluating model checkpoints, according to some embodiments. In some embodiments, the MDE may be the MDE 130 as discussed in connection with FIG. 1.

At operation 1210, a number of training steps is performed to train an ML media model. In some embodiments, the training may be performed by the model trainer 160, as described in connection with FIGS. 1 and 3. In some embodiments, each training step may involve providing one or more media sample to the model under training and then updating the model based on a comparison of the model's prediction and the actual ground truth information for the media sample.

At operation 1220, a checkpoint of the ML media model is generated. In some embodiments, the checkpoint may be a snapshot in time of the model's various parameters that are being updated during the training. Thus, each checkpoint may represent a state of the model during the training process. In some embodiments, these checkpoints may be generated periodically, for example, once every fixed number of training steps. In some embodiments, checkpoints may be generated based on performance goals or milestones reached by the model during training, or based on other conditions determined during training. In some embodiments, the checkpoints may be saved in the fashion discussed in connection with save operation 315 discussed in FIG. 3.

At operation 1230, an evaluation run of the checkpoint is performed using a validation data set that is distinct from the training data set. In some embodiments, the validation or evaluation data set may be a completely separate data set from both the training set and test set of the model, with no overlapping samples. In some embodiments, the validation data set may be constructed so that it has approximately the same feature distributions as the training data set. In some embodiments, the evaluation of the model checkpoint may be performed similar to a test run of the model. In some embodiments, results of the model on validation data set are saved, so that the model's performance against the validation data set can be analyzed.

At operation 1240, a determination is made whether evaluation results indicate that a model checkpoint's performance is optimal. In some embodiments, the operation involves computing the performance of a model checkpoint from the model's raw decision data. In some embodiments, the performance of the model checkpoint may be compared with the performance of previous of subsequent checkpoints of the model during training. In some embodiments, the evaluation process may include identifying a peak or plateau in the performance of the checkpoints, and then identifying a point that is considered the model's optimal performance. If one checkpoint is determined to be the optimal checkpoint, the training process may be stopped, and the process proceeds to operation 1250, where the training stops. In some embodiments, the process may then proceed to a testing phase of the model. If the evaluation cannot determine that any checkpoints are optimal, the process proceeds back to operation 1210, where the training process continues for more training steps. In some embodiments, operations 1230 and 1240 may be performed by the combination of checkpoint evaluator 340 and training stoppage controller 360, as discussed in connection with FIG. 3.

Figure 13:
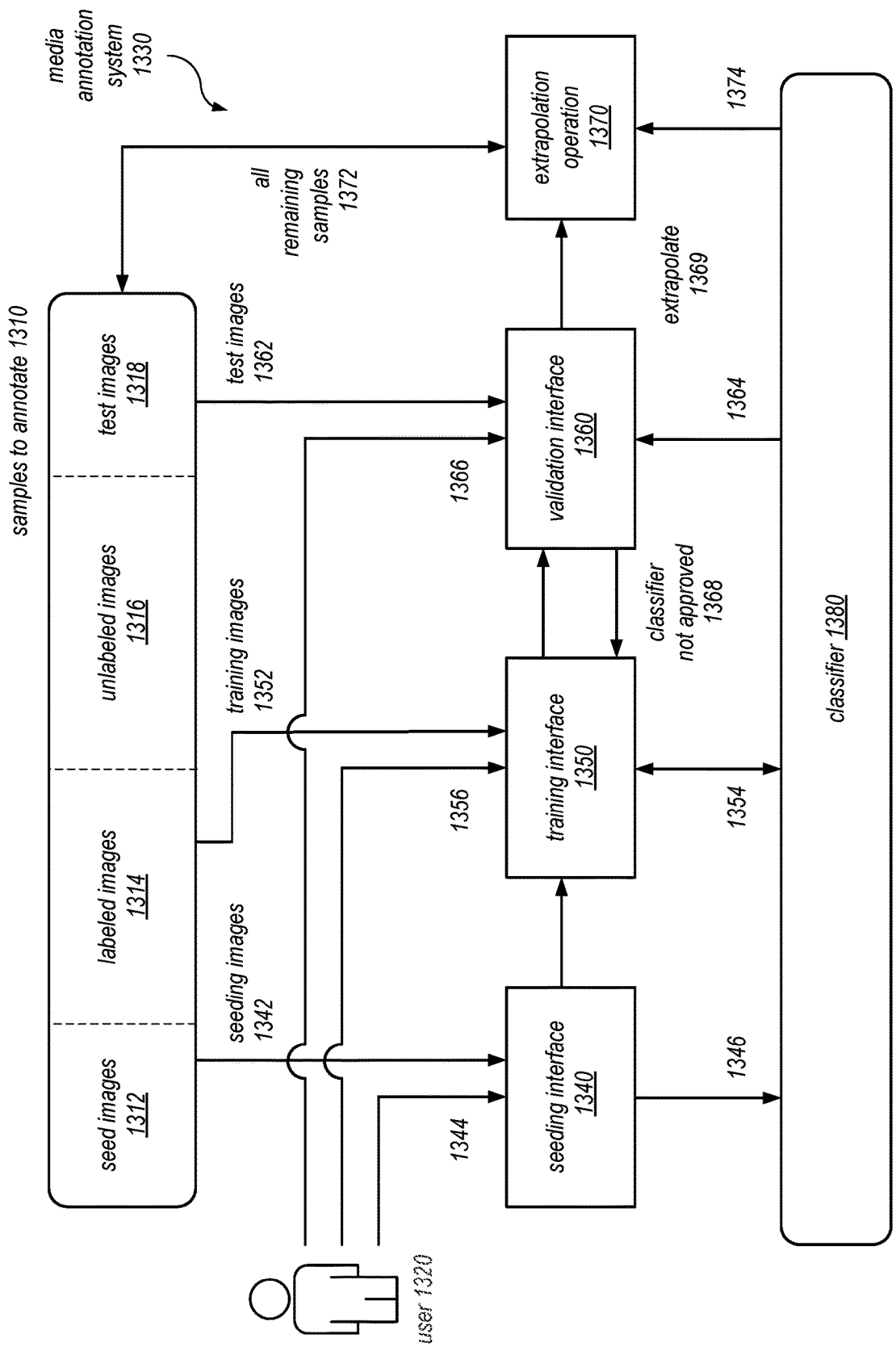
FIG. 13 is a block diagram illustrating an example media annotation system in the MDE that uses an active learning classifier to annotate media samples for ML media model development, according to some embodiments.

FIG. 13 is a block diagram illustrating an example media annotation system in the MDE that uses an active learning classifier to annotate media samples for ML media model development, according to some embodiments. In some embodiments, the media annotation system 1330 may be implemented as part of the media data management interface 142 of FIG. 1, or using components in the data preparation layer 230 of FIG. 2.

As may be understood, in training ML media models, the models are trained with a set of media samples which are labeled by one or more annotations. In conventional model development systems, developers will have to start by curating a large annotated media sample database. This process is generally time consuming and expensive. In some cases, large datasets can take years to annotate.

The media annotation system presented herein (e.g. system 1330) improves upon conventional media annotation systems to perform the media annotation much faster by using an active learning classifier. In some embodiments, the classifier speeds up the annotation process by cheaply annotating similar or redundant media samples. For example, in annotating pictures of animals in a zoo, if one media sample is manually labeled a giraffe, it would save computing resources if all similar pictures of giraffes are automatically found and organized, which can then be bulk-labeled.

In some embodiments, the media annotation system supports the option for the user to review all the data that has already been labelled to assign to the new classes as required. For example, if the user has been labelling media samples apple, banana and grapes and the user sees that carrots are also a class that needs to be labelled, then all the user has to do is add the carrots class and there is no need to re-label any of the existing data. However, if the user has been labelling banana, grapes and apples and sees a need to split apple into green apple and red apple, then the user will have to visit all the labels for apples (both training and audit data) and relabel them into green and red apple to continue with active learning workflow.

In some embodiments, the annotation system employs active learning techniques to interactively select the most informative samples to be annotated by a human. In some embodiments, the selection is done from a large corpus of unlabeled samples. Initially the active learner is seeded with data points that are chosen by identifying the centroid of unique clusters in the unlabeled pool of data. With the seed, the learner builds a classifier which is then executed over all the unlabeled examples. In some embodiments, samples that are difficult to classify are selected for labeling. Once human(s) annotate new samples, the classifier may be retrained with the new data which are the most confusing samples to the classifier's current state.

Depending on the embodiment, different types of classification algorithms may be used. For examples, the following classification algorithms may be used: random forests, Support Vector Machines (SVM), logistic regression, neural network, and k-NN (nearest neighbor) classifier. Using the annotation system described herein, annotation of large data sets may be performed much more quickly than conventional media annotation systems.

In a random forests technique, one or more decision trees are built. The technique then determines a mean of the predictions from the tree(s). The predicted class probabilities of an input sample are then computed as the mean predicted class probabilities of the trees in the forest. The class probability of a single tree is the fraction of samples of the same class in a leaf.

In a logistic regression technique, a linear classifier is used to learn the function of form $P(y/x)=1/(1+\exp(-T \cdot x))$, where $P(y/x)$ denotes the probability that a sample 'x' belongs to the class 'y'. T is a parameter matrix that holds the weights with which x is transformed. The exponential helps to squish $T \cdot x$ values to the range [0, 1], which can be easily interpreted as a probability score. In some embodiments, the logistic regression may be trained with a multinomial loss function and stochastic gradient descent. In a KNN technique, the k-nearest-neighbors algorithm does not attempt to construct a general internal model, but simply stores instances of the training data. To label a new point, the algorithm examines the labelled points closest to that new point (those are its nearest neighbors), and has those neighbors vote, so whichever label the most of the neighbors have is the label for the new point (the "k" is the number of neighbors it checks). The predicted class probability is the fraction of the nearest neighbors that belong to the same class.

Neural networks are a set of algorithms that are designed to recognize patterns. A deep neural network (DNN) is an artificial neural network (ANN) with multiple layers between the input and output layers. The DNN finds the correct mathematical manipulation to turn the input into the output, whether it be a linear relationship or a non-linear relationship. In an SVM technique, a Support Vector Machine (SVM), which is a discriminative classifier, aims to output an optimal hyperplane which categorizes new examples. The optimal hyperplane is chosen such that the margin is maximized. The probability scores are computed using the Platt's method where a sigmoid is fit to the scores from SVM score function.

Referring back to FIG. 13, FIG. 13 depicts a media annotation system 1330, which is used to annotate a set of media samples 1310. For example, the media sample set 1310 may include images. The annotation process involves a user 1320 interacting with a number of computer interfaces, and a classifier 1380, which may use one or more of the classification techniques discussed above. In some embodiments, multiple classification techniques or algorithms may be used by the classifier 1380, and their results may be used to cross-validated one another. The annotation process proceeds in a number of stages, which in some embodiments, may be driven by a number of user interfaces of the annotation system 1330. As shown, in some embodiments, the user interfaces may include a seeding interface 1340, a training interface 1350, and a validation interface 1360.

In some embodiments, the annotation process involves an active learning procedure where labels for samples are iteratively acquired from the user 1320 which are used to train the classifier 1380. In each iteration, a set of the training samples may be selected, which are then presented to the user for annotation. In some embodiments, the training samples may be selected based on a confidence metric of the classifier's annotations. In some embodiments, the samples may be selected based an informative metric, selecting the most informative samples to train the classifier. As the iterations progress, the classifier becomes better, and can ultimately be used to predict on the rest of the media samples via an extrapolation operation 1370.

As shown, the process may initially begin with a seeding step. During this step, a seeding interface 1340 is generated. The seeding interface may display 1342 a selection of seeding images 1312 from the sample set 1310. In other embodiments, other types of media samples (e.g. video samples, audio samples, textual data) may be involved. Thus, in some embodiments, a set of seeding images 1342 is initially selected from the sample set 1310.

In some embodiments, the annotation system 1330 picks the seed images 1312 to select diversified image examples from the sample set 1310. In some embodiments, the seeding images may be selected in a pseudorandom manner. In some embodiments, the seed images may be selected according to feature representations of the images. In some embodiments, the feature representations may be an intermediate representation of the image or other media obtained from a known media analysis model, such as a publicly available image analysis neural network (e.g., the output of an intermediate layer in the neural network). In some embodiments, the dimensionality of the feature representation may be reduced (e.g. to a feature vector of a certain length) to be used as input to the classifier 1380. In some embodiments, these feature vectors are then used to obtain a set of diversified examples from the image set as the seed images. For example, a clustering technique may be used in some embodiments. In some embodiments, techniques such as k-medoids centroids are used to choose the seed images.

After the seeding interface 1340 is displayed, the user 1320 may provide 1344 annotations for the seeding images manually via the seeding interface 1340. The user-provided annotations are then provided 1346 to the classifier 1380, to initialize the active learning classifier 1380.

Next, as shown, the annotation system may display a set of training images 1352 from the labeled images set 1314 from the sample set 1310, as shown. The training images may be displayed via a training interface 1350, as shown. In some embodiments, the training images displayed in the training interface 1350 may be displayed with labels selected by the classifier 1380. In some embodiments, the training images that are displayed represents a set of the most confusing or informative samples for the classifier. For example, the degree of confusion of individual training images may be indicated via a confusion metric, or an uncertainty metric obtained from the classifier. In some embodiments, the confusion or uncertainty metric may be determined based on a class match probability computed by the classifier. In some embodiments, the uncertainty metric may be determined based on a degree of disagreement among of a number of different classifier models.

In some embodiments, the user 1320 may examine the training images 1352 and the labels selected by the classifier, and correct 1356 training images that were incorrectly classified by the classifier. In some embodiments, the user may interact with the training interface 1350 using user controls to correct the classifier-provided labels of individual images. The user corrected annotations are then used to update or train 1354 the classifier. In some embodiments, all of the training images selected for the training interface 1350 may be moved from the unlabeled images set 1316 to the labeled images set 1314, as the user annotates the training images. In some embodiments, the moving may be accomplished by updating an indication or designation of a training image in the unlabeled set to indicate that the image is now labeled. Depending on the embodiment, the move from the unlabeled set to the labeled set may be performed either just before or after the user actually performs the annotation. In some embodiments, the training interface 1350 may be used multiple times to train the classifier before moving on to the next step of the process.

After the classifier is trained with a set of training images, the annotation system 1330 may generate a validation interface 1360. The validation interface 1360 may display a set of selected test images 1362 from a test images set 1318 in the samples to annotate 1310. In some embodiments, the test images set 1318 may be selected randomly or in a stratified manner to make sure that all classes are equally represented. In some embodiments, a selection of the test images 1362 may be the displayed 1362 along with their classifier-selected labels. The user 1320, in turn, will visually determine and indicate 1366 if any of the test images were incorrectly labeled by the classifier. Based on the user's input, an accuracy or performance measure of the classifier 1380 is determined. In some embodiments, the accuracy or performance measure may be indicated as a precision, recall, or F1-score metric. In some embodiments, the accuracy or performance measure may be indicated to the user via the validation interface 1360. In some embodiments, the annotations of the user are not used to update or train the classifier model 1380. Rather, the images in the test set 1316 is only used to evaluate the classifier. In some embodiments, the test images that were displayed in the validation interface may be moved from the unlabeled image set 1316 to the labeled images set 1314. In some embodiments, the moving may be accomplished by updating an indication or designation of a test image in the unlabeled set to indicate that the image is now labeled.

In some embodiments, once an image or media sample in the sample set has been used in a training interface or a validating interface, that image or sample may be removed from the unlabeled images set 1316 and placed in the labeled images set 1314, so that they are no longer selected by the active learning algorithm. Accordingly, the active learning process allows the user to manually label a small portion of the images or media samples from the sample set 1310 as the classifier is being trained.

As shown, in some embodiments, the validation interface 1360 may also allow the user to indicate whether the classifier 1380 should be allowed to proceed to the extrapolation process 1370. The extrapolation process may be initiated, for example, because the accuracy level of the classifier in predicting user annotations have reached a certain threshold level. When the accuracy level of the classifier is satisfactory, the user may indicate 1369 that the extrapolation process may proceed. For example, in some embodiments, the user may click a "smart label" button to initiate the extrapolation process. In some embodiments, the annotation system 1330 may cause the classifier to programmatically annotate 1374 the remaining of the images 1372 in the image set via the extrapolation operation 1370. This then completes the annotation process for the image set 1310.

However, if the classifier is not yet performing sufficiently well, the user may indicate 1368 that the process should continue for more training. In some embodiments, the annotation system may go back to the training step, and generate the training interface 1350 once again, to allow the user to train the classifier with more images from another training set 1342 selected from the sample set 1310. The process thus repeats with repeated trainings and evaluations of the classifier, until the classifier is performing sufficiently well to label all of the images in the image set 1310. By using the active learning classifier, the annotation time for media data sets are vastly reduced. At the same time, the annotation system employs strategies to ensure that similar images are not surfaced back to the user. In some embodiments, the media annotation system 1330 may use an exploration-exploitation technique to ensure that similar images from the sample set are not repeatedly fetched for the actively learning process.

Figure 14:
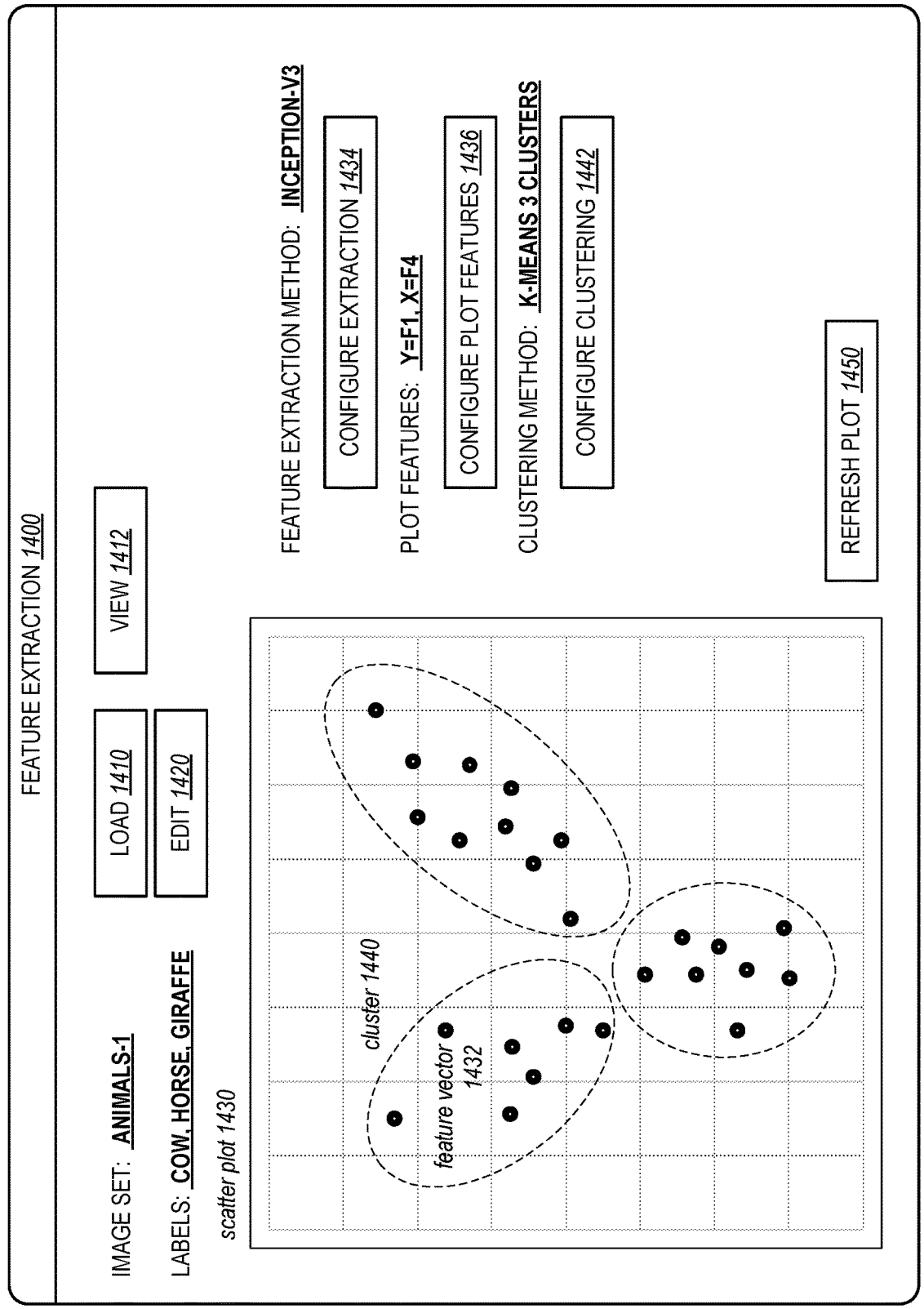
FIG. 14 illustrates an example graphical user interface that may be used to generate data sets to be annotated by the media annotation system based on features computed from the data sets, according to some embodiments.

FIG. 14 illustrates an example graphical user interface that may be used to generate data sets to be annotated by the media annotation system based on features computed from the data sets, according to some embodiments. In some embodiments, the feature extraction user interface 1400 may be implemented as part of the media data management interface 142 of FIG. 1, the data labeling component 234 of FIG. 2, or the media annotation system 1330 of FIG. 13.

As shown, the user interface 1400 may be used to load an image set (or some other media dataset) to be annotated (here the ANIMALS-1 image set), via the load button 1410. In some embodiments, the user interface 1400 may also include a view button 1412 that allows users to visually inspect the images or other media samples to be loaded. In some embodiments, the user interface 1400 may also include a button 1420 or other user control to allow a user to specify desired labels or annotations for images or other media samples in the dataset. In some embodiment, the definition of labels may be specified on a separate user interface.

As shown, in user interface 1400, a scatter plot 1430 is provided. In some embodiments, the annotation system may reduce all images in the image set to a feature vector, as discussed. In some embodiments, the manner in which the feature vectors are extracted may be configurable, for example, via a configure extraction button 1434. In this example, the feature extraction employs a known analysis model INCEPTION-V3, which may output the feature vector as an intermediate representation of an input image.

In some embodiments, the feature vectors may be visualized via a scatter plot, as shown. In some embodiments, the scatter plot 1430 may be implemented as a user control that allows users to view feature vectors in two-dimensional space, three-dimensional space, or spaces of higher dimensionality. In some embodiments, the user interface may include a button 1436 that allows users to configure which features should be used to make the scatter plot, or how the scatter plot should be displayed.

In some embodiments, the annotation system may cluster the images in the image set using a clustering technique. This clustering may be used to roughly determine different clusters of images with similar features in the image set. Thus, when data sets (e.g. seed image, unlabeled images, test images, etc.) are created from the image set for the annotation system, these data sets will each have a diversified sample of the image set. Moreover, the data sets may be generated so that their proportion of images from a particular feature cluster are approximately the same. This matching of the feature composition across the data sets reduces the risk of bias within any data set.

As shown, in this example, the scatter plot 1430 displays the feature vector 1432 of each image as a point in the plot, and also a cluster indicator 1440 for each determined cluster of images in the set. In some embodiments, the different clusters may be shown in different colors. In some embodiments, the user interface may provide a button 1442 to configure how the clustering is performed. In this example, the K-means clustering method is selected, and the cluster method is configured to recognized three clusters.

As shown, in some embodiments, the user interface 1400 may include a refresh plot button 1450, which allow the scatter plot 1430 to be refreshed, after configuration changes are made to the feature extraction method, the plot features, or the clustering method. In some embodiments, after the featurization process, the user may proceed to the subsequent labeling tasks.

Figure 15:
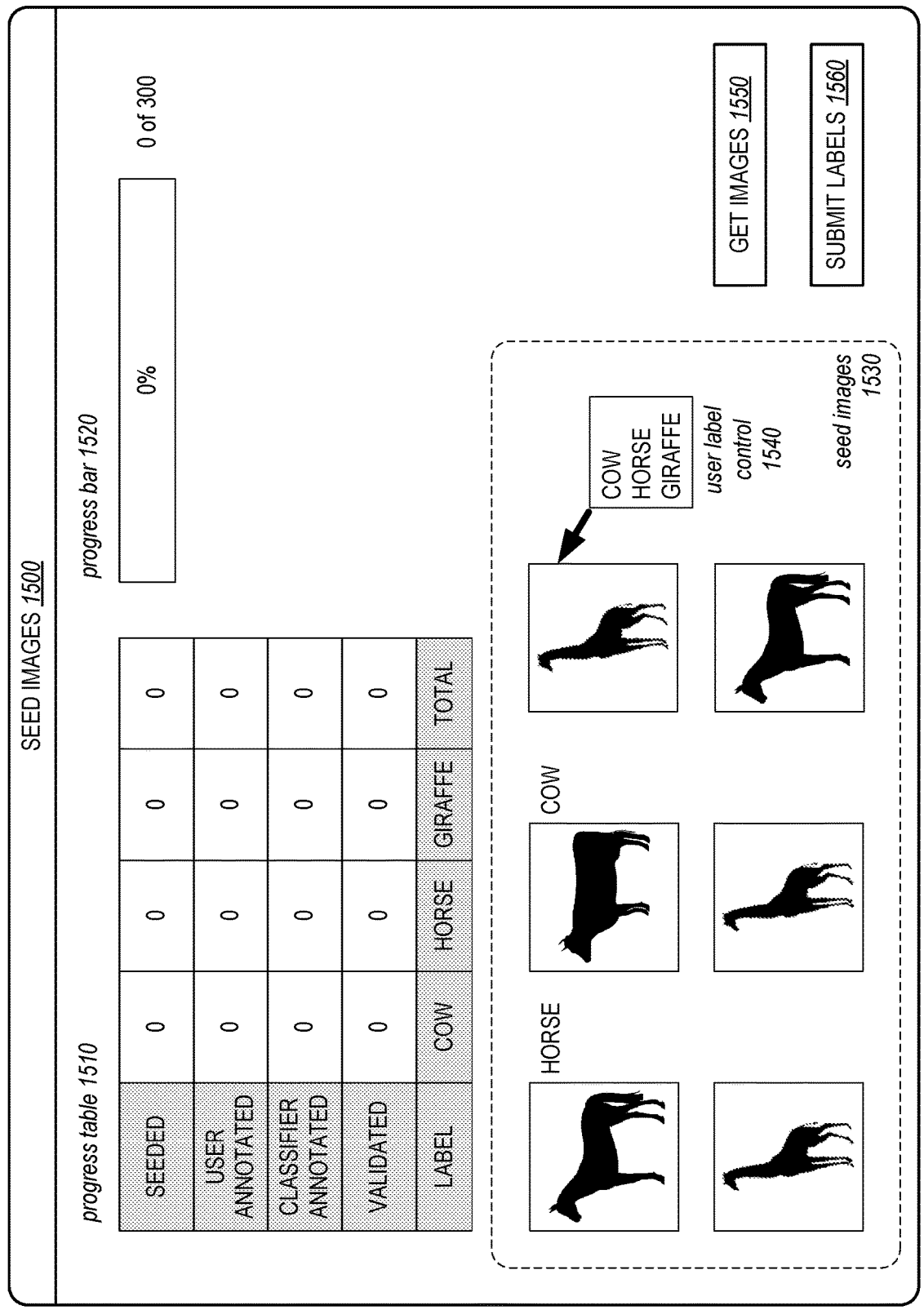
FIG. 15 illustrates an example graphical user interface that may be used to annotate seed media samples for the classifier in the media annotation system, according to some embodiments.

FIG. 15 illustrates an example graphical user interface that may be used to annotate seed media samples for the classifier in the media annotation system, according to some embodiments. In some embodiments, the seed images user interface 1500 may be implemented as part of the media data management interface 142 of FIG. 1, the data labeling component 234 of FIG. 2, or the media annotation system 1330 of FIG. 13.

As shown, user interface 1500 displays a set of seed images 1530 selected from a set of images to be annotated by the media annotation system. In this example, the images are to be annotated with labels COW, HORSE, or GIRAFFE. In some embodiments, at the seeding stage, only the user will provide annotations for the displayed seed images. The user's annotations will be used to initialized an active learning classifier, which will ultimately take over for the user to annotation all images in the image set.

On the top, the user interface 1500 displays a progress table 1510 and a progress bar 1520. In some embodiments, the progress table 1510 may display counts for different types of images. As shown in this example, the rows of the table are divided according to different types of annotated images: seeded, user annotated, classifier annotated (during training), and validated. At this point, all counts are zero. The progress bar 1520 may indicate the percentage of the image set that has been annotated. At this point, the percentage is zero. In some embodiments, as the annotation and active learning process progresses, the progress table 1510 and progress bar 1520 may be updated, so that the user can easily see how much of the image has been annotated.

At the bottom, the user interface 1500 displays a set of seed images from the image set. In some embodiments, the number of images in the seed set may be a small number of images of the entire set, and may be configurable by the user. The user interface 1500 may also provide a user label control 1540, which may allow the user to manually label each image, here, using a selection menu for COW, HORSE, or GIRAFFE. In some embodiments, the user interface 1500 may allow to multiselect images from the seed images 1530, so that the labeling can be accomplished faster. As shown, at this point, the user has labeled a first image HORSE and a second image COW.

In some embodiments, the user interface 1500 may provide a get images button 1550 to allow the user to get more images to label. In some embodiments, the button 1550 would move the annotation process to a training stage, where the classifier begins to annotate images from the training set.

In some embodiments, the user interface 1500 may provide a submit labels button 1560. This button may cause the user annotations shown on the user interface 1500 to be saved to the image repository. In some embodiments, any user annotated images or user validated images may be removed from the image set for further use in the interactive annotation process. Accordingly, as the process progresses, the image set becomes smaller.

Figure 16:
FIG. 16 illustrates an example graphical user interface that may be used to annotate training media samples for the classifier in the media annotation system, according to some embodiments.

FIG. 16 illustrates an example graphical user interface that may be used to annotate training media samples for the classifier in the media annotation system, according to some embodiments. In some embodiments, the training images user interface 1600 may be implemented as part of the media data management interface 142 of FIG. 1, the data labeling component 234 of FIG. 2, or the media annotation system 1330 of FIG. 13.

As shown, the user interface 1600 displays a set of training images 1630 selected from a set of images to be annotated by the media annotation system. The training images may be first annotated by the classifier. As shown, the displayed images 1630 are organized into label groups for HORSE, GIRAFFE, and COW (not shown) as determined by the classifier. In some embodiments, grouping the images in this fashion allows the user to more easily check the results of the classifier. In some embodiments, the displayed images 1630 may be selected based on a confusion or uncertainty metric, so that only images that are the most confusing to the classifier are displayed by the user interface 1600.

As shown, the user interface 1600 also provides user control elements to either accept or fix the annotations provided by the classifier. As shown, the accept all buttons 1632 and 1634 may be used to accept the images in their respective groups as correctly labeled. In some embodiments, the user correction control element 1640 may allow a user to manually correct the label provided by the classifier. In some embodiments, the control 1640 may be used to drag an image from one group to another on the user interface 1600. In some embodiments, the control 1640 may allow a user to multiselect images, so that multiple images can be relabeled or dragged at the same time. In some embodiments, those samples that have been corrected or touched by the user may be displayed in a different color, so that they are easily distinguished from the other samples.

On the top of user interface 1600, a progress table 1610 and a progress bar 1620 are shown. These elements may operate in similar fashion as the progress table 1510 and progress bar 1520 as discussed in connection with FIG. 15. As shown, at this point, no images have been added to counts for user-annotated images. However, the progress table indicates that six images have been seeded. The progress bar 1620 indicates that out of 300 images to be labeled, six (e.g. the six seed images) have been labeled. Finally, on the bottom right, a get images button 1650 allow the user to advance to a next screen or next set of images. In some embodiments, the image annotation system may provide several screens or sets of training images. In some embodiments, the next set of images may be a set of validation images to validate the classifier.

Figure 17A:
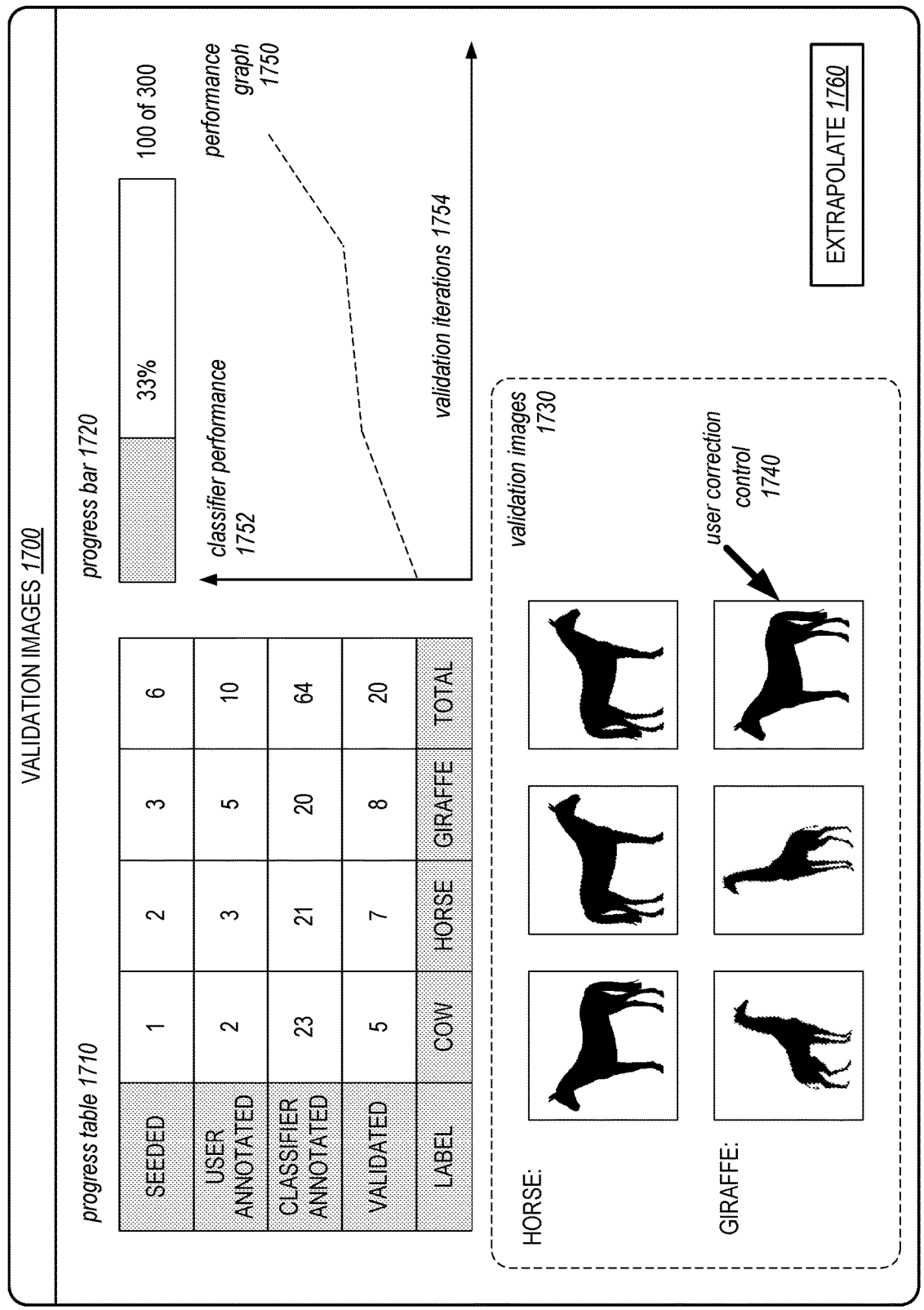
FIG. 17A illustrates an example graphical user interface that may be used to annotate validation media samples for the classifier in the media annotation system, according to some embodiments.

FIG. 17A illustrates an example graphical user interface that may be used to annotate validation image samples for the classifier in the media annotation system, according to some embodiments. In some embodiments, the validation images user interface 1700 may be implemented as part of the media data management interface 142 of FIG. 1, the data labeling component 234 of FIG. 2, or the media annotation system 1330 of FIG. 13.

As shown, the user interface 1700 displays a set of validation images 1730 selected from a set of images to be annotated by the media annotation system. At the validation stage, the validation images are first annotated by the classifier. As shown, the displayed images 1730 are organized into label groups for HORSE, GIRAFFE, and COW (not shown) as determined by the classifier. In some embodiments, grouping the images in this fashion allows the user to more easily check the results of the classifier.

As shown, the user interface 1700 also provides user control elements to fix the annotations provided by the classifier. As shown, the user correction control element 1740 may allow a user to manually correct the label provided by the classifier. In some embodiments, the control 1740 may be used to drag an image from one group to another on the user interface 1700. In some embodiments, the control 1740 may allow a user to multiselect images, so that multiple images can be relabeled or dragged at the same time. In some embodiments, when a label correction is made by the user in the validation stage, the classifier is not modified based on the user's changes. In some embodiments, the validation images are never used to train the classifier.

On the top of user interface 1700, a progress table 1710 and a progress bar 1720 are shown. These elements may operate in similar fashion as the progress table 1510 and progress bar 1520 as discussed in connection with FIG. 15. As shown, at this point, a number of images have been added to counts for all categories of image. As may be seen, the annotation process has already gone through at least one round of previous validation. The progress bar 1720 indicates that out of 300 images to be labeled, one hundred (33%) have already been labeled.

Moreover, the top portion of the user interface 1700 shows a performance graph 1750 of the classifier. In some embodiment, the performance graph 1750 may be included to show the classifier's performance 1752 over multiple iterations of validations 1754. For example, each time that a validation is performed via the validation images user interface 1700, the determined performance (e.g. precision or recall metric, etc.) may be captured. Such captured performance metrics over successive validations are shown in the performance graph 1750, thus displaying the performance progress of the classifier. In some embodiments, the performance graph 1750 may display a performance goal for the classifier, which if reached, allows the user to simply annotate the remaining images in the set using the classifier, without user supervision.

In some embodiments, each datum or sample (an image, for example) may be annotated with one or more labels. This is useful for scenarios where a single data displays one or more properties. For example, a one image may depict a man riding a horse, and therefore, it may be of interest to depict that image with both "man" and "horse" keywords. Accordingly, in some embodiments, the classifier model is able to select multiple labels for each sample, and the user interfaces may be configured to display multiple labels for each sample. In general, the MDE and the media annotation system is configured to support multi-class and multi-label samples.

Finally, on the bottom right, the user is provided with an extrapolation button 1760. In some embodiments, clicking extrapolation button 1760 will cause the annotation system to perform an extrapolation operation (e.g., operation 1370 of FIG. 13), and use the classifier to annotate the remaining images in the original image set. In some embodiments, the extrapolation button 1780 may be disabled until certain conditions are met, for example, until the classifier's performance is above a certain threshold, or after the classifier has gone through at least a certain number of rounds of training. If the performance of the classifier model is not yet satisfactory, in some embodiments, the media annotation system may allow the user to perform additional rounds of manual annotation or classifier training.

Figure 17B:
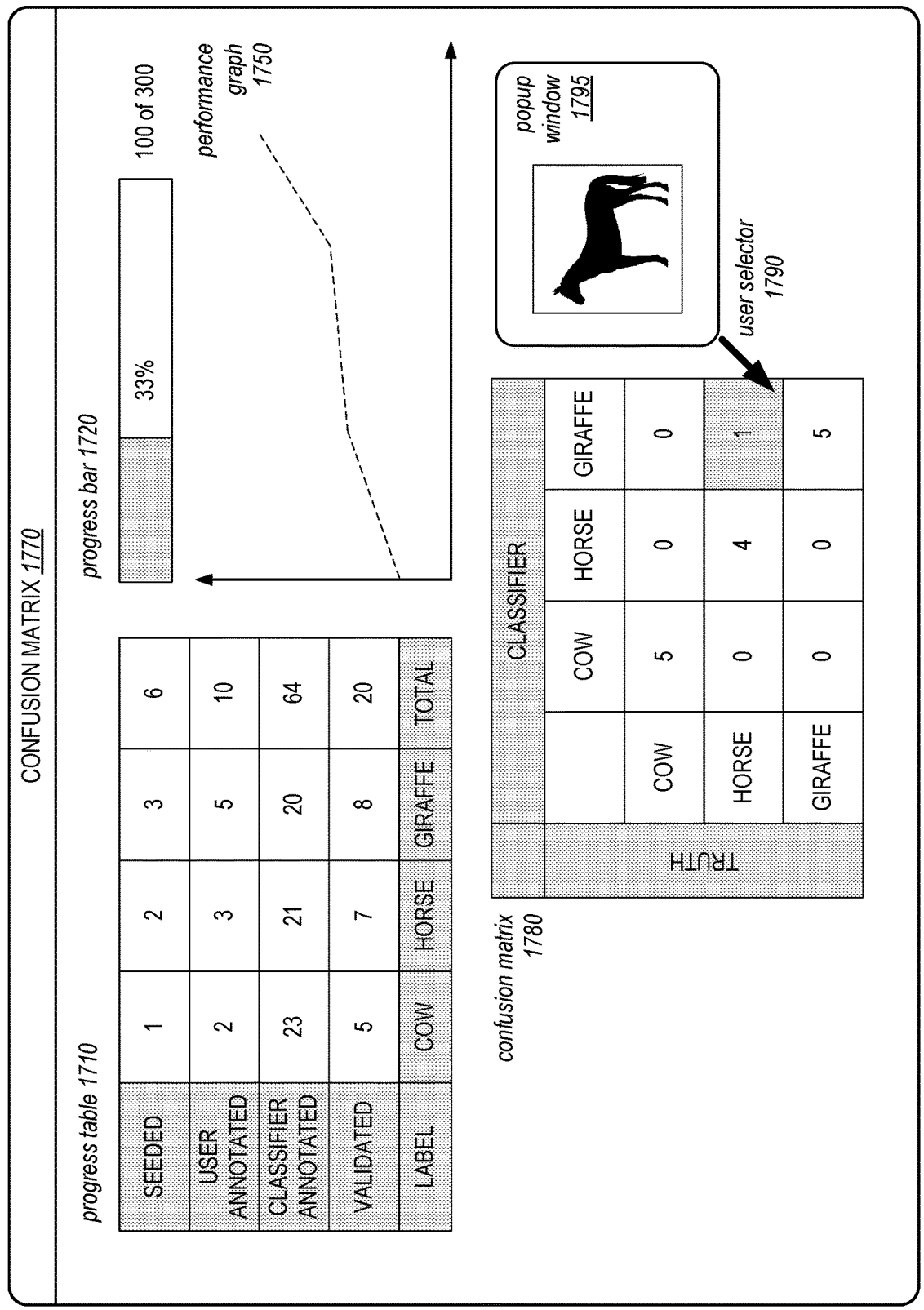
FIG. 17B illustrates an example graphical user interface that displays a confusion matrix of the validation media samples used to validate the classifier in the media annotation system, according to some embodiments.

FIG. 17B illustrates an example graphical user interface that displays a confusion matrix of the validation media samples used to validate the classifier in the media annotation system, according to some embodiments. In some embodiments, the confusion matrix user interface 1770 may be implemented as part of the media data management interface 142 of FIG. 1, the data labeling component 234 of FIG. 2, or the media annotation system 1330 of FIG. 13.

As shown, the user interface 1770 displays some similar user interface components as user interface 1700, including the progress table 1710, the progress bar 1720, and the performance graph 1750. In some embodiments, the user interface 1770 may be another view (e.g., a different tab) of the user interface 1700.

As shown, in some embodiments, the user interface 1770 may display a confusion matrix 1780. The confusion matrix 1780 may group the image samples into cells. Each cell may be defined by a truth label value and a prediction label value determined by the classifier 1380. Thus, each image sample displayed on the user interface 1700 may be assigned to one of the matrix cells based on its user-annotated label and its classifier-annotated label. Accordingly, this view allows the user to quickly understand where the classifier is still experiencing difficulties in its classifications. In some embodiments, the user may use this information to adjust which images are used to continue with the active learning process, to target particular weaknesses of the classifier.

As shown, in this example, a total of 15 image samples were presented on the validation user interface 1700, and all but one of the samples were annotated correctly by the classifier. However, there is one HORSE sample that was misclassified as GIRAFFE.

In some embodiments, the confusion matrix 1780 may allow users to select particular cells in the matrix and then display one or more images in the matrix. For example, as shown, the user may use a user selector 1790 (e.g. the user's cursor) to select a matrix cell. In some embodiments, the selection may be performed by hovering over a desired cell. In response, the user interface 1770 may then display a popup window 1795 (or some other GUI widget). The popup window 1795 may display one or more image samples, that fell within the selected matrix cell. In some embodiments, all of the samples belonging to the cell may be displayed. In some embodiments, a selection of one or more image samples belonging to the cell are displayed. In some embodiments, the selection may be performed randomly. In some embodiment, the selection may be performed according a metric such as a confidence metric associated with the classifier's annotation.

Figure 18:
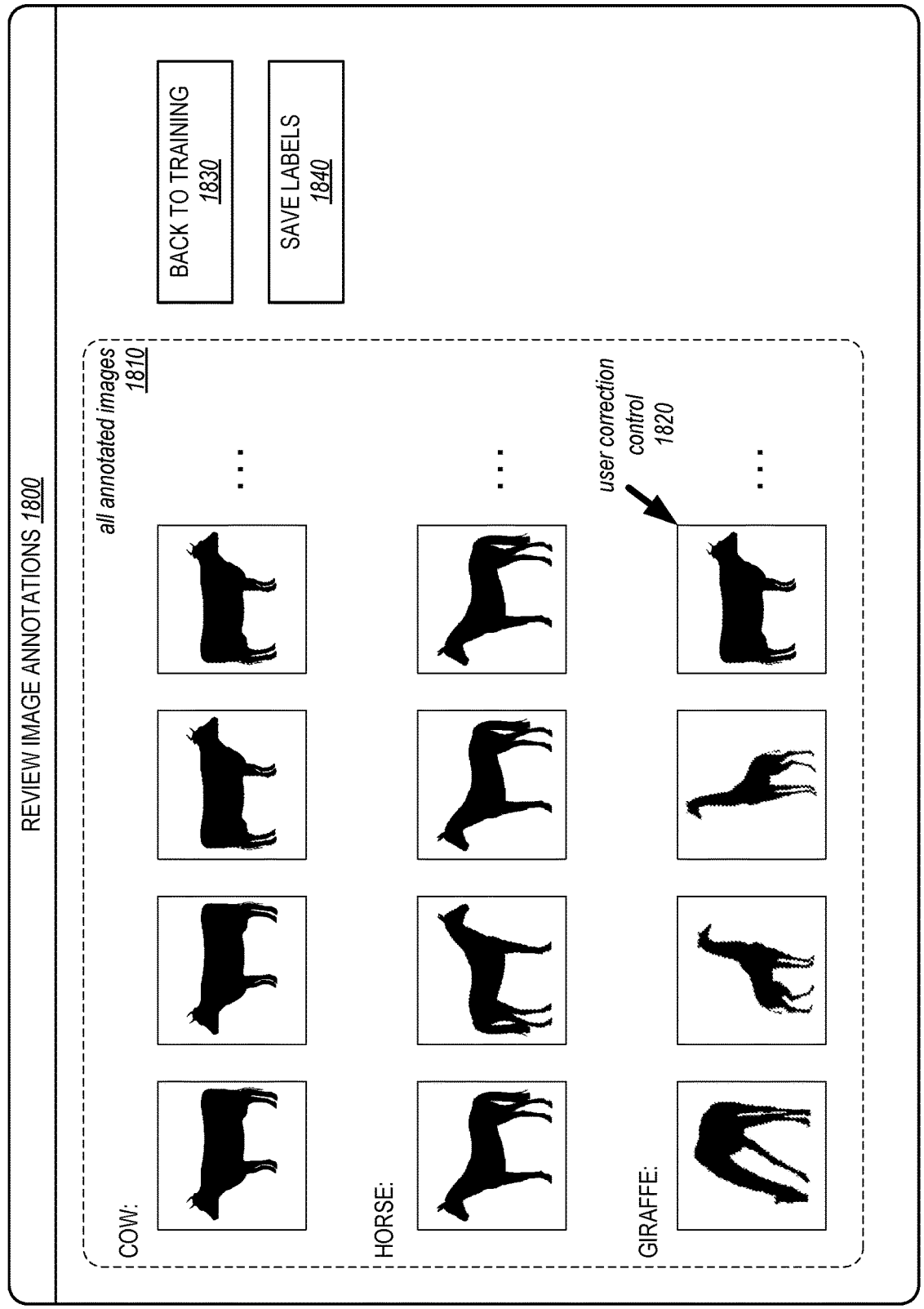
FIG. 18 illustrates an example graphical user interface that may be used to review media samples annotated by the classifier in the media annotation system, according to some embodiments.

FIG. 18 illustrates an example graphical user interface that may be used to review media samples annotated by the classifier in the media annotation system, according to some embodiments. In some embodiments, the review images annotations user interface 1800 may be implemented as part of the media data management interface 142 of FIG. 1, the data labeling component 234 of FIG. 2, or the media annotation system 1330 of FIG. 13.

As shown, the user interface 1800 displays all of the annotated images 1810 from the original image set. Some of the images may be annotated via an extrapolation operation, where the trained classifier annotates the images without user supervision. At the review stage, the user may be provided an opportunity to review the annotations of the classifier. As shown, the displayed images 1810 are organized into label groups for HORSE, GIRAFFE, and COW. In some embodiments, grouping the images in this fashion allows the user to more easily check the results of the classifier.

As shown, the user interface 1800 also provides user control elements to fix the annotations provided by the classifier. As shown, the user correction control element 1820 may allow a user to manually correct the labels of the annotated images 1830. In some embodiments, the control 1820 may be used to drag an image from one group to another on the user interface 1800. In some embodiments, the control 1820 may allow a user to multiselect images, so that multiple images can be relabeled or dragged at the same time. In some embodiments, when a label correction is made by the user in the validation stage, the classifier is not modified based on the user's changes.

In some embodiments, the user interface 1800 may allow the user to add or modify the set of labels that were originally selected for the sample set. For example, in some embodiments, the user interface 1800 may include buttons or controls to allow the user to add one or more labels. The user may then go back to the training process to train the classifier to apply the added labels. In some embodiments, the user interface 1800 may allow the user to split an existing label into two or more new labels. After the split, the user may then go back to train the classifier to distinguish samples for the two new labels.

As shown, on the right side, the user interface 1800 provides two buttons 1830 and 1840. In some embodiments, button 1830 may allow the user to take a step back and continue training the classifier. This step may be taken if the user finds that there are still too many errors in the annotated images 1810. On the other hand, button 1840 may cause the image annotations to be saved, with the user's select corrections. In some embodiments, this complete the image annotation process, leaving behind a set of annotated images that is ready to be used as data sets for model development. Because the user does not have to manually examine and label each individual image, the time needed to perform the annotation of images is dramatically reduced.

Figure 19A:
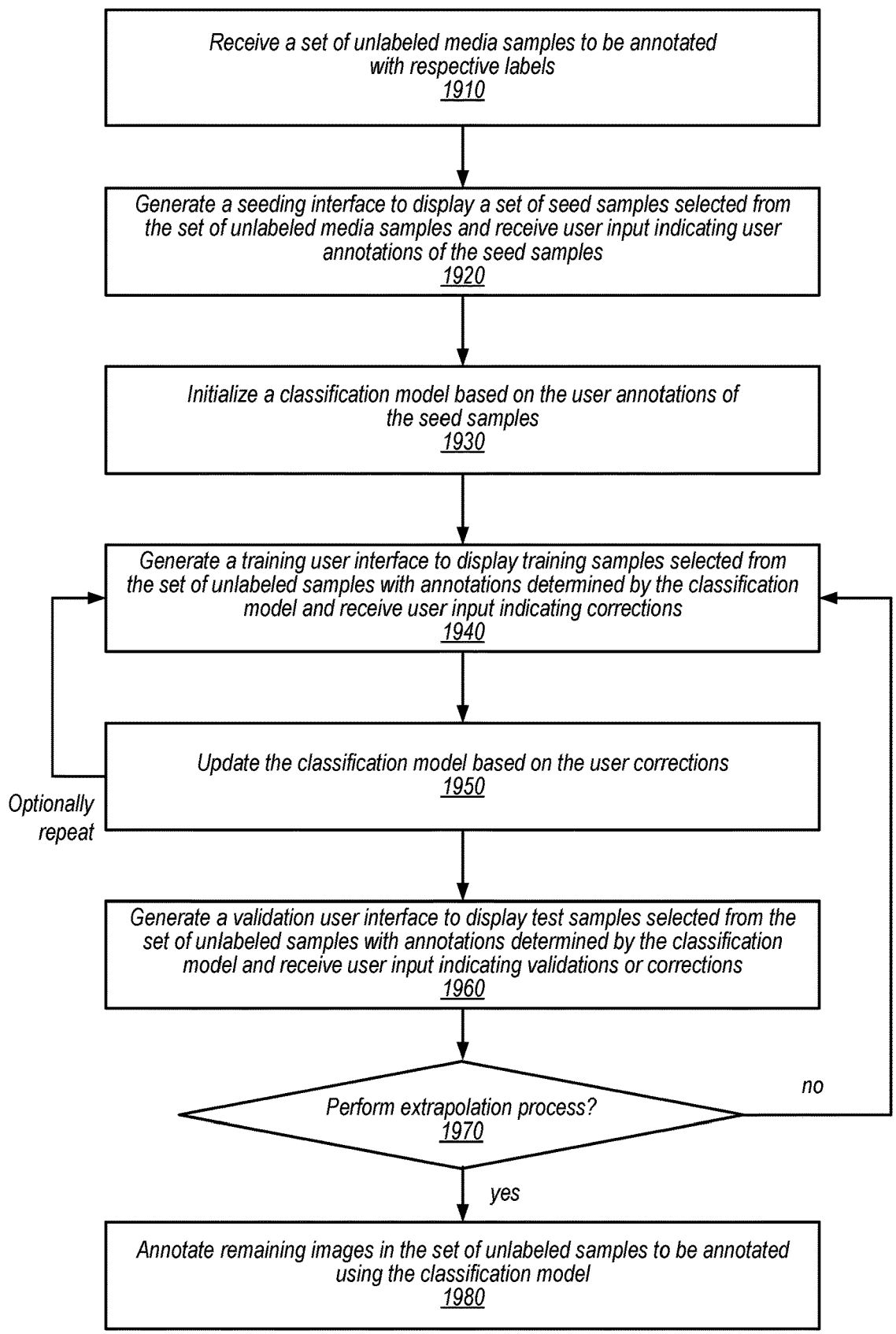
FIGS. 19A and 19B are flow diagrams illustrating a media sample annotation process using the media annotation system that trains an active learning classifier to annotate media samples for ML media model development, according to some embodiments.
Figure 19B:
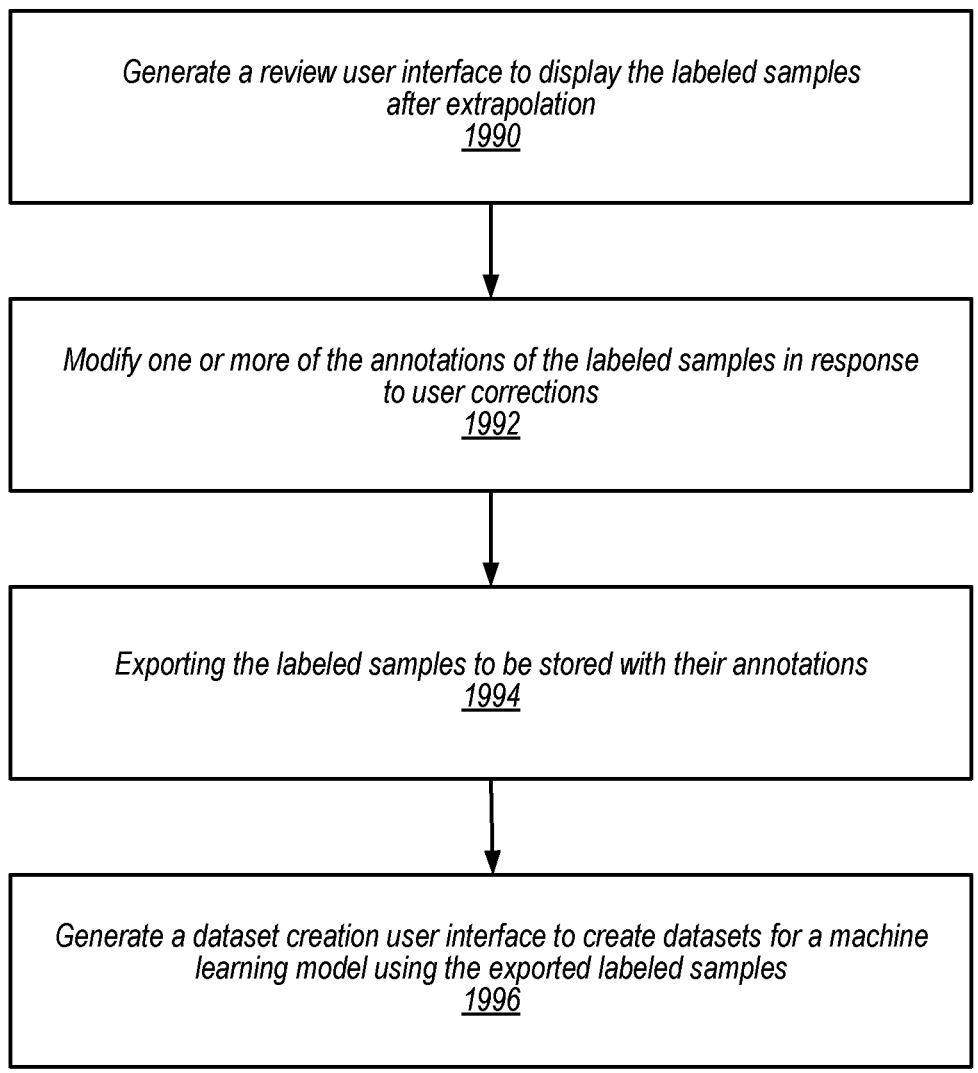

FIGS. 19A and 19B are flow diagrams illustrating a media sample annotation process using the media annotation system that trains an active learning classifier to annotate media samples for ML media model development, according to some embodiments. In some embodiments, the media annotation system may be the media annotation system 1330, as discussed in connection with FIG. 13.

At operation 1910, a set of unlabeled media sample to be annotated with respective labels are received. In some embodiments, the media samples may include images. In some embodiments, the annotated samples may be used to train or test ML media models in a MDE. As discussed, in some embodiments, the annotation process may be used to train a classifier or classification model.

At operation 1920, a seeding interface is generated to display a set of seed samples selected from the set of unlabeled media samples. In some embodiments, the seeding user interface may be the seeding interface 1340 of FIG. 13 or the user interface 1500 of FIG. 15. In some embodiments, the seeding user interface may be used to receive user annotations of the samples in the seeding set. In some embodiments, the data sets may be created in a manner so that each set will have approximately the same proportion of image having particular feature sets. In some embodiments, either before or after the seed samples (e.g. seed images) are annotated, the seed samples may be removed from the annotation process (i.e., the set of unlabeled images). In some embodiments, the removal may be performed by updating an indication or designation of a seed image to indicate that it is now in a labeled set.

At operation 1930, a classification model is initialized based on the user's annotations of the seed samples. In some embodiments, the classification model may be the classification model 1380 of FIG. 13. Depending on the embodiment, the classification model may employ one of a variety of different techniques. For example, different classification algorithms may include random forests, Support Vector Machines (SVM), logistic regression, a neural network, or k-NN (nearest neighbor) algorithms. In some embodiments, the initialization assigns the classification models with an initial set of parameters, which may be further tune in successive rounds of active learning.

At operation 1940, a training user interface is generated. The training user interface displays some media samples from a training set selected from the unlabeled set of samples, along with annotations that are determined by the classification model. In some embodiments, the displayed media samples (e.g. images) may be selected as the most informative samples for training or testing the classification model. Depending on the embodiment, different sampling strategies may be used. In some embodiments, a sampling may be performed using a confidence metric associated with the classifier model's annotation decisions, so that samples associated with lower confidence metrics are selected as training samples. In some embodiments, an entropy measure may be used to perform the selection, so that a diverse set of samples in terms of feature sets are selected. In some embodiments, a query-by-committee strategy may be employed to selection the training samples. In some embodiments, the displayed images may be grouped according to their classifier generated annotations. In some embodiments, the second user interface may be the training interface 1350 of FIG. 13 or the user interface 1600 of FIG. 16.

At operation 1950, the classification model is updated based on user corrections or annotation of the training set samples displayed. In some embodiments, the second user interface or training interface may provide controls to allow a user to correct the annotations selected by the classifier. In some embodiments, these corrections may be used to train or update the classifier model, so that it can improve its annotation performance over successive trainings In some embodiments, once the annotations of the displayed images are accepted by the user, the annotated images are removed from the annotation process (i.e., the set of unlabeled images). In some embodiments, the removal may be performed by updating an indication or designation of a training image to indicate that it is now in a labeled set. As shown, in some embodiments, the training user interface may be optionally generated multiple times, depending on system configuration. For example, in some embodiments, the annotation system may be configured to show three sets of training images, with each set having ten images. The process proceeds to the validation stage only after the user has corrected three sets of training images from the classification model.

At operation 1960, a validation user interface is generated. The validation user interface displays some samples from a test set selected from the set of unlabeled samples, along with annotations that are determined by the classification model. In some embodiments, the displayed samples or images may be grouped according to their classifier generated annotations. In some embodiments, the validation user interface may be the validation interface 1360 of FIG. 13 or the user interface 1700 of FIG. 17A. Similar to the training user interface, the validation user interface may provide controls to allow a user to correct or validate the annotations selected by the classifier. However, corrections to the images from the test set may not be used to update the classifier model. In some embodiments, images that were correctly labeled by the classifier (e.g. the validated images) may be removed from the set of unlabeled images. These validated images are thus not to be used for subsequent rounds in the annotation process. In some embodiments, the removal may be performed by updating an indication or designation of a test image to indicate that it is now in a labeled set. In some embodiments, images that were incorrectly labeled by the classifier may remain in the set of unlabeled images. In some embodiments, after the user finishes correcting the annotated test images, the validation user interface may display a performance metric of the classifier. In some embodiments, the validation user interface may display a graph of the classifier's performance over successive rounds of validations or a confusion matrix indicating a count of samples that were correctly and incorrectly annotated for each label.

In some embodiments, the confusion matrix displayed may be the confusion matrix 1780 shown in FIG. 17B. In some embodiments, the confusion matrix may allow a user to select a cell in the matrix, which will then cause a popup window to be displayed showing one or more samples (e.g. images) that belong to the cell. For example, in some embodiments, all of the images belonging to a cell may be displayed if a user clicks or hovers over the cell. In some embodiments, only a selection of samples in the cell may be displayed. The displayed images may be selected based on an entropy measure or a confidence metric, as discussed previously. As may be understood, the confusion matrix allows users to better understand the current weaknesses of the classification model, and possibly adapt additional training to target those weaknesses.

At operation 1970, a determination is made whether an extrapolation process should be performed using the classifier model. In some embodiments, the determination is made based on received user input, which may be provided via a control element (e.g. a button) on the validation user interface. During the validation stage, the user may examine the performance of the classifier model. If the user decides that the classifier is performing sufficiently well (e.g., it is accurately predicting the correct annotations for 100% of the images in the test set), the user may approve the classification model to carry out the extrapolation process. If the extrapolation process is indicated, the process proceeds to operation 1980. Otherwise, the process loops back to operation 1940, where an additional round of interactive annotation and classifier training and testing is performed.

After each round of annotations, accuracy metrics such as F1 score, precision, recall or the confusion matrix may be displayed to help the user understand the state of the classifier.

At operation 1980, if the extrapolation process is indicated, the media annotation system may use the classifier model to annotate the remaining samples in the set of unlabeled samples. This can be done in two ways: first, extend predictions to all unlabeled images; second, extend predictions to those unlabeled examples which have confidence scores greater than a threshold. In some embodiments, the specified thresholds enable users to export only the most accurate and trustworthy classifications.

In some embodiments, the process depicted in FIG. 19B may occur after or as a continuation of the process of FIG. 19A. In some embodiments, the operations 1990, 1992, and 1994 may be performed by the media annotation system 1330 of FIG. 13.

At operation 1990, a review user interface is generated to display the labeled samples after the extrapolation process. In some embodiments, the review interface may be the user interface 1800 of FIG. 18. In some embodiments, the review interface may display some or all of the labeled images in the labeled set, along with their classifier-determined labels. In some embodiments, samples with the same labels may be grouped together. In some embodiments, samples with the same labels may be indicated in a same color. In this manner, the labeled images may be quickly checked to determine if the classifier has made any errors.

At operation 1992, one or more of the annotations of the labeled images are modified in response to user corrections. In some embodiments, the review user interface may allow users to manually correct incorrect labels applied by the classification model. In some embodiments, such corrections may not change the classification model. In some embodiments, the user may also specify that one or more additional labels should be added for the media samples. The user may then return to the previous user interfaces to train the classifier to apply the additional labels. In some embodiments, the user may also indicate that one or more existing labels should be split into new labels. In that case, the user may return to the previous user interfaces to train the classifier to apply the new labels.

At operation 1994, the labeled samples are exported. The exporting may store the media samples with their annotations. For example, in some embodiments, image samples may be saved into a folder based on the images' labels. In some embodiments, samples may be saved to a database, with the labels as their metadata. In some embodiments, only a selection of the labeled samples may be exported. For example, only a selection of the samples with the highest confidence metrics (or those meeting a confidence threshold) may be selected for export. In some embodiments, any samples that were annotated by the user is selected for the export. By using the confidence threshold, the annotation ensures that the exported images are correctly labeled to a high degree of probability.

As may be understood, annotation may be performed programmatically and without any interaction from the user. In some cases, very large sets of images may be accurately labelled by a classifier with just a few rounds of training and validation. Thus, as may be understood, the use of the classifier model dramatically reduces the amount of time needed to annotate media data sets.

At operation 1996, a dataset creation user interface is generated to create datasets for a machine learning model using the exported labeled samples. In some embodiments, this operation may be performed by a dataset creation user interface, for example user interface 600 of FIG. 6. For example, the dataset creation interface may allow a user to define one or more classes for a model experiment based on the labels. In some embodiments, the dataset creation interface may allow the user to generate training, validation, and test datasets by specifying the proportion of different labels in each dataset. The datasets created may then be used to define and launch a model experiment.

Figure 20:
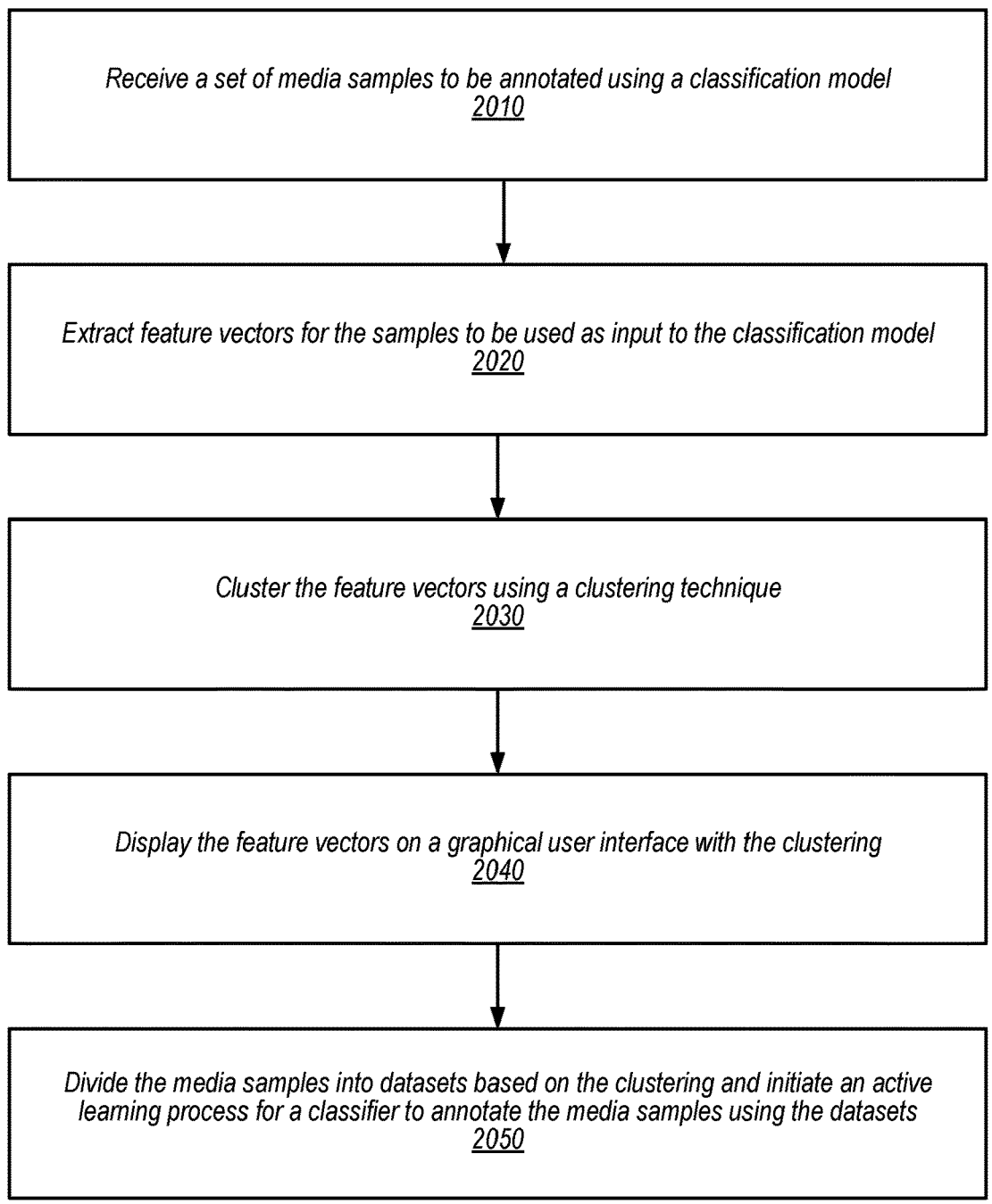
FIG. 20 is a flow diagram illustrating a process in the media annotation system to generate, using a clustering technique, training and test data sets for an active learning classifier used to annotate media samples, according to some embodiments.

FIG. 20 is a flow diagram illustrating a process in the media annotation system to generate, using a clustering technique, training and test data sets for an active learning classifier used to annotate media samples, according to some embodiments. In some embodiments, the media annotation system may be the media annotation system 1330, as discussed in connection with FIG. 13, and some of the operations shown may be performed via the user interface 1400, as discussed in connection with FIG. 14.

At operation 2010, a set of media samples to be annotated is received. In some embodiments, the media samples may be images annotated using a media annotation system such as media annotation system 1330, which trains an active learning classifier with user annotations, and then allows the classifier to annotate the remaining images after it has reached a sufficient level of accuracy as a result of its learnings. In some embodiments, the images or media samples may be received using a data import component, such as the data import component 232 of FIG. 2.

At operation 2020, respective feature vectors are extracted for the samples. In some embodiments, the feature vectors may be used as input to the classification model. In some embodiments, the feature vectors may be determined from an existing media analysis model, for example, from an intermediate layer of a publicly available media analysis neural network. In some embodiments, the feature vectors may represent a feature map of different areas of an image. In some embodiments, the extraction process may reduce the dimensionality of the feature map to produce the feature vectors.

At operation 2030, a clustering technique is used to cluster the feature vectors using a clustering technique. For example, in some embodiments, a K-means technique may be employed, as shown in FIG. 14. In some embodiments, the clustering allows groups of images in the images set with similar feature sets.

At operation 2040, the feature vectors are displayed on a graphical user interface with the clustering. In some embodiments, the clustering may be displayed on a user interface, such as user interface 1400 of FIG. 14. In some embodiments, the clustering may allow the user to visualize the different clusters of similar images or media samples, to allow the user to gain some intuition as to the different types of images in the media samples set. In some embodiments, the graphical user interface may allow the user to change the way that the feature vectors are extracted or the way that the feature vectors are clusters, for example, by selecting different algorithms or parameters for the extraction and the clustering.

At operation 2050, the media sample set is divided into datasets based on the clustering, and an active learning process is initiated for a classifier to annotate the media samples using the datasets. In some embodiments, the active learning process may be performed in similar fashion as discussed in connection with FIG. 19A. In some embodiments, the datasets may include a seed set, which is used to initialize the classifier, and an unlabeled set of samples, which will be gradually moved to a labeled set as the user labels or verifies samples. In some embodiments, the images or samples may be assigned based on their cluster membership. For example, if there are three clusters of feature vectors, each of the datasets may be assigned approximately the same proportion of images from each cluster. In some embodiments, the proportions of images from each cluster may be configurable for each data set. In some embodiments, the annotation process may select image batches on an as-needed basis from the media sample set at individual steps of the annotation process (e.g., seeding step, training step, validation step, etc.), and this selection may be performed according to the clustering, to balance the proportions of sample features used for the different steps.

Figure 21:
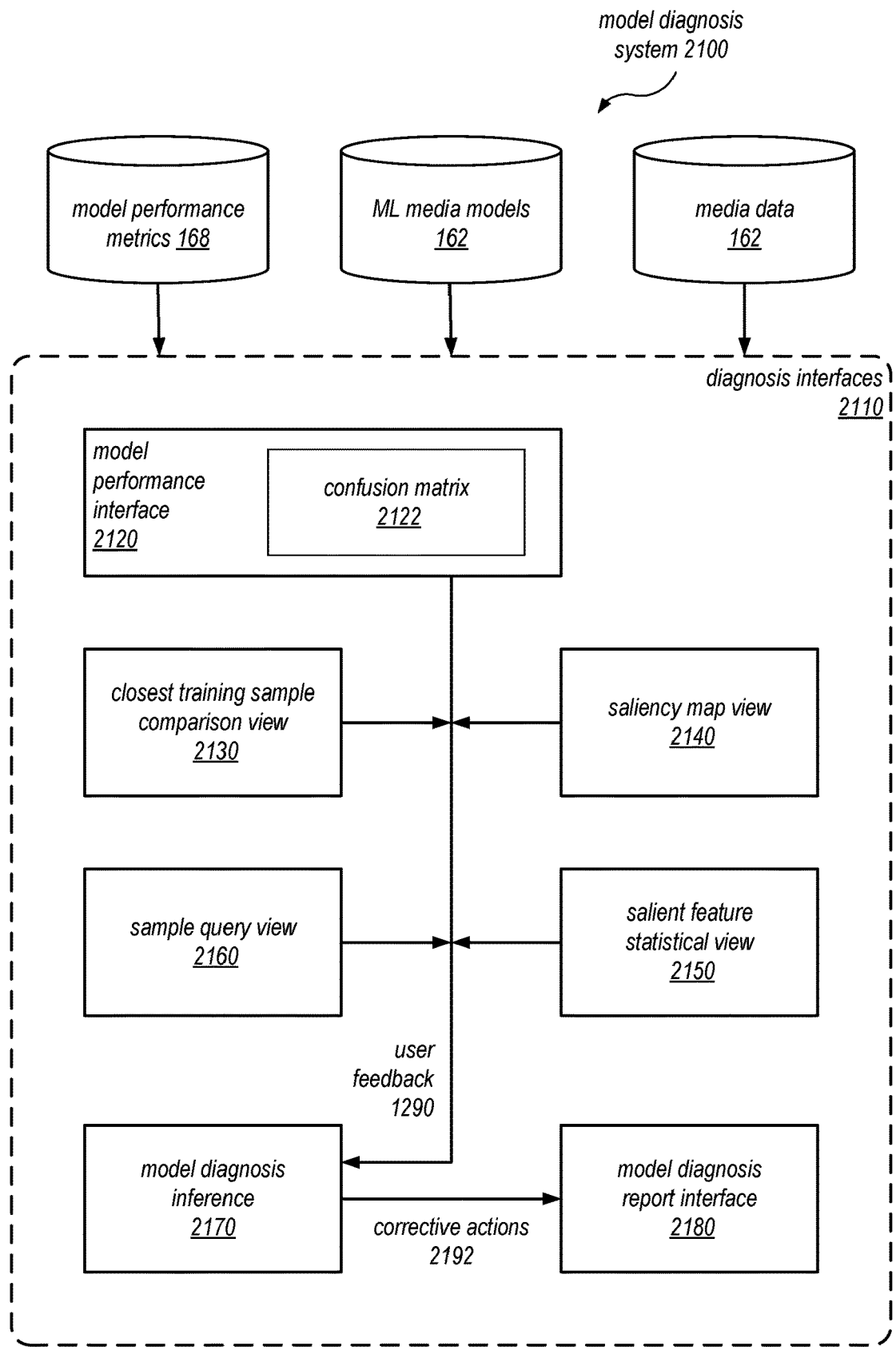
FIG. 21 is a block diagram illustrating an example model diagnosis system in the MDE that determines corrective actions to improve prediction performance based on user feedback, according to some embodiments.

FIG. 21 is a block diagram illustrating an example model diagnosis system in the MDE that determines corrective actions to improve prediction performance based on user feedback, according to some embodiments. In some embodiments, the model diagnosis system 2100 may be implemented as part of the model diagnosis interface 148 of FIG. 1, or using components in the model review layer 250 of FIG. 2.

As may be understood, after a classification model is trained, the model developer may face two primary challenges. First, the developer must verify whether the model has learnt what it is supposed to learn. Second, the developer must understand whether the data used for training was of sufficient quality and size. Gaining insights into a model's prediction can help to improve the model quality, increase trust and transparently, and reduce bias. However, the machine learning community present lacks a standard set of tools to help developers to answer these questions. Although some software packages have become available in other machine learning domains, model developers for ML media models still rely on ad hoc and self-developed processes to derive insights about and diagnose problematic model behaviors. The lack of an easy-to-use set of model diagnosis tools generally hinders widespread usage of conventional model development systems.

Accordingly, embodiments of the model diagnosis system disclosed herein implements a set of model diagnosis tools that allow developers to visually analyze the decisions of ML media models, in particular classification models. In some embodiments, the model diagnosis system 2100 allows users to view test samples used to test the ML media model, and then provide feedback based on observations about the test samples. In some embodiments, the model diagnosis system 2100 may aggregate user feedback 2190 for different types of test samples and determine or infer a set of corrective actions 2192 to improve model performance. For example, such corrective actions 2192 may include making certain modifications to the training data set, or certain changes to the ML media model itself.

In some embodiments, the model diagnosis system may provide a series of diagnosis interfaces 2110 that allow users to view the model's test results in different ways. Depending on the embodiment, these interfaces may be implemented as different types of graphical user interfaces. For example, in some embodiments, these interfaces may be implemented as one or more GUI windows or panels. In some embodiments, there interfaces may be implemented as a web interface, which is provided in one or more web pages to a web browser.

As shown, in some embodiments, the model diagnosis system operates using data from a number of repositories. As shown, the system uses data from the model performance metrics repository 168, the ML media model repository 164, and the media data repository 162. These repositories may operate as part of a model development environment, and operate in similar fashion as discussed in connection with FIG. 1.

As shown, in some embodiments, the diagnosis interfaces 2110 may include a model performance interface 2120. In some embodiments, the model performance interface 2120 may display various performance metrics of the model, determined based on its prediction results. In some embodiments, the performance metrics may include measures such as precision, recall, F1 score, among other metrics.

In some embodiments, the model performance interface 2120 may provide a confusion matrix 2122. In some embodiments, the confusion matrix may group the test samples into cells according to their respective truth classes and predicted classes. In some embodiments, the confusion matrix may comprise a matrix that shows, for individual test samples in the test set, the truth class of the test sample (along one dimension of the confusion matrix) and the model predicted class of the test sample (along the other dimension of the confusion matrix). Thus, in some embodiments, the diagonal calls in the confusion matrix represent correct predictions by the model, and the other cells in the confusion matrix represent incorrect predictions by the model. In some embodiments, the confusion matrix 2122 allows the user to quickly see class pairs that are the most confusing to the ML media model. In some embodiments, the cells of the matrix simply indicate a count of samples that fell within the cell. In some embodiments, the confusion matrix 2122 may provide a zoomable or clickable interface that allows users to view the individual samples that fell within each cell. In some embodiments, the model performance interface 2120 may allow users to select groups of samples (e.g. an entire cell in the confusion matrix) or individual samples, and open another diagnosis interface to further analyze the selected sample(s) individually.

Depending on the embodiment, the various diagnosis interfaces may be generated in different order, or according to a particular diagnosis flow. In some embodiments, when the user zooms in on a particular cell of the confusion matrix, the user may click on an image of choice. In some embodiments, after the selection, the user may be provided with a choice of links to open different diagnosis interfaces. In some embodiments, the diagnosis interface may be used for a single image (e.g. the selected image). In some embodiments, the diagnosis interface may be used to visualize a selected set of images (e.g. all images in a selected matrix cell). In some embodiments, some of the diagnosis interfaces may allow user to directly make changes to the datasets (e.g., to correct mislabeled training data, to add different samples to the training data, etc.).

In some embodiments, the model diagnosis system 2100 may provide a closet training sample comparison interface 2130. The closest training sample comparison interface or view 2130 may provide, for one or more samples from the test set, a closest sample from the most likely predicted class that and a closest sample from the second most likely predicted class. In some embodiments, the first mostly likely predicted class may be the incorrect class chosen by the model, and the second most likely predicted class may be the correct class of the test sample. By displaying the two closest samples from the two respective classes, the interface 2130 allows users gain some understanding as to why a test sample in question was classified the way it was. For example, it may be readily observed from the view 2130 that the model had learned to distinguish between classes based on a misleading feature in the sample. As another example, the view 2130 may make it apparent that one of the training samples is mislabeled, and that the model had not been properly trained. In some embodiments, to determine the closest sample in a class, the model diagnosis system 2100 may obtain a feature vector from the misclassified sample (e.g., one that was used as an intermediate result by the model), and compute a distance metric between the feature vector of the test sample and respective feature vectors of samples in the training set. In some embodiments, the distance metric may be the Euclidean distance between the two vectors. In some embodiments, one or more training samples from the class that has the shortest or smallest distance to the test sample is chosen to be displayed on the closet training sample comparison view 2130. In some embodiments, the closest training samples from more than two of the classes (e.g. all of the classes) may be shown on the view 2130. In some embodiments, the view 2130 may show a list of the closest training samples from the training set with their respective classes.

In some embodiments, the model diagnosis system 2100 may provide a saliency map view or interface 2140. In some cases, a saliency helps a developer to understand which features of the input sample (e.g. image pixels) were important for the model's prediction. In some embodiments, saliency maps show the contribution of different regions in the image (in some cases different pixels) to the model's prediction. In some embodiments, such saliency maps may be shown as a grayscale image, where the greater the brightness, the greater a pixel's importance. In some embodiments, the saliency map may be obtained by taking the gradient of the predicted class with respect to the input pixels or regions. The gradient may indicate how much a small change to each pixel would affect the prediction. In some embodiments, a "SmoothGrad" technique may be used to generate saliency maps, where pixel-wise Gaussian noise is added to many copies of the image, and the resulting gradient of the predictions are averaged. In some embodiments, the process may smooth out noisy gradients to obtain a clean result. In some embodiments, a saliency map may be made based on image regions that are larger than the pixel. In some embodiments, the importance or saliency of each region or pixel may be determined by graying out particular pixels or regions.

In some embodiments, the saliency map view 2140 may further enhanced visualization by plotting a rectangular box or bounding box around the most important or salient region in the sample that contributed to a prediction. In some embodiments, to determine the most important pixels or region, a thresholding technique may be applied on the saliency map. In some embodiments, a bounding box is fit over a large contiguous blob of salient pixels in an image.

In some embodiments, the model diagnosis system may display the prediction results of a media model in a confusion matrix. In some embodiments, the confusion matrix may show the different classes of the classifier in its two dimensions. The truth classes of test samples may be shown in one dimension, and the model predicated classes of test samples may be shown in the other dimension. Thus, each test sample may be assigned to a cell in the confusion matrix based on its true class and its predicated class.

In some embodiments, the model diagnosis system 2100 may implement a salient features statistical view 2150. As may be understood, in some cases, machine learning classification models do not perform well in real-life scenarios because the model has learned to rely on surprising features in the training samples that do not translate to the real world. For example, in one instance, a machine learning model that was trained to distinguish wolves and huskies had actually learned to make its classification based on whether there was snow in the background.

To help model developers recognizes these types of problems with models, in some embodiments, the salient features statistical view 2150 allows users to see which salient features from training or test samples are being used by the model. In some embodiments, after a model is trained, the most salient regions of the test samples are gathered and clustered. These clusters of salient regions are then annotated by users using semantically meaningful labels. Using these labels, the salient features statistical view 2150 may display, for particular categories of samples, which salient features from those samples dominated their classification decision. For example, the salient features statistical view 2150 may show that, for a group of samples that were misclassified, the top two or three sample features that caused their misclassification. As another example, the salient features statistical view 2150 may show that, in a group of training samples, which top features the model has learned to rely on to distinguish between classes. In some embodiments, the view 2150 may display a chart indicating the distribution of different types of salient regions determined in the samples selected.

In some embodiments, the model diagnosis interface may provide a sample query interface of view 2160 that allows users to perform ad hoc queries about a particular sample to obtain a class prediction for that sample. In some embodiments, the query interface 2160 may display query results by displaying the match probabilities for each class as computed by the ML media model. In some embodiments, the query interface 2160 may display one or more saliency maps for the queried sample with respect to the different classes. In some embodiments, the query interface may one or more training samples from the training set that are similar to the queried sample, for example, one or more training samples that have a close or similar feature vector to the queried sample. In some embodiments, the query interface may include user control elements to allow users to alter the query sample, for example to add or remove one or more elements in the sample, and easily rerun the query. Accordingly, the query interface 2160 allows developers to quickly understand the impact of the various features on the model's classification behavior. Moreover, the query interface allows developers to easily discover labelling errors in the training data, because similar training samples are obtained and displayed with the query results.

In some embodiments, the model diagnosis system 2100 may gather user feedback 2190 from diagnosing misclassified samples, and generate a model diagnosis report 2180. In some embodiments, the report may indicate corrective actions 2192 that are inferred from the user's feedback 2190. In some embodiments, the corrective actions 2192 may include actions to improve the training dataset, to remove excessive redundancies in the testing dataset, or to modify parameters or architecture of the ML media model itself. In some embodiments, a diagnosis report interface 2180 may be generated to display a prioritized to-do list of actions to improve the accuracy of the sample classification model. In some embodiments, the to-do list may be sorted in the order of impact on a chosen accuracy measure, for example the F1 score. In some embodiments, the diagnosis report interface 2180 may include user control elements to allow users to implement the recommended fixes. For example, the diagnosis report interface may include buttons to allow users to search for additional training samples of a particular type, over the web or from local data repositories. In some embodiments, a "fix labels" button may allow a user to invoke one or more user interfaces that are part of the media data management interface 142, as discussed in connection with FIG. 1.

As may be understood, these model diagnosis tools and user interfaces, the model diagnosis system 2100 improves upon the functioning of conventional ML media model development systems. The model diagnosis tools allow users to quickly gain deep insight into model performance beyond just the validation a test scores, and provides a wholistic evaluation of the performances of ML media models.

Figure 22A:
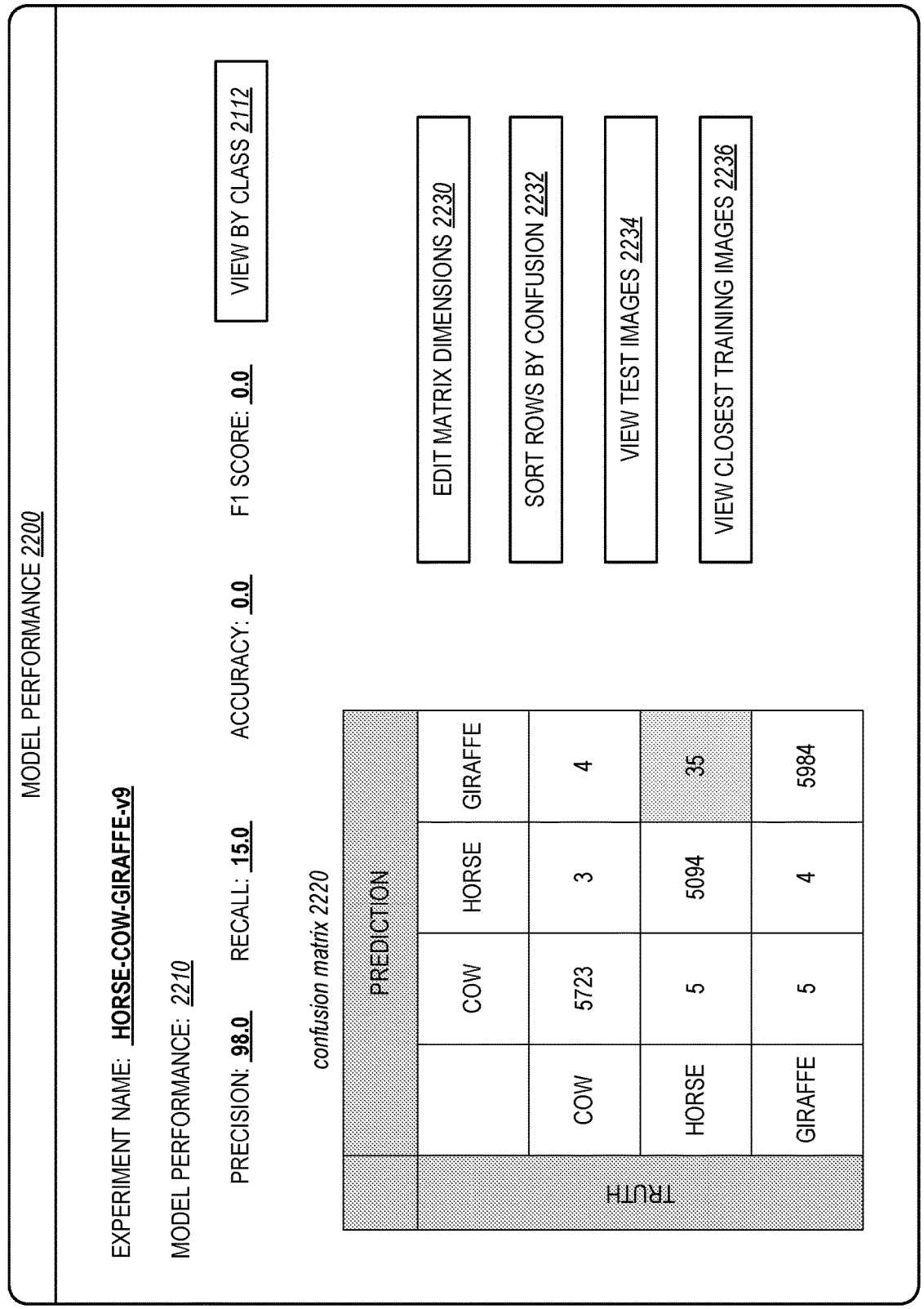
FIG. 22A illustrates an example graphical user interface in the model diagnosis system that may be used to review model performance using a confusion matrix, according to some embodiments.

FIG. 22A illustrates an example graphical user interface in the model diagnosis system that may be used to review model performance using a confusion matrix, according to some embodiments. In some embodiments, the model performance user interface 2200 may be implemented as part of the model diagnosis interface 148 of FIG. 1, using one or more components in the model review layer 250 of FIG. 2, or as part of the model diagnosis system of FIG. 21.

As shown, in some embodiments, the user interface 2200 may display performance results of an ML media model, after it has been tested using a test set. In some embodiments, as discussed, the testing of the ML media model may be performed as a model experiment in a model development environment (e.g. MDE 130 of FIG. 1). In this example, as shown, the performance results shown are for an experiment HORSE-COW-GIRAFFE-v9.

As shown, the user interface 2200 may indicate different types of performance metrics 2210. In this example, the performance metrics include precision, recall, accuracy, and F1 score. As discussed, these metrics may be compiled by from the raw prediction results of the model and saved in a performance metrics data store. In some embodiments, additional types of performance metrics may be defined and added to the system. In some embodiments, the user interface 2200 may allow users to view the performance metrics for different subsets of test data. For example, button 2112 allows the user to view the performance metrics by class.

As shown, the user interface 2200 includes a confusion matrix 2220. In some embodiments, the confusion matrix may be provided to show, for each class of test images, which classes they were classified to by the ML media model. As shown, in this example, the classes used by the model are COW, HORSE, and GIRAFFE. Each cell in the matrix indicates a count of test images for a particular truth class (indicated by the cell row) that were predicted to be a particular predicted class (indicated by the cell column). As shown, the diagonal cells in this case represent the correctly predicted images, and the other cells in the matrix represent the incorrectly predicted images.

In some embodiments, the dimensions of the confusion matrix may be configured. For example, button 2230 may allow dimensions to be added or removed from the confusion matrix display. Removing some of the rows or columns from the confusion matrix 2220 allows users to focus on just a subset of the misclassifications.

In some embodiments, the matrix rows may be sorted so that the truth class with the highest error are shown first. In some embodiments, the sort order of the confusion matrix 2220 may be configured by the user. The sorting may be made based on the values of any column, any row, or any group of columns or rows. In this example, as shown, button 2232 may be used to sort the rows of the confusion matrix.

In some embodiments, other ways of visualizing the images in each cell may be provided. For example, as shown, user interface 2200 provides a button 2236 to allow users to view the closest training images for the test images in each cell. Clicking button 2236 may cause a closest training image comparison view to be displayed showing the closest training image pairs for each test image in the selected cell.

Figure 22B:
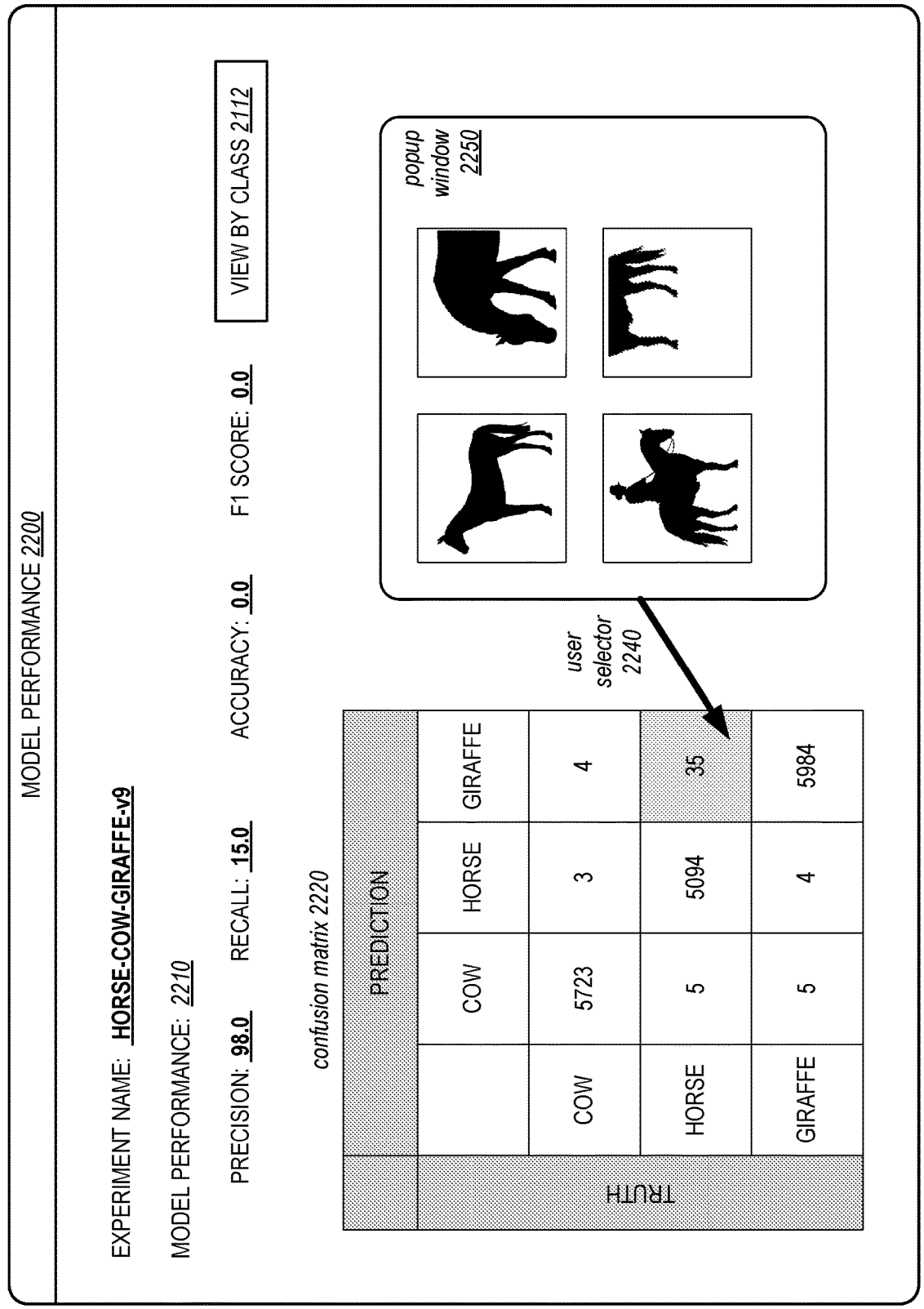
FIG. 22B illustrates an example graphical user interface in the model diagnosis system that allows users to zoom in on cells in a confusion matrix and select test samples to analyze, according to some embodiments.

FIG. 22B illustrates an example graphical user interface in the model diagnosis system that allows users to zoom in on cells in a confusion matrix and select test samples to analyze, according to some embodiments. In some embodiments, the user interface of FIG. 22B may be a different view of the user interface 2200 of FIG. 22A.

As shown, in this view of the user interface 2200, the user is using a user selector 2240 to select a cell in the confusion matrix 2220. In some embodiments, the individual cells of the confusion matrix may display small thumbnails of test samples that fell within that cell. In some embodiments, the matrix 2220 may be a zoomable matrix, where the user may use a user selector 2240 (e.g. the cursor) to zoom in on the samples in each cell. In some embodiments, selection of a cell using the selector 2240 (e.g. via a left or right click of the cell or by hovering over the cell) may cause a popup window 2250 (or some other GUI widget) to appear. In some embodiments, the popup window may display larger views of some or all of the image samples in the cell.

In some embodiments, the individual samples in the popup window 2250 are themselves clickable or selectable. In some embodiments, the user may select multiple or all of the samples in the popup window. Once selected the user may launch another diagnostic user interface to perform analysis on the selected test samples. For example, in some embodiments, the user may right click to select one or more test images in popup window 2250, and invoke one or more of diagnosis interfaces 2110 in FIG. 21 to further analyze the selected test images.

Figure 23:
FIG. 23 illustrates an example graphical user interface in the model diagnosis system that may be used to view a closest training media sample corresponding to a test media sample, according to some embodiments.

FIG. 23 illustrates an example graphical user interface in the model diagnosis system that may be used to view a closest training media sample corresponding to a test media sample, according to some embodiments. In some embodiments, the closest training images user interface 2300 may be implemented as part of the model diagnosis interface 148 of FIG. 1, using one or more components in the model review layer 250 of FIG. 2, or as part of the model diagnosis system of FIG. 21.

As shown, the user interface 2300 displays an image compare table 2310. In the table 2310, the middle column may be test images that were misclassified. For example, the middle column images may all below to a cell in the confusion matrix 2220 discussed above. In some embodiments, the rows of the table 2310 may be sorted based on the degree of confidence or confusion associated with each test image. As shown, the other two columns in the table 2310 indicate the closest training images for the test image in the middle. In this example, the first column indicates the closest training image from the correct class (HORSE), and the third column indicates the closest training image from the incorrect class (GIRAFFE).

In some embodiments, the "closeness" of two images may be determined based on a Euclidean distance between two feature vectors extracted from the two images. For example, in some embodiments, the ML media model may save an intermediate feature vector representation of each image in the training set and the test set. A distance metric may be quickly computed for these images to find the closest training image for any test image, and the closest training image may be displayed on the user interface 2300. For example, in some embodiments, the distance metric may be the Euclidean distance computed for two feature vectors. As discussed, the juxtaposition of the closest training images with a misclassified image may sometimes indicate the reason as to why the ML media model misclassified the test image. For example, in the bottom row, the closest image to the test image (showing horse legs) is an image of a running horse. This may indicate that the training set may need to be augmented to include additional pictures of horse legs standing still. In some embodiments, it may be readily apparent from the table 2310 that some training images are mislabeled.

As shown, on the right, the user interface 2300 indicates a series of diagnosis questions 2320. In some embodiments, these questions seek to obtain user feedback about observation on the displayed content. For example, in some embodiments, the diagnosis questions 2320 may ask whether certain training images are mislabeled, whether the test image is ambiguous (e.g. includes both HORSE and GIRAFFE), whether the training set needs to be augmented (and with what type of images), etc. In some embodiments, the feedback to such diagnosis questions are stored, and then compiled or aggregated to infer certain corrective actions to take to improve model performance. In some embodiments, the corrective actions may involve modifying the training or testing data set for a next iteration of a model experiment to run in the model development environment. As shown, button 2330 may be used to submit the user's feedback.

Figure 24:
FIG. 24 illustrates an example graphical user interface in the model diagnosis system that may be used to view saliency maps for test media sample, according to some embodiments.

FIG. 24 illustrates an example graphical user interface in the model diagnosis system that may be used to view saliency maps for test media sample, according to some embodiments. In some embodiments, the saliency map user interface 2400 may be implemented as part of the model diagnosis interface 148 of FIG. 1, using one or more components in the model review layer 250 of FIG. 2, or as part of the model diagnosis system of FIG. 21.

As shown, the user interface 2400 may display a test image 2410, and one or more saliency maps 2420 and 2430 for the image. In this example, two saliency maps are shown. As shown, saliency map 2420 shows saliency regions in the test image that suggest to the model that the image is of class HORSE. Saliency map 2430 show saliency region(s) that suggest to the model the image is of class GIRAFFE. In some embodiments, the saliency map may be built by randomly varying the pixels in the image and see their impact on the prediction result. If a pixel change causes a large effect on the prediction result (e.g. the confidence level of the prediction), that pixel may be deemed "salient" for the prediction result. In some embodiments, the saliency level may be determined based on regions in the image, which may be determined via a semantic segmentation of the image, possibly produced by the model itself. In some embodiments, the saliency of individual pixels may be determined. In some embodiments, the saliency map may be determined via a Local Interpretable Model-Agnostic Explanation (LIME) technique, which perturbs or hides different features in the image to determine their importance to the prediction result. In the depicted example, large square regions are used. The white regions are the salient regions, and the gray regions are the non-salient regions. In embodiments, where the saliency of individual pixels is used, the pixels that are salient may be shaded one color (e.g. red), while pixels that are not saliency may be shaded another color (e.g. blue). Thus, the saliency map may have one portion shaded in red and one portion shaded in blue.

As shown, in some embodiments, the user interface 2400 may also construct a bounding box, such as boxes 2422 and 2432, around regions of the saliency maps. In some embodiments, only the most salient contiguous region in the saliency map is indicated with a bounding box. In some embodiments, instead of a rectangular box, a generally polygon may be used. In some embodiments, to determine the most salient pixels or regions, a threshold technique such as Otsu's thresholding technique is used. Using the technique, a bounding box may be fitted over a large continuous blob of salient pixels or regions in the saliency map. In some embodiments, these saliency maps may be saved, allowing users to review the maps later.

As shown, like user interface 2300, user interface 2400 also provides a set of diagnostic questions 2440. As discussed, in some embodiments, these questions seek to obtain user feedback about observation on the displayed content. The feedback to the diagnosis questions may be stored, and then compiled or aggregated to infer certain corrective actions to take to improve model performance. As shown, button 2450 may be used to submit the user's feedback.

Figure 25:
FIG. 25 illustrates an example graphical user interface in the model diagnosis system that may be used to perform queries on a media sample to determine its classification according to a model, according to some embodiments.

FIG. 25 illustrates an example graphical user interface in the model diagnosis system that may be used to perform queries on a media sample to determine its classification according to a model, according to some embodiments. In some embodiments, the image query user interface 2500 may be implemented as part of the model diagnosis interface 148 of FIG. 1, using one or more components in the model review layer 250 of FIG. 2, or as part of the model diagnosis system of FIG. 21.

As shown, the user interface 2500 allows users to specify a query image 2510 and determine its classification according to the ML media model. In some embodiments, the query image 2510 may be a test image selected from another user interface of the model diagnosis system.

As shown, the image query interface 2500 may display query results for the query image 2510. In some embodiments, the query results may include a table 2560 that indicates classification scores for the query image 2510, as determined by the ML media model in question. In some embodiments, the ML media model may determine, for each possible class, a logit score for that class given the features of the image, and also a probability score for each class. In other embodiments, different or additional probability metrics may be indicated. As shown in the table 2560, the most probable classification for the test image 2510 is GIRAFFE, according to a current ML media model, which is incorrect.

As shown, in some embodiments, the user interface 2500 may also display a set of saliency maps 2520 and 2530 for the query image 2510. In this example, two saliency maps are shown for the top two classes of the query image, as indicated in the table 2560. In some embodiments, only one or a different number of saliency maps may be shown. In this example, map 2520 shows the salient regions for classifying the query image as GIRAFFE, and map 2530 shows the salient regions for classifying the query image as HORSE.

As shown, in some embodiments, the user interface 2500 may also display a number of similar or close images from the training set from each class displayed. For example, the user interface in this case displays a set of similar images from the GIRAFFE class 2522, and another set of similar images from the HORSE class 2532. In some embodiments, these images may be sorted according to their degree of similarity. In some embodiments, the similarity of two images may be determined based on a distance metric (e.g. the Euclidean distance) between two respective feature vectors or feature maps of the two images. In some embodiments, the similar images may be displayed as the saliency maps of the images. As shown, in some embodiments, all of the images or maps displayed may indicate a bounding box or polygon, which indicates the most salient region or feature on the image for a particular class. By displaying the query image 2510's saliency maps alongside the images or saliency maps of similar images from the training data, the user is able to easily visualize and understand the reasons (e.g. the salient features) that is driving the model's decisions. In some embodiments, the user interface 2500 also allows users to quickly spot errors in the labeling of the training data. In some embodiments, the most similar samples may be displayed in a stratified manner according to classes, or, a global list of closest samples may be provided. In some embodiments, the number of similar images and the number of classes shown in the user interface 2500 are configurable.

In some embodiments, as shown, the user interface 2500 may include a button 2540 or other user control elements to allow a user to alter the query image 2510, and rerun the query. This ability allows the user to gain a better understanding of the model's decision-making process. For example, in some embodiments, the user interface 2500 allows users to perform ad hoc experiments to see how the model will classify the image if a particular feature was blacked out from the query image, or if a feature was added to the query image.

In some embodiments, the query interface 2500 may also allow users to provide diagnosis feedback, for example, via a set of diagnosis questions similar to those shown in FIGS. 23 and 24. In some embodiments, for example, the user may right or left click on an image to cause a popup window to display a set of diagnosis questions for the image. In some embodiments, the query interface 2500 may include a control such as button 2550 to directly perform a corrective action, for example, to add a query image 2510 (or a user-altered version of the image) to the training data set. In some embodiments, a training image appearing on the user interface 2500 may be relabeled by right or left clicking the training image, and a test image may be added to the training set by right or left clicking the test image.

Advantageously, the ability to quickly visualize and test the effects of salient features in images on the model is highly useful to guard against potential attacks on the ML media model. In particular, the vulnerability of neural network to an adversarial attack has increased the concerns on deploying models. For example, a model's output can be deliberately manipulated to produce wrong predictions. In one classic example of a compromised network, a stop sign is altered with a Post-It sticker, and the alteration cause an image of the stop sign to be classified as a speed limit. In other examples, features may be added to images to fool ML systems to bypass security measure or regulatory controls. Interfaces such as user interface 2500 allows users to quickly see and understand these types of attacks, to provide vital clues on why the model gave a particular prediction.

Figure 26:
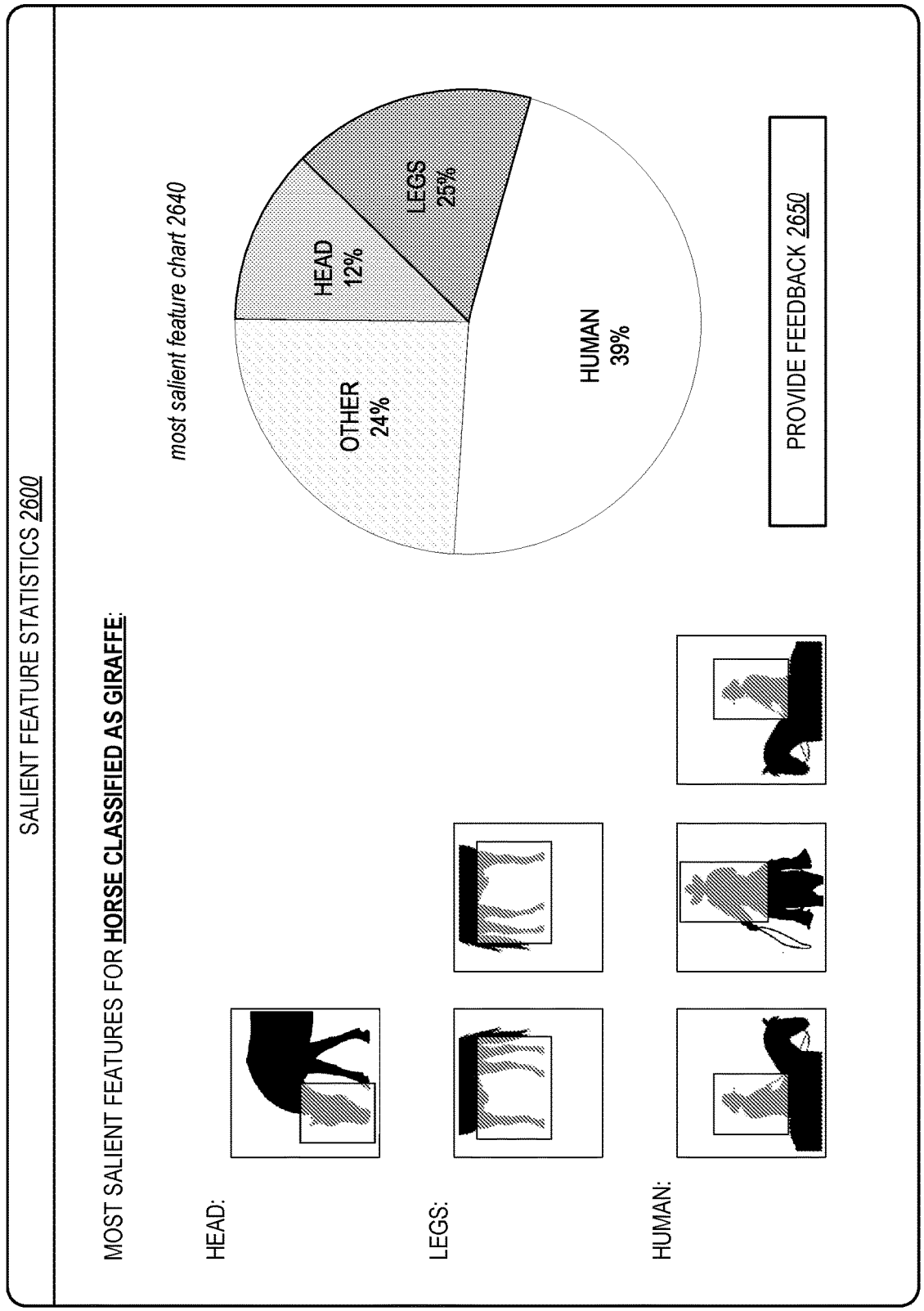
FIG. 26 illustrates an example graphical user interface in the model diagnosis system that may be used to view statistics about salient features recognized by a model in classifying a set of media samples, according to some embodiments.

FIG. 26 illustrates an example graphical user interface in the model diagnosis system that may be used to view statistics about salient features recognized by a model in classifying a set of media samples, according to some embodiments. In some embodiments, the salient feature statistics user interface 2600 may be implemented as part of the model diagnosis interface 148 of FIG. 1, using one or more components in the model review layer 250 of FIG. 2, or as part of the model diagnosis system of FIG. 21.

As shown, in some embodiments, the user interface 2600 may be used to display, for a selected group of images, a distribution of the most salient features in those images as determined by the ML media model when classifying the images. As discussed, the most salient feature of an image may be determined by using techniques such as SmoothGrad and LIME. In some embodiments, the identified salient regions in many images or samples may be clustered via a clustering technique, and then displayed in feature clusters on a feature naming user interface. In some embodiments, users may use the feature naming user interface to assign a feature name to the most salient feature of each image or sample. In some embodiments, the assignment may be performed very quickly on a cluster-by-cluster basis. At the end of the feature naming process, each identified salient region in the sample will be assigned one of a set of semantically meaning feature names (e.g. "HEAD," "LEGS," "HUMAN," etc.).

In some embodiments, as shown, statistics about these salient features (as identified by their assigned feature names) may then be computed and displayed, for different groups of images or samples. For example, user interface 2600 displays a distribution of the most salient features in HORSE images that are classified as GIRAFFE. The distribution, shown in a pie chart, shows that the "HUMAN" was the most salient feature in 39% of the images. User interfaces that display this information, such as user interface 2600, allows users to understand the dominant features in the images that are driving the model's classification decisions. For example, the user interface 2600 shows that for the set of misclassified images (HORSE images misclassified as GIRAFFE images), which image features are predominantly causing the misclassification (here the presents of the HUMAN feature in the images). As another example, the user interface 2600 may be used to display the distribution of all HORSE images in a training data set. This breakdown allows the user to understand what image features the model is primarily using to classify an image as HORSE during training.

As shown, in this example, a number of labelled salient features are displayed for the image set HORSE CLASSIFIED AS GIRAFFE. These features are HEAD, LEGS, HUMAN and OTHER. In some embodiments, the individual images may be displayed with a bounding box showing the salient feature in each image. In some embodiments, a saliency map of the image may be displayed with the salient regions (e.g. pixels) shown in a different color or brightness. In some embodiments, as shown, the breakdown of the salient features in the group may be shown. In this example, this information is presented as a pie chart 2640, which indicates the relative percentages of each type of labelled salient feature. As shown, the HUMAN feature is present in a large percentage of the misclassified images. This may indicate that the training data should be enriched with more training images with humans such as horse riders, to training the model to distinguish horse riders from giraffes.

As shown, in some embodiments, the user interface 2600 may provide one or more user control elements, such as button 2650, to provide observational feedback about the information presented on the user interface. In some embodiments, the feedback may be provided as answers to a series of questions, such as the diagnosis questions in FIGS. 23 and 24. In some embodiments, for example, the user may right or left click on an image to cause a popup window to display a set of diagnosis questions for the image. In some embodiments, the user may be asked to select types of images that should be added to the training data set. In some embodiments, the user interface 2600 may provide user control elements to directly perform corrective actions, for example to modify the training data set or modify model parameters. In some embodiments, a training image appearing on the user interface 2500 may be relabeled by right or left clicking the training image, and a test image may be added to the training set by right or left clicking the test image.

FIG. 27 illustrates an example graphical user interface in the model diagnosis system that provides a model diagnosis report for a ML media model, according to some embodiments. In some embodiments, the model diagnosis user interface 2700 may be implemented as part of the model diagnosis interface 148 of FIG. 1, using one or more components in the model review layer 250 of FIG. 2, or as part of the model diagnosis system of FIG. 21. In some embodiments, the user interface 2700 may be the model diagnosis report interface 2180, as discussed in FIG. 21.

As shown, the user interface 2700 may present a model diagnosis report. The model diagnosis report may be compiled or inferred from user observational or analytical feedback, received from the various user interfaces in the model diagnosis system. In some embodiments, the feedback may be gathered and analyzed by the model diagnosis inference component 2170, as discussed in connection with FIG. 21. In some embodiments, the model diagnosis inference component 2170 may gather or aggregate user feedback from many different model developers, using different diagnosis user interfaces that reviews different types of images and model behavior aspects. In some embodiments, the model report diagnosis report interface 2180 may be generated at the end of a model experiment run by a model development environment (e.g. MDE 130 of FIG. 1), to provide corrective actions for a next iteration of model experiment.

As shown, in some embodiments, the user interface 2700 may list a number of diagnosed conditions or issues with the ML media model. In some embodiments, the list of conditions may be prioritized based on their impact on model performance. For example, in some embodiments, the list may be prioritized based on their expected improvement to the overall accuracy of classifications generated by the model, for example, as measured by an accuracy metric such as F1 scores. In this example, two conditions are displayed. The first indicates that many HORSE images that were misclassified as GIRAFFE contain humans in the images. The second indicates that some of the GIRAFFE images were mislabeled horse, which likely further added to the confusion of the model. In some embodiments, other conditions (e.g. advisory conditions) may be indicated. For example, in some embodiments, the user interface 2700 may recommend that two classes or more should be merged.

As shown, in some embodiments, the user interface 2700 may display one or more recommended corrective actions for some of the diagnosed conditions. As shown, some conditions (e.g. the third condition) may be purely advisory and may not be associated with any corrective actions. In some embodiments, the corrective actions may be determined from the user feedback as a set of actions to improve model performance. As one example, the user feedback may indicate that the model lacks experience with respect to certain types of features in certain types of images or media samples. Accordingly, the model diagnosis system may recommend to add training images containing these types of features to expose the model to these features. As another example, the user feedback may indicate that there are images or samples in the training data that are mislabeled. In some embodiments, the mislabeled images or media samples may be individually tagged and identified by the model diagnosis report 2700, so that they can be corrected. As another example, the user feedback may indicate that certain misleading training images should be removed, for example, images where both classes of animals are present.

As another example, user feedback may indicate that two or more classes that lot of images from two classes are actually semantically overlapping, and accordingly, the model diagnosis system may recommend that the two or more classes be merged.

In some embodiments, the model diagnosis report may also recommend changes to the testing data. For example, in some embodiments, feedback from a diagnosis interface may indicate that a large amount of similar data in the test data set. In other examples, the same condition may be detected with respect to other datasets used by the model, such as training and validation datasets. In some embodiments, based on the user feedback, the model diagnosis system may determine that a deduplication process should be applied to the test dataset. In particular, if the test data set contains an excessive amount of a particular type of image or media samples, the test data set may unfairly inflate test scores for the model. As another example, a training data set that is unbalanced with respect to its feature proportions may cause the model to be heavily biased towards particular types of features. To remedy these issues, the model diagnosis system may present a user interface of view to allow users to retrieve similar images from the training or test data sets, for example, using the image query user interface 2500 of FIG. 25. In some embodiments, a corrective action user interface (e.g. a deduplication user interface) may allow users to cluster the images or media samples in the data set in question using a clustering technique such as canopy clustering, and identify clusters or types of images that are over-represented in the data set. In some embodiments, the deduplication user interface may allow users to retrain one or more images or samples from each cluster (e.g., one or more images near center of the clusters), and discard the rest. Using this technique, the data set in question may be effectively rebalanced in terms of representative features.

As shown, in some embodiments, the user interface 2700 may provide one or more user control element, such as buttons 2710, 2720, 2730, and 2740. Each button may be associated with a corrective action to be performed to remedy a diagnosed condition of the model. For example, button 2710 may allow identified images to be added to the training data set, as recommended by the diagnosis report. As shown, button 2720 may allow users to search for additional images that are similar to the recommended images, for example, images of horses with human riders. In some embodiments, the searching may be performed on one or more local media data stores that are accessible to the MDE. In some embodiments, the images in the image or media data store may be tagged with searchable metadata, such as one or more features detected in the images, which may facilitate the searching. In some embodiments, the search may be performed over publicly available images or media samples, for example using the web. In some embodiments, the search may be performed with one or more keywords recommended by the model diagnosis report. As shown, the fix labels button 2730 may allow the user to fix mislabeled images that were identified during model diagnosis. In some embodiments, the button 2730 may cause a user interface such as user interface 1800 of FIG. 18 to be generated, so that images in the training data set can be manually relabeled. By providing the user control elements, the diagnosis report 2700 enables close looping through multiple workflows. In some embodiments, some of the workflows may be automated via diagnosis report 2700.

In some embodiments, the save for later button 2740 may save the model diagnosis report for later review. In some embodiments, each corrective action may represent a to do item, and the report may indicate when each item is completed. In some embodiments, the model diagnosis report may be updated as more user feedback is received, and as more corrective actions are performed. Thus, the model diagnosis report interface 2700 may present an up-to-date view of the progress of corrective actions. When all of the corrective actions have been completed, the model developers may initiate a next model experiment in the model development process.

Figure 28:
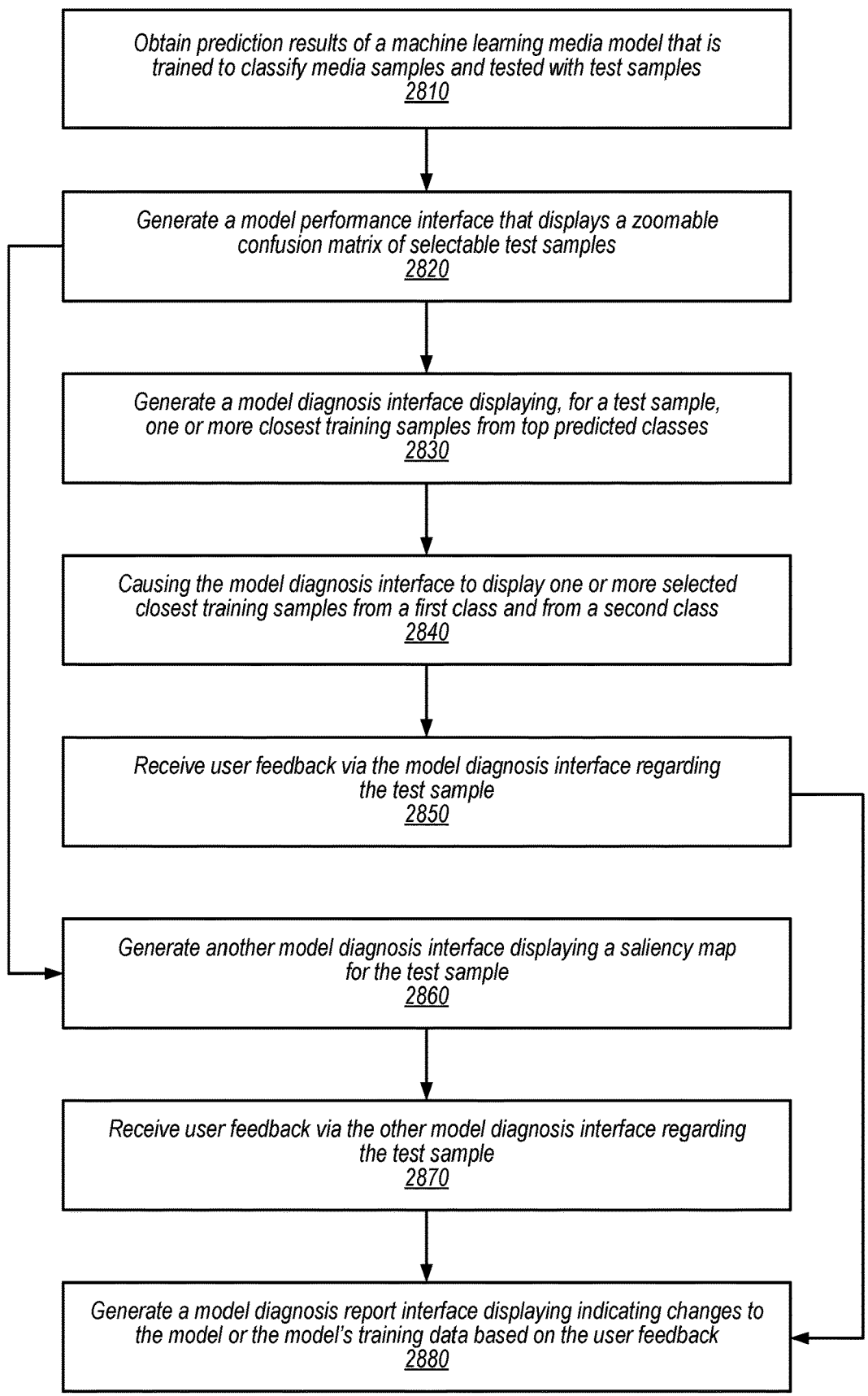
FIG. 28 is a flow diagram illustrating a process in the model diagnosis system to generate, based on user feedback, a model diagnosis report indicating one or more actions to improve model performance by modifying the training data, according to some embodiments.

FIG. 28 is a flow diagram illustrating a process in the model diagnosis system to generate, based on user feedback, a model diagnosis report indicating one or more actions to improve model performance by modifying the training data, etc., according to some embodiments. The depicted process may be performed, in some embodiments, by the model diagnosis interface 148 of FIG. 1, one or more components of the model review layer 250 of FIG. 2, or the model diagnosis system 2100 of FIG. 21.

At operation 2180, prediction results of a machine learning media model are obtained. In some embodiments, the prediction results may be generated as part of a model experiment performed in a model development environment (e.g. MDE 130 of FIG. 1). In some embodiments, the model is a classification model that is trained using training data curated in the MDE, and the prediction results are obtained from a set of test samples and stored in a results repository maintained by or accessible to the MDE. In some embodiments, the ML media model may be trained to analyze images.

At operation 2820, a model performance interface is generated that display a zoomable confusion matrix of selectable test samples. In some embodiments, the confusion matrix may group test samples (e.g. images) into cells according to their respective truth classes and predicted classes. In some embodiments, the diagonal cells in the confusion matrix represent correct predictions, while the other cells in the matrix represent incorrect predictions. In some embodiments, the rows or columns of the matrix may be sorted based on the prediction performance of a particular class. In some embodiments, the cells may indicate counts of the test images that belong to the cell. In some embodiments, individual cells in the matrix may be zoomed into to view the test samples in each cell, and the individual test samples themselves may be selected. The selected test samples may then be analyzed using one or more model diagnosis interfaces 2110 of FIG. 21. In some embodiments, the model performance interface may also display performance metrics for the model. In some embodiments, the first user interface may be the model performance interface 2120 of FIG. 21 or the user interface 2200 of FIG. 22A. In some embodiments, the confusion matrix may be the confusion matrix 2122 of FIG. 21 or the confusion matrix 2220 of FIG. 22A. In some embodiments, the performance data may be generated from the model's prediction results. The performance results may include accuracy metrics indicating the model's precision, recall, F1 score, etc.

At operation 2830, a model diagnosis interface is generated that displays, for a test sample, one or more closest training samples from top predicated classes. For example, in some embodiments, as shown in FIG. 25, the set of the closest training images to a query image may be displayed. In some embodiments, the closest training images may be grouped according to their class.

At operation 2840, the model diagnosis interface may display, one or more selected closest training images from a first class and a second class. For example, in some embodiments, the user may select the top two or n classes for a test sample or a query image. In some embodiments, in response to the user selection, the model diagnosis interface may display a first closest training sample from a first class and a second closest training sample from a second class. In some embodiments, the first class may be a most likely predicted or best match class for the test sample. In some embodiments, the second class maybe a second most likely predicted or second best match class for the test sample. In some embodiments, the model diagnosis interface may be the closest training sample comparison view 2130 of FIG. 21, the user interface 2300 of FIG. 23, or the user interface 2500 of FIG. 25. In some embodiments, the number of training images or samples displayed may be configurable. Thus, more than just the two closest images or samples may be displayed. In some embodiments, the model diagnosis interface may show a group of misclassified images in a three-column table, where the middle column shows the misclassified image and the two other columns show the first training image and the second training image, respectively. In some embodiments, two images' closeness may be determined based on a distance metric (e.g. the Euclidean distance) between two feature vectors of the images.

At operation 2850, user feedback is received via the model diagnosis interface regarding the test sample. In some embodiments, the model diagnosis interface may provide one or more diagnostic questions, such as diagnostic questions 2320 in FIG. 23. In some embodiments, other user interface elements may be used to solicit user feedback. For example, user diagnosis questions may be displayed in response to clicking the test sample or one of the training samples. The user feedback may indicate a user's analytical or observational feedback regarding the misclassified image(s). In some embodiments, the feedback may indicate a reason why the misclassification occurred. In some embodiments, the feedback may indicate one or more corrective actions to be performed to fix a particular misclassification. The received feedback may be analyzed and used to generate content for a model diagnosis report, in operation 2870.

At operation 2860, another model diagnosis interface is generated to display, for a test sample, a saliency map that indicates one or more regions in the test sample that were salient in contributing to the model's prediction result. In some embodiments, the other model diagnosis interface may be one or more of the diagnosis interfaces 2140, 2150, or 2160 of FIG. 21. In some embodiments, the third user interface may be the user interface 2400 of FIG. 24, the user interface 2500 of FIG. 25, or the user interface 2600 of FIG. 26. In some embodiments, the saliency map may be generated using a technique such as SmoothGrad or LIME, as discussed above. The saliency map may indicate particular pixels or regions that were important or salient in the model's classification decision, by coloring or shading the pixels or regions differently from the rest of the pixels or regions in the map. In some embodiments, a bounding box or polygon may be generated and added to the saliency map, to indicate one or more features that were salient in the model's decision. In some embodiments, the bounding box or polygon may only be applied to the most salient feature in the map. As discussed, these saliency maps allow users to quickly understand and visualize the reasons behind the model's classification decision.

At operation 2870, user feedback is received via the other model diagnosis interface regarding the test sample. In some embodiments, the other model diagnosis interface may provide one or more diagnostic questions, such as diagnostic questions 2440 in FIG. 24. In some embodiments, other user interface elements may be used to solicit user feedback. For example, user diagnosis questions may be displayed in response to clicking the test sample or one of the training samples. The user feedback may indicate a user's analytical or observational feedback regarding the misclassified image(s). In some embodiments, the feedback may indicate whether a salient feature is an appropriate feature to use for the classification. In some embodiments, the feedback may indicate that there are conflicting features that are salient for (or suggest) two different classifications for the image or sample. In some embodiments, the feedback may indicate one or more corrective actions to be performed to fix a particular misclassification. The received feedback may be analyzed and used to generate content for a model diagnosis report, in operation 2870.

At operation 2880, a model diagnosis report interface is generated. In some embodiments, the model diagnosis report interface may be the model diagnosis report interface 2180 of FIG. 21 or the user interface 2700 of FIG. 27. In some embodiments, the model diagnosis report interface may display a list of diagnosed conditions or issues with the model that was tested, and include for some conditions one or more corrective actions to fix the condition or issue. In some embodiments, the list of issues or conditions may be determined or ranked by a model diagnosis inference component, such as component 2170 of FIG. 21. In some embodiments, the conditions or issues may be listed in a priority order, sorted by the expected impact or improvement to model performance.

In some embodiments, the model diagnosis report interface may provide user control elements to enable users to perform the corrective actions. For example, in some embodiments, a button may allow a user to search for media samples (e.g. images) or recommended types of samples and add these samples to the training data. In some embodiments, a button may be provided to enable users to fix labeling errors in the training data. In some embodiments, a button may be provided to enable users to remove redundant or misleading samples from the training or testing data. In some embodiments, a button may be provided to enable users to adjust various parameter or hyperparameters of the model. In this fashion, the model diagnosis system is able to implement a streamlined model diagnosis process that allows teams of model developers to quickly gain insight into a model's precision mistakes and determine an action plan to improve model performance.

Figure 29:
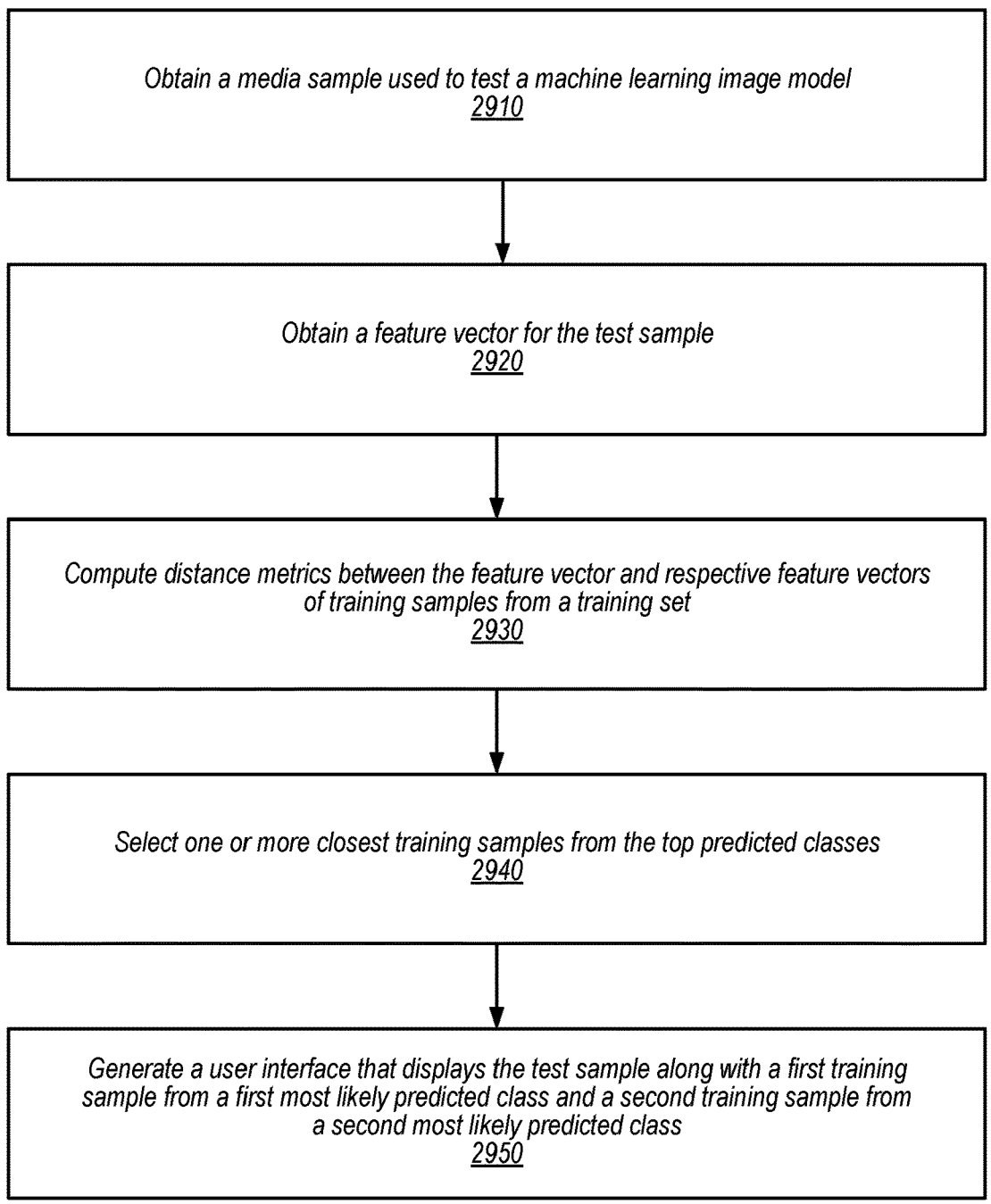
FIG. 29 is a flow diagram illustrating a process in the model diagnosis system to select closest training media samples for a test media sample, according to some embodiments.

FIG. 29 is a flow diagram illustrating a process in the model diagnosis system to select closest training media samples for a test media sample, according to some embodiments. In some embodiments, the depicted process may be performed during generation of the closest training sample comparison view 2130 of FIG. 21, the user interface 2300 of FIG. 23, or the user interface 2500 of FIG. 25.

At operation 2910, a media sample used to test an ML media model is obtained. In some embodiments, the sample may be a test image from a test data set, where in the image is labelled as belong to a first class, but was predicted by the model to belong to another class. In some embodiments, the test sample may be selected from a confusion matrix displayed on a model diagnosis interface.

At operation 2920, a feature vector is obtained for the test sample. In some embodiments, the feature vector may represent an intermediate representation of the test sample used by the ML media model to perform the classification. For example, the feature vector may be an output generated by an intermediate layer in model's neural network. In some embodiments, the feature vector may be saved during the testing process, so as to facilitate later analysis of the test results. In some embodiments, the feature vector may simply be stored as the representation of the test sample in the MDE, the feature vector is provided as input to the ML media model.

At operation 2930, distance metrics are computed between the test sample's feature vector and the respective feature vectors of the training samples. As discussed, in some embodiments, the feature vectors of the training images may be stored with the training images in an image repository. The feature vector of the test image can then be quickly compared with training images' feature vectors to select one or more training images that are the "closest," or has the shortest distance to the test image. In some embodiments, the distance metric may be a Euclidean distance between two feature vectors. In some embodiments, the selection process may employ certain stored metadata to indicate the relative closeness or neighborhoods of the training images, so that the selection process does not have to compute the distance for every individual training image in the training set.

At operation 2940, using the distance metrics computed in operation 2930, one or more closest training samples from top predicted classes are selected. For example, in some embodiments, a first training sample is selected from a first best matching class with the smallest distance to the feature vector of the test sample, and a second training sample is selected from a best matching second class with the smallest distance to the feature vector of the misclassified test sample. In some embodiments, the selection may be performed for a top n number of classes, as specified by the user. In some embodiments, the media data repository may support a query to allow for querying of images that are "closest" to particular samples. For example, such a querying interface may be used by the image query user interface 2500 of FIG. 25. Accordingly, the query interface allows a user to see which classes in the training data have the closest samples to the query sample.

At operation 2950, a user interface is generated that displays the test sample along with a first training sample from a first most likely predicted class and a second training sample from a second most likely predicted class. In some embodiments, this user interface may be the user interface 2300 of FIG. 23 or the user interface 2500 of FIG. 25. As discussed, the presentation of "closest" training images on these diagnosis user interfaces provides a number of advantages over convention model analysis interfaces. For example, the closest training samples allow a user to gain quick insight into the reasons behind a model's classification choice. Moreover, in some cases, the closest training samples may indicate that some of the samples in the training set are mislabeled.

Figure 30:
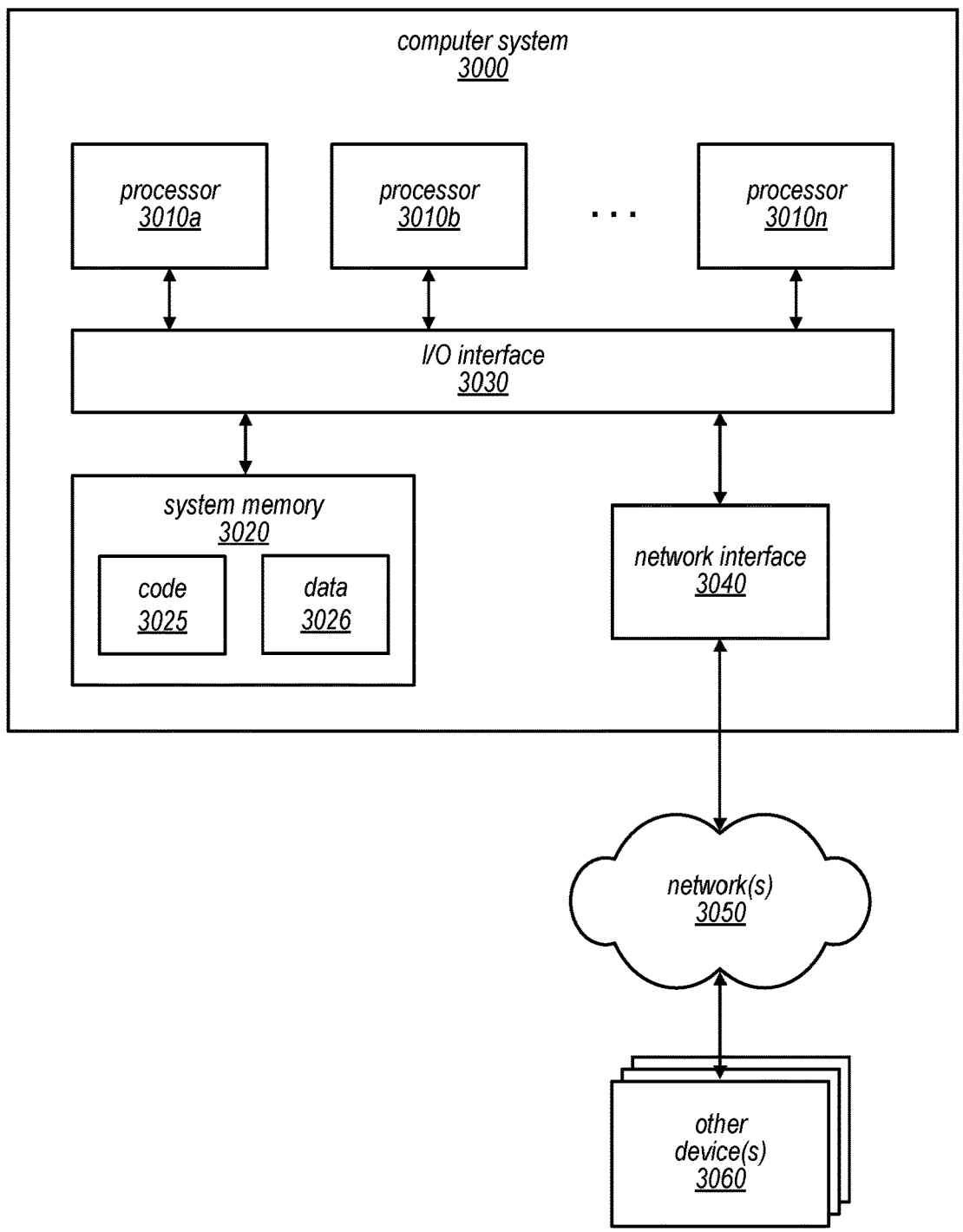
FIG. 30 is a block diagram illustrating an example computer system that can be used to one or more portions of an MDE that allows users to develop models through iterative model experiments, according to some embodiments.

FIG. 30 is a block diagram illustrating an example computer system that can be used to one or more portions of an MDE that allows users to develop models through iterative model experiments, according to some embodiments. Computer system 3000 may include or be configured to access one or more nonvolatile computer-accessible media. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026. The system memory 3020 may include different levels of cache, some of which may be located on the CPU and some away from the CPU. One level of the cache hierarchy may be a last level cache that is shared by all of the processors 3010a to 3010n. The last level cache may be an inclusive cache of the low levels of cache in the cache hierarchy.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices, such as routers and other computing devices, as illustrated in FIGS. 1 through 29, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 29 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Embodiments of the disclosure can be described in view of the following clauses:

Clause 1:

A system comprising:
  one or more computers that implement a model development environment (MDE) for developing machine learning (ML) image models, configured to:
    generate a first user interface configured for a user to:
      annotate a training data set of images for a ML image model, wherein the ML image model is configured to make predictions about images;
    generate a second user interface configured for the user to perform a model experiment to:

execute a training run of the ML image model using the training data set as modified according to user input via the first user interface; and execute a test run of the ML image model after the training run using a test data set and generate performance metrics for the ML image model from the test run;

generate a third user interface configured to display the performance metrics and for the user to:

specify one or more further modifications to the training data set to improve prediction performance for a next iteration of the ML image model to be trained and tested in a next model experiment;

deploy an approved iteration of the ML image model to a production environment as a production model;

obtain production input data and prediction results for the production model and generate additional performance metrics for the production model from the production input data and prediction results; and responsive to a detection of a performance aberration in the additional performance metrics, generate a fourth user interface to report the performance aberration.

Clause 2:

The system of clause 1, wherein the MDE is implemented as a multi-tenant service and configured to store a development project comprising a series of ML image model iterations, associated data sets, and experiment performance results, and to provide access to the development project to a plurality of different users via the first, the second, and the third user interfaces.

Clause 3:

The system of clauses 1 to 2, wherein the one or more further modifications to the training data set includes one or more of: adding the one or more incorrectly predicted images to the training data set, changing the annotations of one or more existing images in the training data set, and combining two or more classes of images in the training data set.

Clause 4:

The system of clauses 1 to 3, wherein the MDE is configured to:

cause a user interface to display progress information of the model experiment; and stop the model experiment responsive to a user input received via the user interface.

Clause 5:

The system of clauses 1 to 4, wherein the MDE is configured to:

obtain input images provided to a production model that performs a common prediction task as the ML image model;

execute a simulation run of the ML image model using the input images; and generate a comparison interface that displays a performance comparison of production model and the ML image model with respect to the input images.

Clause 6:

A computer-implemented method comprising:

performing, by a model development environment (MDE) implemented on one or more processors and associated memory:

generating a first user interface configured for a user to:

annotate a training data set of media samples for a machine learning (ML) model, wherein the ML model is configured to make predictions about the media samples;

generating a second user interface configured for the user to perform a model experiment to:

cause a training run of the ML model to be executed using the training data set as modified according to user input via the first user interface; and cause a test run of the ML model to be executed after the training run using a test data set and generate performance metrics for the ML model from the test run;

generating a third user interface displaying the performance metrics and configured for the user to:

specify one or more further modifications to the training data set to improve prediction performance for a next iteration of the ML model to be trained and tested in a next model experiment.

Clause 7:

The method of clause 6, wherein the MDE is implemented as a multi-tenant service, and further comprising performing, by the multi-tenant service:

storing a development project comprising a series of ML model iterations, associated data sets, and experiment performance results; and providing access to the development project to a plurality of different users via the first, the second, and the third user interfaces.

Clause 8:

The method of clauses 6 to 7, further comprising performing, by the MDE:

a first model experiment for a media classification model, a second model experiment for object detection model, and a third model experiment for a semantic segmentation model.

Clause 9:

The method of clauses 6 to 8, further comprising performing, by the MDE:

storing performance metrics of a sequence of model experiments performing a common prediction task; and causing a user interface to display a graph indicating performance change of the sequence of model experiments.

Clause 10:

The method of clauses 6 to 9, wherein the one or more further modifications to the training data set includes one or more of: adding the one or more incorrectly predicted samples to the training data set, changing the annotations of one or more existing samples in the training data set, and combining two or more classes of samples in the training data set.

Clause 11:

The method of clauses 6 to 10, further comprising performing, by the MDE:

causing a user interface to display progress information of the model experiment; and stopping the model experiment responsive to a user input received via the user interface.

Clause 12:

The method of clauses 6 to 11, further comprising performing, by the MDE:

generating a checkpoint of the ML model during the training run;

performing an evaluation run of the checkpoint using an evaluation data set that is distinct from the training data set and the test data set; and programmatically analyzing results of the evaluation run to determine whether to stop the training run.

Clause 13:

The method of clauses 6 to 12, wherein the second user interface is configured for the user to select a checkpoint generated by a previous model experiment to use for the model experiment.

Clause 14:

The method of clauses 6 to 13, wherein the test run is performed via a multi-tenant machine learning service configured to execute machine learning models of a plurality of different tenants.

Clause 15:

The method of clauses 6 to 14, further comprising performing, by the MDE:
- obtaining input media samples provided to a production model that performs a common prediction task as the ML model;
- causing a simulation run of the ML model to be executed using the input images; and
- generating a comparison interface that displays a performance comparison of production model and the ML model with respect to the input media samples.

Clause 16:

The method of clauses 6 to 15, further comprising, by the MDE:
- responsive a user input indicating approval of an iteration of the ML model, causing the iteration of the ML model to be deployed to a production environment as a production model;
- receiving production input data and prediction results for the production model and generating additional performance metrics for the production model from the production input data and prediction results; and
- responsive to a detection of a performance aberration in the additional performance metrics, generating a user interface to report the performance aberration.

Clause 17:

One or more non-transitory computer-accessible storage media storing program instructions that when executed on or across one or more processors implement a model development environment (MDE) and cause the MDE to:
- generate a first user interface configured for a user to:
  - annotate a training data set of media samples for a machine learning (ML) model, wherein the ML model is configured to make predictions about the media samples;
- generate a second user interface configured for the user to:
  - cause a training run of the ML model to be executed using the training data set as modified according to user input via the first user interface; and
  - cause a test run of the ML model to be executed after the training run and generate performance metrics for the ML model from the test run;
- generate a third user interface displaying the performance metrics and configured for the user to:
  - specify one or more further modifications to the training data set to improve prediction performance for a next iteration of the ML model to be trained and tested in a next model experiment.

Clause 18:

The one or more non-transitory computer-accessible storage media of clause 17, wherein the one or more changes to the training data set includes one or more of: adding the one or more incorrectly predicted samples to the training data set, changing the annotations of one or more existing samples in the training data set, and combining two or more annotated classes in the training data set.

Clause 19:

The one or more non-transitory computer-accessible storage media of clauses 17 to 18, wherein the program instructions when executed on or across the one or more processors cause the MDE to:
- cause a user interface to display progress information of the model experiment; and
- stop the model experiment responsive to a user input received via the user interface.

Clause 20:

The one or more non-transitory computer-accessible storage media of clauses 17 to 19, wherein the program instructions when executed on or across the one or more processors cause the MDE to:
- obtain input media samples provided to a production model that performs a common prediction task as the ML model;
- cause a simulation run of the ML model to be executed using the input media samples; and
- generate a comparison interface that displays a performance comparison of production model and the ML image model with respect to the input images.

Clause 21:

A system comprising:
- one or more computers that implement an image annotation system, configured to:
  - obtain a set of unlabeled images to be annotated with respective labels;
  - generate a seeding interface, wherein the seeding interface is configured to display a set of seed images selected from the set of unlabeled images;
  - responsive to user input via the seeding interface indicating user annotations of the seed images:
    - initialize a classification model based at least in part on the user annotations of the seed images; and
    - move the seed images from the set of unlabeled images to a set of labeled images;
  - generate a training user interface, wherein the training user interface is configured to display a set of training images selected from the set of unlabeled images with annotations determined by the classification model;
  - responsive to user input via the training user interface indicating one or more corrections to one or more of the annotations of the training images:
    - update the classification model based at least in part on the corrections; and
    - move the set of training images from the set of unlabeled images to the set of labeled images;
  - generate a validation user interface, wherein the validation user interface is configured to display a set of test images selected from the set of unlabeled images with annotations determined by the classification model;
  - responsive to user input via the validation user interface indicating validations or corrections of the annotations of the test images:
    - cause the validation user interface to display a performance metric of the classification model based at least in part on the validations or corrections of the test images; and
    - move the test images from the set of unlabeled images to the set of labeled images; and
  - responsive to further user input, annotate remaining images in the set of unlabeled images using the classification model.

Clause 22:

The system of clause 21, wherein the image annotation system is implemented as a multi-tenant service and configured to store image data sets and classification models of a plurality of different tenants and perform annotations of the plurality of different tenants in parallel.

Clause 23:

The system of clauses 21 to 22, wherein the image annotation system is configured to:
  subsequent to the annotation of the remaining images, generate a review user interface configured to display at least a subset of the labeled images; and
  in response to user input received via the review user interface:
    modify one or more of the annotations of the labeled images;
    add one or more additional labels to be applied to the labeled images; or
    split one or more existing labels for the labeled images into new labels.

Clause 24:

The system of clauses 21 to 23, wherein image annotation system is configured to:
  subsequent to the annotation of the remaining images, export a subset of the labeled images to be stored with their respective annotations, wherein the respective annotations of the subset exported satisfy a confidence threshold.

Clause 25:

The system of clauses 21 to 24, wherein image annotation system is configured to:
  select the training images from the set of unlabeled images based at least in part on a confidence metric associated with the annotations of the unlabeled images as determined by the classification model.

Clause 26:

A computer-implemented method comprising:
  performing, by a media annotation system implemented on one or more processors and associated memory:
    obtaining a set of unlabeled media samples to be annotated with respective labels;
    generating a seeding interface, wherein the seeding interface is configured to display a set of seed samples selected from the set of unlabeled media samples;
    responsive to user input via the seeding interface indicating user annotations of the seed samples:
      initializing a classification model based at least in part on the user annotations of the seed samples; and
      moving the seed samples to a set of labeled samples;
    generating a training user interface, wherein the training user interface is configured to display a set of training samples selected from the set of unlabeled media samples with annotations determined by the classification model;
    responsive to user input via the training user interface indicating one or more corrections to one or more of the annotations of the training samples:
      updating the classification model based at least in part on the corrections; and
      moving the set of training samples to the set of labeled samples;
    generating a validation user interface, wherein the validation user interface is configured to display a set of test samples selected from the set of unlabeled media samples with annotations determined by the classification model;
    responsive to user input via the validation user interface indicating validations or corrections of the annotations of the test samples:
      causing the validation user interface to display a performance metric of the classification model based at least in part on the validations or corrections of the test samples; and
      moving the test samples to the set of labeled samples; and
    responsive to further user input, annotating remaining samples in the set of unlabeled media samples using the classification model.

Clause 27:

The method of clause 26, wherein the media annotation system is implemented as a multi-tenant service and further comprising storing image data sets and classification models of a plurality of different tenants and performing annotations for the plurality of different tenants in parallel.

Clause 28:

The method of clauses 26 to 27, further comprising performing, by the media annotation system:
  subsequent to the annotation of the remaining samples, generating a review user interface configured to display at least a subset of the labeled samples; and
  in response to user input received via the review user interface:
    modifying one or more of the annotations of the labeled samples;
    adding one or more additional labels to be applied to the labeled samples; or
    splitting one or more existing labels for the labeled samples into new labels.

Clause 29:

The method of clauses 26 to 28, further comprising performing, by the media annotation system:
  extracting a plurality of features vectors from individual ones of the set of unlabeled media samples to be annotated, wherein the features vectors are used as input to classification model;
  clustering the feature vectors according to a clustering technique; and
  selecting the set of seed samples from the set of unlabeled media samples based at least in part on the clustering.

Clause 30:

The method of clause 29, further comprising, performing, by the media annotation system:
  selecting a neural network in accordance with received user input, wherein the extracting of the plurality of the feature vectors is performed via the neural network.

Clause 31:

The method of clauses 26 to 30, wherein generating the training user interface comprises:
  selecting the training samples from the set of unlabeled samples based at least in part on a confidence metric associated with the annotations of the unlabeled samples as determined by the classification model.

Clause 32:

The method of clauses 26 to 31, further comprising performing, by the media annotation system:
  subsequent to the annotation of the remaining samples, exporting a subset of the labeled samples to be stored with their respective annotations, wherein the respective annotations of the subset exported satisfy a confidence threshold.

Clause 33:

The method of clauses 26 to 32, wherein generating the training user interface comprises causing the training user interface to group the training samples according to their respective annotations and causing the training user interface to display samples that have been corrected in a different color.

Clause 34:

The method of clauses 26 to 33, wherein classification model is configured to select multiple labels for individual samples, and generating the training user interface comprises displaying one or more training samples annotated with multiple respective labels determined by the classification model.

Clause 35:

The method of clauses 26 to 34, further comprising performing, by the media annotation system:
  causing the validation user interface to display a graph of the classification model's performance metric over multiple iterations of sample validations.

Clause 36:

The method of clauses 26 to 35, further comprising performing, by the media annotation system:
  causing the validation user interface to display a confusion matrix grouping the test samples into cells according to their correct labels and their classifier-determined labels.

Clause 37:

The method of clause 36, further comprising performing, by the media annotation system:
  responsive to user input selecting of a cell of the confusion matrix, causing the validation user interface to display one or more test samples assigned to the cell.

Clause 38:

The method of clauses 26 to 37, wherein:
  the further user input to initiate annotation the remaining samples is received via a user control on the validation user interface; and
  the user control is disabled or enabled based at least in part on one or more user configurable performance level of the classification model.

Clause 39:

One or more non-transitory computer-accessible storage media storing program instructions that when executed on or across one or more processors implement a media annotation system and cause the media annotation system to:
  receive a set of unlabeled media samples to be annotated with respective labels;
  generate a seeding interface, wherein the seeding interface is configured to display a set of seed samples selected from the set of unlabeled media samples;
  responsive to user input via the seeding interface indicating user annotations of the seed samples:
    initialize a classification model based at least in part on the user annotations of the seed samples; and
    move the seed samples to a set of labeled samples;
  generate a training user interface, wherein the training user interface is configured to display a set of training samples selected from the set of unlabeled media samples with annotations determined by the classification model;
  responsive to user input via the training user interface indicating one or more corrections to one or more of the annotations of the training samples:
    update the classification model based at least in part on the corrections; and
    move the set of training samples to the set of labeled samples;
  generate a validation user interface, wherein the validation user interface is configured to display a set of test samples selected from the set of unlabeled media samples with annotations determined by the classification model;
  responsive to user input via the validation user interface indicating validations or corrections of the annotations of the test samples:
    cause the validation user interface to display a performance metric of the classification model based at least in part on the validations or corrections of the test samples; and
    move the test samples to the set of labeled samples; and
  responsive to further user input, annotate remaining samples in the set of unlabeled media samples using the classification model.

Clause 40:

The one or more non-transitory computer-accessible storage media of clause 39, wherein the program instructions when executed on or across the one or more processors cause the media annotation system to:
  subsequent to the annotation of the remaining samples, export a subset of the labeled samples to be stored with their respective annotations, wherein the respective annotations of the subset exported satisfy a confidence threshold.

Clause 41:

A system comprising:
  one or more computers that implement a model diagnosis system for machine learning (ML) image models, configured to:
    obtain prediction results of a ML image model that classifies a given image to one or more of a plurality of classes, wherein the ML image model was trained using training images from a training set and the prediction results were generated using test images from another set;
    generate a model performance interface configured with a zoomable confusion matrix that groups the test images into cells according to their respective truth classes and predicted classes;
    responsive to user input via the model performance interface to select a cell of the confusion matrix, cause the model performance interface to zoom in on test images in the cell selected;
    responsive to user input to select one or more of the test images in the cell, generate a model diagnosis interface configured to display the one or more test images selected;
    receive user input via the model diagnosis interface indicating feedback regarding the one or more test images selected or one or more training images in the training set;
    determine, based at least in part on the feedback, one or more modifications to the training set or the ML image model to improve prediction performance; and
    generate a diagnosis report interface configured to display the one or more modifications to the training set or the ML image model and to perform the one or more modifications via one or more user control elements.

Clause 42:

The system of clause 41, wherein the model diagnosis system is implemented as a multi-tenant service and configured to obtain prediction results of a plurality of ML image models of a plurality of different tenants and determine modifications to training sets or ML image models of the plurality of different tenants.

Clause 43:

The system of clauses 41 to 42, wherein the one or more modifications includes one or more of: adding a test image to the training set, changing annotations of one or more existing images in the training set, and combining two or more classes in the training set.

Clause 44:

The system of clauses 41 to 43, wherein the model diagnosis system is configured to display a saliency map for a test image, wherein the saliency map indicates one or more regions in the test image that were salient in contributing to a prediction result of the ML image model.

Clause 45:

The system of clauses 41 to 44, wherein the model diagnosis system is configured to cause a model diagnosis interface to display, for a test image, a closest image in a most likely predicted class from the training set and another closest image in a second most likely predicted class in the training set.

Clause 46:

A computer-implemented method, comprising:
performing, by a model diagnosis system implemented on one or more processors and associated memory:
obtaining prediction results of a ML model that classifies a given media sample to one or more of a plurality of classes, wherein the ML model was trained using training samples from a training set and the prediction results were generated using test samples from another set;
generating a model performance interface with a zoomable confusion matrix that groups the test samples into cells according to their respective truth classes and predicted classes;
responsive to user input via the model performance interface to select a cell of the confusion matrix, causing the model performance interface to zoom in on test samples in the cell selected;
responsive to user input to select one or more of the test samples in the cell, generating a model diagnosis interface configured to display the one or more test samples selected;
receiving user input via the model diagnosis interface indicating feedback regarding the one or more test samples selected or one or more training images in the training set;
determining, based at least in part on the feedback, one or more modifications to the training set or the ML image model to improve prediction performance; and
generating a diagnosis report interface configured to display the one or more modifications to the training set or the ML image model and to perform the one or more modifications via one or more user control elements.

Clause 47:

The method of clause 46, wherein the model diagnosis system is implemented as a multi-tenant service, and further comprising performing, by the model diagnosis system:
obtaining prediction results of a plurality of ML models of a plurality of different tenants; and
determining modifications to training sets or ML models of the plurality of different tenants.

Clause 48:

The method of clauses 46 to 47, wherein the one or more modifications includes one or more of: adding a test sample to the training set, changing annotations of one or more existing samples in the training set, and combining two or more classes in the training set.

Clause 49:

The method of clauses 46 to 48, wherein generating the diagnosis report interface comprises indicating on the diagnosis report a plurality of modifications to the training set or the ML model, wherein the modifications are prioritized based at least in part on respective impacts of the modifications on prediction performance.

Clause 50:

The method of clauses 46 to 49, wherein generating the model diagnosis interface comprises including on the model diagnosis interface, for a test sample, a list of closest samples from the training set with their respective classes.

Clause 51:

The method of clauses 46 to 50, wherein generating the model diagnosis interface comprises including on the model diagnosis interface, for a test sample, a closest sample in a most likely predicted class from the training set and another closest sample in a second most likely predicted class the training set.

Clause 52:

The method of clause 51, wherein determining the closest sample in the most likely predicted class for the test sample comprises:
obtaining a feature vector for the test sample used by the ML model;
computing distances between the feature vector and respective feature vectors of at least some training samples in the most likely predicted class via a distance metric; and
selecting a training sample in the most likely predicted class with a smallest distance as the closest sample.

Clause 53:

The method of clauses 46 to 52, wherein generating the model diagnosis interface comprises including on the model diagnosis interface a saliency map for a test sample, wherein the saliency map indicates one or more regions in the test sample that were salient in contributing to a prediction result of the ML model.

Clause 54:

The method of clause 53, wherein generating the model diagnosis interface comprises generating a second saliency map for the test sample, wherein the second saliency map indicates one or more other regions in the test sample that are salient to the ML model to classify the test sample to a different class from the prediction result.

Clause 55:

The method of clause 53, wherein generating the model diagnosis interface comprises generating a bounding box surrounding a most salient region of the test sample.

Clause 56:

The method of clause 53, wherein generating the model diagnosis interface comprises including on the model diagnosis interface a first user control element to alter the test sample and a second user control element to update the saliency map for the test sample after the alteration.

Clause 57:

The method of clauses 46 to 56, further comprising:
determining, for individual ones of the test samples selected, respective most salient regions in the test samples that were salient in contributing to the ML model's prediction result;

generating a feature naming interface displaying the most salient regions of the test samples, clustered into feature clusters according to a clustering technique;

responsive to user input via the feature naming interface, assigning respective feature names to individual ones of the feature clusters; and wherein generating the model diagnosis interface comprises including on the model diagnosis interface a chart indicating a distribution of the feature names for the most salient regions of the test samples.

Clause 58:

One or more non-transitory computer-accessible storage media storing program instructions that when executed on or across one or more processors implement a model diagnosis system for machine learning (ML) models and cause the model diagnosis system to:

obtain prediction results of a ML model that classifies a given media sample to one or more of a plurality of classes, wherein the ML model was trained using training samples from a training set and the prediction results were generated using test samples from another set;

generate a model performance interface with a zoomable confusion matrix that groups the test samples into cells according to their respective truth classes and predicted classes;

responsive to user input via the model performance interface to select a cell of the confusion matrix, cause the model performance interface to zoom in on test samples in the cell selected;

responsive to user input to select one or more of the test samples in the cell, generate a model diagnosis interface configure to display the one or more test samples selected;

receive user input via the model diagnosis interface indicating feedback regarding the one or more test samples selected or one or more training images in the training set;

determine, based at least in part on the feedback, one or more modifications to the training set or the ML image model to improve prediction performance; and generate a diagnosis report interface configured to display the one or more modifications to the training set or the ML image model and to perform the one or more modifications via one or more user control elements.

Clause 59:

The one or more non-transitory computer-accessible storage media of clause 58, wherein the one or more modifications includes one or more of: adding a test sample to the training set, changing annotations of one or more existing samples in the training set, and combining two or more classes in the training set.

Clause 60:

The one or more non-transitory computer-accessible storage media of clauses 58 to 59, wherein the program instructions when executed on or across the one or more processors cause the model diagnosis system to:

cause a user interface to display a saliency map for a test sample, wherein the saliency map indicates one or more regions in the test sample that were salient in contributing to a prediction result of the ML model.

What is claimed is:

1. A system, comprising:

one or more computers that implement a model diagnosis system for machine learning (ML) image models, configured to:

obtain results produced by a ML model, wherein the ML model was trained to perform an image classification task using training samples from a training dataset, and the results were generated using test samples from a test dataset;

generate a model diagnosis interface that displays visual information for a visual diagnosis of classification errors associated with one or more of the test samples, wherein the visual information indicates one or more image features in a test image that contributed to a misclassification of the test image, including a saliency map for the test image that indicates one or more regions in the test image that were most salient in contributing to the misclassification of the test image by the ML model; and responsive to user input received via the model diagnosis interface, make one or more modifications to the training dataset or the ML model to improve performance of the ML model.

2. The system of claim 1, wherein the model diagnosis system is implemented as a multi-tenant service configured to manage a plurality of ML models on behalf of a plurality of different tenants and make modifications to the plurality of ML models.

3. The system of claim 1, wherein the model diagnosis system is implemented as part of a model development system that provides an interactive model development environment for model developers.

4. The system of claim 1, wherein the model diagnosis interface is a web interface sent to a web browser client.

5. The system of claim 1, wherein the saliency map indicates pixels in the test image that were most salient in contributing to the misclassification of the test image by the ML model.

6. The system of claim 5, wherein the saliency map is generated using a thresholding technique.

7. The system of claim 5, wherein the saliency map is generated as a grayscale image, wherein a color of an individual pixel in the grayscale image is based on the individual pixel's importance in contributing to the misclassification of the test image by the ML model.

8. The system of claim 1, wherein the visual information indicates a feature name associated with a region of the one or more regions in the test image.

9. The system of claim 1, wherein the saliency map is generated using a Local Interpretable Model-Agnostic Explanation (LIME) technique.

10. The system of claim 1, wherein the one or more modifications includes one or more of adding a test sample to the training dataset, changing annotations of one or more existing samples in the training dataset, and combining two or more classes in the training dataset.

11. The system of claim 1, wherein the model diagnosis interface poses one or more diagnosis questions regarding the displayed visual information, and the one or more modifications are determined by the model diagnosis system based on user responses to the diagnosis questions.

12. A computer-implemented method, comprising:

performing, by a model diagnosis system implemented on one or more processors and associated memory:

obtaining results produced by a machine learning (ML) model, wherein the ML model was trained to perform an image classification task using training samples from a training dataset, and the results were generated using test samples from a test dataset;

generating a model diagnosis interface that displays visual information for a visual diagnosis of classification errors associated with one or more of the test samples, wherein the visual information indicates one or more image features in a test image that contributed to a misclassification of the test image, including a saliency map for the test image that indicates one or more regions in the test image that were most salient in contributing to the misclassification of the test image by the ML model; and responsive to user input received via the model diagnosis interface, making one or more modifications to the training dataset or the ML model to improve performance of the ML model.

13. The method of claim 12, wherein the model diagnosis system is implemented as a multi-tenant service configured to manage a plurality of ML models on behalf of a plurality of different tenants and make modifications to the plurality of ML models.

14. The method of claim 12, wherein the model diagnosis system is implemented as part of a model development system that provides an interactive model development environment for model developers.

15. The method of claim 12, wherein the saliency map indicates pixels in the test image that were most salient in contributing to the misclassification of the test image by the ML model.

16. The method of claim 15, wherein the saliency map is generated as a grayscale image, wherein a color of an individual pixel in the grayscale image is based on the individual pixel's importance in contributing to the misclassification of the test image by the ML model.

17. The method of claim 12, wherein the visual information indicates a bounding box for a region of the one or more regions in the test image.

18. The method of claim 12, wherein the one or more modifications includes one or more of adding a test sample to the training dataset, changing annotations of one or more existing samples in the training dataset, and combining two or more classes in the training dataset.

19. The method of claim 12, wherein the model diagnosis interface poses one or more diagnosis questions regarding the displayed visual information, and the one or more modifications are determined by the model diagnosis system based on user responses to the diagnosis questions.

20. One or more non-transitory computer-accessible storage media storing program instructions that when executed on or across one or more processors implement a model diagnosis system for machine learning (ML) models and cause the model diagnosis system to:

obtain results produced by a ML model, wherein the ML model was trained to perform an image classification task using training samples from a training dataset, and the results were generated using test samples from a test dataset;

generate a model diagnosis interface that displays visual information for a visual diagnosis of classification errors associated with one or more of the test samples, wherein the visual information indicates one or more image features in a test image that contributed to a misclassification of the test image, including a saliency map for the test image that indicates one or more regions in the test image that were most salient in contributing to the misclassification of the test image by the ML model; and responsive to user input received via the model diagnosis interface, make one or more modifications to the training dataset or the ML model to improve performance of the ML model.

\* \* \* \* \*